US006236980B1

(12) United States Patent
Reese

(10) Patent No.: US 6,236,980 B1
(45) Date of Patent: *May 22, 2001

(54) MAGAZINE, ONLINE, AND BROADCAST SUMMARY RECOMMENDATION REPORTING SYSTEM TO AID IN DECISION MAKING

(76) Inventor: John P Reese, 4 Buckingham La., West Hartford, CT (US) 06117

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,823

(22) Filed: Apr. 9, 1998

(51) Int. Cl.$^7$ .................................................. G06F 17/60

(52) U.S. Cl. .............................. 705/36; 705/26; 705/10

(58) Field of Search ................................ 705/36, 26, 27, 705/10

(56) References Cited

U.S. PATENT DOCUMENTS

| | | | | |
|---|---|---|---|---|
| 4,870,579 | * | 9/1989 | Hey | 364/419 |
| 4,989,141 | * | 1/1991 | Lyons et al. | 364/408 |
| 4,996,642 | * | 2/1991 | Hey | 364/419 |
| 5,006,998 | * | 4/1991 | Yasunobu et al. | 364/513 |
| 5,132,899 | * | 7/1992 | Fox | 364/408 |
| 5,262,941 | * | 11/1993 | Saladin et al. | 364/408 |
| 5,383,111 | * | 1/1995 | Homma et al. | 364/401 |
| 5,414,838 | * | 5/1995 | Kolton et al. | 395/600 |
| 5,502,637 | * | 3/1996 | Beaulieu et al. | 364/408 |
| 5,583,763 | * | 12/1996 | Atcheson et al. | 364/551.01 |
| 5,812,988 | * | 9/1998 | Sandretto | 705/36 |
| 5,819,271 | * | 10/1998 | Mahoney et al. | 707/9 |
| 5,893,079 | * | 4/1999 | Cwenar | 705/36 |
| 5,897,639 | * | 4/1999 | Greef et al. | 707/103 |

OTHER PUBLICATIONS

Information regarding Hoover's Online, Retrieved on Aug. 25, 2000 from the Internet <URL:http://www.hoovers.com>.*

Information regarding AudioReview.Com, Retrieved on Aug. 25, 2000 from the Internet <URL:http://www.audioreview.com>.*

Fryxell, David A., "Dow Jones News/Retrieval: the 'Lifeblood of Business'", Link–Up, vol. 11, No. 5, p. 22(5), Sep. 1994.*

Jacso, Peter & Judit Tiszai, "The Perfect Interface of Cinemania", Database (DTB), vol. 18, No. 2, p. 32, Apr. 1995.*

Jacso, Peter & Judit Tiszai, "Now Featuring . . . Movie Databases: A Sequel", vol. 19, No. 1, pp. 58–69, Feb. 1996.*

(List continued on next page.)

Primary Examiner—Eric W. Stamber
Assistant Examiner—Susanna Meinecke-Díaz

(57) ABSTRACT

The invention utilizes a computer apparatus to automatically generate displays or reports containing investment security or element recommendations (FIG. 4, box 133) along with an optional summarization of the reasons (FIG. 4, box 134) for the recommendation from magazines, online sources, and broadcast programs for one specific security or element (FIG. 4, box 132) at a time or one specific recommendation source (FIG. 7, box 184) at a time. The aforementioned reports could additionally include the performance of the recommendors (FIG. 5, box 156). A report could also be provided to show the performance statistics (FIG. 8b, box 196, box 204, box 206, box 208, box 210, box 212, box 214) of a recommendation source (FIG. 8b, box 194) for predetermined date ranges (FIG. 8b, box 216) either in an aggregated and averaged format (FIG. 8b) or for each recommendation (FIG. 8c) made by the recommendation source. Additionally, a report could be provided to show the performance of elements or securities that were mentioned (FIG. 51), not just recommended, in magazines, online sources, and broadcast programs.

26 Claims, 59 Drawing Sheets-

OTHER PUBLICATIONS

Zilber, Jon, "The Couch–Potato Mac", MacUser, vol. 12, No. 7, p. 113(2), Jul. 1996.*

"Lights! Camera! Action! Microsoft Debuts Cinemania 97, Latest Edition of Top–Selling Guide to Movies and Movie Makers", PR Newswire, p. 0917SFTU002, Sep. 17, 1996.*

"top 50 CD–ROMs", MacUser, vol. 12, No. 12, p. 82(12), Dec. 1996.*

"InvestorsEdge, a Unit of Neural Applications Corporation, Unveils a New Financial Internet Business Unit—Stockpoint," PR Newswire, p. 1020SFM068, Oct. 20, 1997.*

"Zacks Launches New Investment Web Site," Newsbytes News Network, Nov. 6, 1996.*

"Zacks, Newsbytes Offer Time Sensitive Stories to Investors," Newsbytes News Network, Sep. 9, 1996.*

Egan, Jack, "The Virtual Bloomberg," U.S. News & World Report, vol. 123, No. 22, p. 83, Dec. 8, 1997.*

"Money Talks Adds Daily Small–Cap Interviews and Earnings Analysis," PR Newswire, p. 1219NYF001A, Dec. 19, 1997.*

Harris, Diane, "Smart Ways to Shop the New Financial Supermarkets," Money, vol. 26, No. 6, pp. 100–109, Jun. 1997.*

Gianturco, Michael, "Investing on the Web: Surf and Grow Rich!," Forbes, pp. 36–38, Jun. 3, 1996.*

* cited by examiner

FIG. 4

Article Summaries and Recommended Reasons for Investment Action for Western Digital Corp. (WDC)--$16.25

| Source of Recommendation | Target Data | Article Summarization | General Reasons Cited |
|---|---|---|---|
| Bullish Reasons | | | |
| Money, 2/1/98<br>Value Stocks: Six Ideas That Will Pay Off When You Go Against the Wind<br><br>•Susan Scherreik ★ ★ ★ ★<br>•William Miller ★ ★ ★ ★<br>•Jean W. Orr | $60 by 1/15/2001 | The company should decrease excess inventory over the next few months. Sales are projected to rise 18% annually over the next 3 years. | •Company is #3 in its industry (if mentioned in the article) |
| Money, 12/1/97<br>Money's All Star Brokers Name Their Picks For 1998<br><br>•Junius Ellis ★ ★ ★<br>•Jim Stroud | $37 by 12/31/98 | The company's shift into the high priced disk drive market will spark earnings growth of 15% in 1998 | •Earnings are expected to increase dramatically in coming year<br>•Picked by a Savvy Stock Picker |
| Bearish Reasons | | | |
| Money, 2/1/98<br>Value Stocks: Six Ideas That Will Pay Off When You Go Against the Wind<br><br>•Susan Scherreik ★ ★ ★ ★<br>•William Miller ★ ★ ★ ★<br>•Jean W. Orr | $60 by 1/15/2001 | The stock has recently fallen 71%. The company was to slow moving into the core disk drive market, leaving it with excess inventory. This overage will reduce profits by 91% for its 98 fiscal year. | •Too much inventory in channel<br>•Earnings of this company have been suffering in recent quarters |
| Money, 8/1/97<br>A pro picks three stocks to gain 44%, three to sell in a runaway bull market<br><br>•Junius Ellis ★ ★ ★<br>•Jack Kirnan ★ ★ ★ | $48 by 8/1/98 | The price is less than it's major competitor, Seagate. Wall Street analysts feel that the company can no longer continue to expand and increase margins. | |

FIG. 5

Article Summaries and Recommended Reasons for Investment Action for
Western Digital Corp. (WDC)--$16.25

| Source of Recommendation | Target Data | Article Summarization | General Reasons Cited |
|---|---|---|---|
| Bullish Reasons | | | |
| Money, 2/1/98<br>Value Stocks: Six Ideas That Will Pay Off When You Go Against the Wind<br>• Susan Scherreik ★★★★<br>• William Miller ★★★★<br>• Jean W. Orr | $60 by 1/15/2001 | The company should decrease excess inventory over the next few months. Sales are projected to rise 18% annually over the next 3 years. | • Company is #3 in its industry (if mentioned in the article) |
| Money, 12/1/97<br>Money's All Star Brokers Name Their Picks For 1998.<br>• Junius Ellis ★★★<br>• Jim Stroud | $37 by 12/31/98 | The company's shift into the high priced disk drive market will spark earnings growth of 15% in 1998. | • Earnings are expected to increase dramatically in coming year<br>• Picked by a Savvy Stock Picker |
| Bearish Reasons | | | |
| Money, 2/1/98<br>Value Stocks: Six Ideas That Will Pay Off When You Go Against the Wind<br>• Susan Scherreik ★★★★<br>• William Miller ★★★★<br>• Jean W. Orr | $60 by 1/15/2001 | The stock has recently fallen 71%. The company was to slow moving into the core disk drive market, leaving it with excess inventory. This overage will reduce profits by 91% for its 98 fiscal year. | • Too much inventory in channel<br>• Earnings of this company have been suffering in recent quarters |
| Money, 8/1/97<br>A pro picks three stocks to gain 44%, three to sell in a runaway bull market<br>• Junius Ellis ★★★<br>• Jack Kirnan ★★★ | $48 by 8/1/98 | The price is less than it's major competitor, Seagate. Wall Street analysts feel that the company can no longer continue to expand and increase margins. | |

FIG. 6

Article Summaries and Recommended Reasons for Investment Action for Western Digital Corp. (WDC)--$16.25

| Source of Recommendation | Target Data | Article Summarization | General Reasons Cited |
|---|---|---|---|
| Bullish Reasons | | | |
| Money, 2/1/98--Page B1<br>Value Stocks: Six Ideas That Will Pay Off When You Go Against the Wind<br>Code: 16BBB<br><br>•Susan Scherreik<br>★★★★<br><br>•William Miller ★★★★<br>•Jean W. Orr | $60 by 1/15/2001 | The company should decrease excess inventory over the next few months. Sales are projected to rise 18% annually over the next 3 years. | •Company is #3 in its industry (if mentioned in the article) |
| Money, 12/1/97--Page 106<br>Money's All Star Brokers Name Their Picks For 1998.<br>Code: 9ABB<br><br>•Junius Ellis ★★★<br>•Jim Stroud | $37 by 12/31/98 | The company's shift into the high priced disk drive market will spark earnings growth of 15% in 1998. | •Earnings are expected to increase dramatically in coming year<br>•Picked by a Savvy Stock Picker |
| Bearish Reasons | | | |
| Money, 2/1/98--Page B1<br>Value Stocks: Six Ideas That Will Pay Off When You Go Against the Wind<br>Code: 16BBB<br><br>•Susan Scherreik<br>★★★★<br><br>•William Miller ★★★★<br>•Jean W. Orr | $60 by 1/15/2001 | The stock has recently fallen 71%. The company was too slow moving into the core disk drive market, leaving it with excess inventory. This overage will reduce profits by 91% for its 98 fiscal year. | •Too much inventory in channel<br>•Earnings of this company have been suffering in recent quarters |

FIG. 7

Recommendations from: Peter Lynch

| Article Title | Date | Security | Article Summarization | Recommendation |
|---|---|---|---|---|
| Investing | 1/1/96 | Body Shop | Body Shop is a retailer of personal care products whose stock price had declined in the past but that, Peter Lynch, a prominent analyst, sees as a fast growing stock. He sees this company as a fast-growing global company that is opening almost 150 new stores a year. He says the company is growing at 20 percent a year, has almost no debt, and should continue to be profitable. These various reasons are why Lynch feels this stock is undervalued and is a pick. | Pick |
| | | Cedar Fair, L.P. | Cedar Fair is a leader in the entertainment business by providing some of the best theme parks throughout the United States. Cedar Fair seems to encounter continued success due to the addition of new rides each year. Peter Lynch, a prominent analyst, picks this stock because he feels it is still an undervalued stock capable of growth. | Pick |
| | | Pier 1 Imports, Inc. | Pier 1 Imports is a retailer of household goods and is considered to be an overlooked stock. Pier 1 is a good pick because of their ability to cut costs and reduce debt. They have also expanded business throughout this country and now have expanded overseas to foreign markets as well. Pier 1's domestic sales are recently up 11 percent and analysts expect the earnings per share to increase next year. Peter Lynch, a prominent analyst, says Pier 1 is a mature company that is still an undervalued stock and is worth buying. | Pick |
| Keep Digging | 11/1/97 | Barrick Gold Corp. | Gold is still the best hedge against inflation. Peter Ward at Lehman brothers thinks increasingly gold is becoming another commodity. However there are some companies which are well placed to prosper in the current environment. The company is the third largest gold producer in the world. It has a low cost of mined gold. It has hedged itself to reap $420 for an ounce of gold over next three years. | Pick |

FIG. 8b

Reese Group Ranking For Eric J. Savitz is ★★★
Performance Statistics by Time Horizon Investing For Eric J. Savitz

| Investment Time Period After Recommended | 1 Week Before | 3 Days | 1 Week | 2 Weeks | 1 Month | 3 Months | 6 Months | 1 Year |
|---|---|---|---|---|---|---|---|---|
| Performance | .53% | 1.4% | 1.1% | 2.7% | 2.7% | -1.8% | | |
| S&P Performance | -.84% | 1.6% | 1.7% | 1.9% | 1.2% | 3.0% | | |
| Number Of Recommendations Analyzed | 146 | 146 | 146 | 146 | 146 | 146 | 146 | 146 |
| Risk Adjusted Return (Higher Is Better) | 6.8 | 21.4 | 14.5 | 32.2 | 19.6 | N/A | N/A | N/A |
| Risk Adjusted Return For S&P500 (Higher is Better) | N/A | N/A | N/A | 57.8 | 29.2 | 65.4 | N/A | N/A |
| Fun Index (Lower Is Better) | 1.3 | .5 | 1.0 | 1.3 | 1.9 | 4.6 | 7.0 | 7.0 |
| Smile Index (Higher is Better) | 1.5 | 1.5 | 2.2 | 3.0 | 3.8 | 6.1 | 6.2 | 6.2 |

(Bolded numbers indicate that the performance has beaten the S&P)

FIG. 8c

Recommendations By Eric J. Savitz

| Issue | Company Name | Symbol | Action | 1 Week Before | 10 Days | 1 Week | 2 Week | 1 Month | 3 Months | 9 Months | 1 Year |
|---|---|---|---|---|---|---|---|---|---|---|---|
| Barron's 9/29/97 Party On! | CVS Corporation | CVS | Pick | -2.6% | 2.9% | 8% | 5.5% | 6.3% | | | |
| | | S&P500 | | 1% | 2% | 2.0% | 1.5% | 3.4% | | | |
| Barron's 9/29/97 Party On! | Tupperware Corporation | TUP | Pick | 1.1% | 2% | .9% | -3.8% | -7.8% | | | |
| | | S&P500 | | 1% | 2% | 2.0% | 1.5% | 3.4% | | | |
| Barron's 9/29/97 Party On! | Micron Technology, Inc. | MU | Pan | -5.9% | 2.5% | -.4% | -10.6% | 17.2% | | | |
| | | S&P500 | | 1% | 2% | 2.0% | 1.5% | 3.4% | | | |

FIG. 9a

Performance Statistics by Time Horizon Investing For The Article "Only the Beginning?" In Barron's

| Investment Time Period After Recommendation | 1 Week Before | 3 Days | 1 Week | 2 Weeks | 1 Month | 3 Months | 6 Months | 1 Year |
|---|---|---|---|---|---|---|---|---|
| Performance | -.53% | 3.3% | 4.9% | 6.7% | 9.4% | .3% | | |

FIG. 9b

Performance Statistics by Time Horizon Investing For The Article "Only the Beginning?" In Barron's 7/28/97

| Investment Time Period After Recommendation | 1 Week Before | 3 Days | 1 Week | 2 Weeks | 1 Month | 3 Months | 6 Months | 1 Year |
|---|---|---|---|---|---|---|---|---|
| Performance | -.53% | 3.3% | 4.9% | 6.7% | 9.4% | .3% | | |
| S&P Performance | .6% | 1.7% | 1.5% | 1% | 2.1% | 6.3% | | |
| Number Of Recommendations Analyzed | 13 | 13 | 13 | 13 | 13 | 13 | 13 | 13 |
| Risk Adjusted Return (Higher is Better) | N/A | N/A | N/A | 55.4 | 73.1 | 1.5 | N/A | N/A |
| Risk Adjusted Return For S&P500 (Higher is Better) | N/A | N/A | N/A | N/A | N/A | N/A | N/A | N/A |
| Pain Index (Lower is Better) | .5 | .3 | .2 | .3 | .5 | 1.2 | 3.3 | 3.1 |
| Smile Index (Higher is Better) | 1.8 | 1.4 | 3.0 | 5.4 | 7.5 | 11.6 | 10.8 | 10.8 |

(Bolded numbers indicate that the performance has beaten the S&P)

FIG. 9c

Recommendations Made In This Article

| Issue | Company Name | Symbol | Action | 1 Week Before | 3 Days | 1 Week | 2 Week | 1 Month | 3 Months | 6 Months | 1 Year |
|---|---|---|---|---|---|---|---|---|---|---|---|
| Barron's 7/28/97 Only the Beginning? | America Online Inc. | AOL | Pick | -1.8% | 2.2% | 9.7% | 4.3% | .5% | 13.5% | | |
| | | S&P500 | | .3% | 1.7% | 1.5% | 1% | 2.4% | 6.3% | | |
| Barron's 7/28/97 Only the Beginning? | Dell Computer Corporation | DELL | Pick | -1.4% | 4.3% | 5.6% | -4.0% | 5.5% | 3.8% | | |
| | | S&P500 | | .3% | 1.7% | 1.5% | 1% | 2.4% | 6.3% | | |
| Barron's 7/28/97 Only the Beginning? | IBM | IBM | Pick | 1.9% | 1.0% | 1.2% | -1.9% | -1.1% | -14.3% | | |
| | | S&P500 | | .3% | 1.7% | 1.5% | 1% | 2.4% | 6.3% | | |
| Barron's 7/28/97 Only the Beginning? | Western Digital Corp. | WDC | Pick | -6.6% | 3.0% | 7.4% | 33.8% | 33.8% | -18.9% | | |
| | | S&P500 | | .3% | 1.7% | 1.5% | 1% | 2.4% | 6.3% | | |

FIG. 10b

Reese Group Ranking For This Column Is ★★★ 272 / 270

Performance Statistics by Time Horizon Investing For The Column "Best buys" In Forbes

| Length Of Time Period After Recommendation | 1 Week Before | 3 Days | 1 Week | 2 Weeks | 1Month | 3Months | 6Months | 1Year |
|---|---|---|---|---|---|---|---|---|
| Performance | -.52% | -.1% | .1% | -.2% | .0% | .7% | 3.5% | 8.6% |
| S&P Performance | -1.54% | -.9% | .6% | -.1% | 1.5% | 4.5% | 22.6% | 39.3% |
| Number Of Recommendations Analyzed | 272 | 272 | 272 | 272 | 272 | 272 | 272 | 272 |
| Risk Adjusted Return (Higher is Better) | -51.3 | -20.5 | 15.1 | -14.8 | -.3 | 11.3 | 12.1 | 12.3 |
| Risk Adjusted Return For S&P500 (Higher is Better) | -103.1 | -63.4 | 830.4 | -17.5 | 117.4 | 73.3 | N/A | N/A |
| Fair Index (Lower is Better) | 1 | 1 | 2 | 3 | 6 | 7 | 10 | 11 |
| Smile Index (Higher is Better) | .4 | .1 | .2 | .3 | .3 | 1.3 | 1.9 | 2.8 |

(Bolded numbers indicate that the performance has beaten the S&P)

The 50 Most Recent Recommendations By Best buys

| Issue | Company Name | Symbol | Action | 1 Week Before | 30 Days | 1 Week | 2 Week | 1 Month | 3 Months | 6 Months | 1 Year |
|---|---|---|---|---|---|---|---|---|---|---|---|
| Forbes 8/25/97 Best Buys-Municipal bond funds | VANGUARD CALIF TAX FREE FD CAL INSD INTER | VCAIX | Pick | -.7% | .1% | 1% | -.2% | .3% | .1% | | |
| | | S&P500 | | 3.1% | 2.3% | 4% | 10% | 2% | 17% | | |
| Forbes 8/25/97 Best Buys-Municipal bond funds | VANGUARD MUN BD FD INC INSD LNTRM PORT | VILPX | Pick | -.8% | .0% | .2% | -.2% | .3% | .1% | | |
| | | S&P500 | | 3.1% | 2.3% | 4% | 10% | 2% | 17% | | |

FIG. 11a

| Investment Time Period After Recommendation | 1 Week Before | 3 Days | 1 Week | 2 Weeks | 1 Month | 3 Months | 6 Months | 1 Year |
|---|---|---|---|---|---|---|---|---|
| Performance | 1.05% | .2% | .7% | .2% | 1.8% | 4.1% | 9.1% | 17.5% |

Performance Statistics by Time Horizon Investing For Money

FIG. 11b

Performance Statistics by Time Horizon Investing For Money

| Investment Time Period After Recommendation | 1 Week Before | 3 Days | 1 Week | 2 Weeks | 1 Month | 3 Months | 6 Months | 1 Year |
|---|---|---|---|---|---|---|---|---|
| Performance | 1.05% | .2% | .7% | .2% | 1.8% | 4.1% | 9.1% | 17.5% |
| S&P Performance | .96% | .2% | .7% | .3% | 2.1% | 6.3% | 12.8% | 27.1% |
| Number Of Recommendations Analyzed | 1597 | 1597 | 1597 | 1597 | 1597 | 1597 | 1597 | 1597 |
| Risk Adjusted Return (Higher is Better) | 24.2 | 9.4 | 18.1 | 2.3 | 20.1 | 22.2 | 31.1 | 31.1 |
| Risk Adjusted Return For S&P500 (Higher is Better) | 52.4 | 21.8 | 77.0 | 11.4 | 59.2 | 106.1 | 153.9 | 289.1 |
| Pain Index (Lower is Better) | 1.4 | .3 | .7 | 1.1 | 1.6 | 2.3 | 2.8 | 3.2 |
| Smile Index (Higher is Better) | .8 | .3 | .9 | 1.3 | 2.1 | 4.4 | 6.9 | 10.2 |

(Bolded numbers indicate that the performance has beaten the S&P)

FIG. 11c

The 50 Most Recent Recommendations By Money

| Article | Company Name | Symbol | Action | 1 Week Before | 3 Days | 1 Week | 2 Week | 1 Month | 2 Months | 4 Months | 1 Year |
|---|---|---|---|---|---|---|---|---|---|---|---|
| What the Money 30 will do in 98 12/1/97 | ITT Corporation (New) | ITT | Pick | 3.8%% | .3% | .6% | .0% | | | | |
| | | S&P500 | | 3.0% | -.3% | .9% | 1.2% | | | | |
| What the Money 30 will do in 98 12/1/97 | Colgate-Palmolive Company | CL | Pick | 2.6%% | 1.8% | 5.5% | -1.6% | | | | |
| | | S&P500 | | 3.0% | -.3% | .9% | 1.2% | | | | |
| What the Money 30 will do in 98 12/1/97 | CUC International Inc. | CU | Pick | 4.3%% | -.2% | 6.0% | 1.0% | | | | |
| | | S&P500 | | 3.0% | -.3% | .9% | 1.2% | | | | |

336

(Generates Report in FIG. 4)

(Generates Report in FIG. 5)

(Generates Report in FIG. 6)

(Generates Report in FIG. 8a)

(Generates Report in FIG. 8b)

(Generates Report in FIG. 9c, 10c, 11c)

FIG. 25

Figure 36
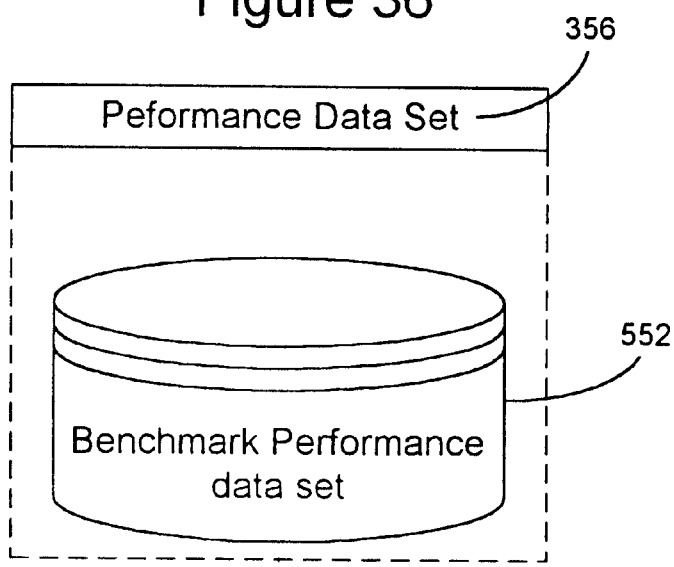
Aggregate and average the benchmark performance for a recommendor for a predetermined time period — 646
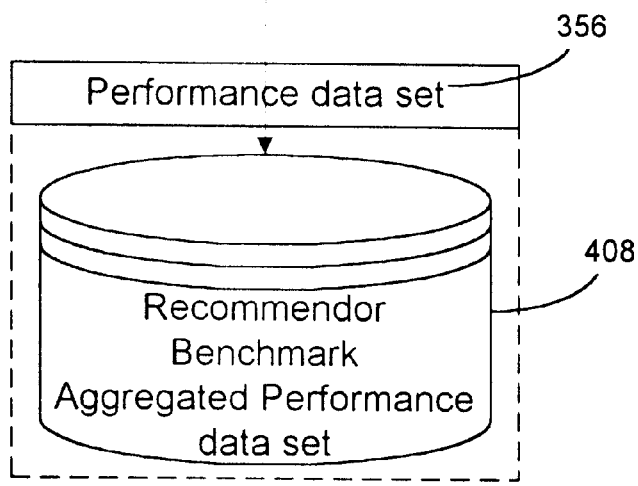

FIG. 47

Article Summaries and Recommended Reasons for Action for:
Element Identification

| Source of Recommendation | Action | Article Summarization | General Reasons Cited |
|---|---|---|---|
| Positive Reasons | | | |
| Recommendation Source, Date Identification<br><br>• Recommendor #1<br>• Recommendor #2 | Action | Reasons Cited by Recommendation Source | General Reasons Cited |

739 — Source of Recommendation
730 — Action
732 — Article Summarization
734 — (Positive Reasons)
736 — General Reasons Cited
738 — Positive Reasons
740 — Recommendation Source, Date Identification
742 — Recommendor #1, Recommendor #2

(Generates Report in FIG. 47)

FIG. 49

Mentions by Eric J. Savitz

| Issue | Company Name | Symbol | 1 Week Before | 3 days | 1 Week | 2 Week | 1 Month | 3 Months | 6 Months | 1 Year |
|---|---|---|---|---|---|---|---|---|---|---|
| Forbes, 1/1/98 | CVS Corporation | CVS | -2.8% | 2.9% | .8% | 5.5% | 6.3% | | | |
| | | S&P 500 | .1% | .2% | 2.0% | 1.5% | 3.1% | | | |
| CNNfn, 3/3/98 | Tupperware Corporation | TUP | 1.1% | .2% | .9% | -3.8% | -7.8% | | | |
| | | S&P 500 | .1% | .2% | 2.0% | 1.5% | 3.1% | | | |
| MS Investor, 3/8/98 | Micron Technology, Inc. | MIU | -5.9% | 2.5% | -.4% | -10.6% | 17.2% | | | |
| | | S&P 500 | .1% | .2% | 2.0% | 1.5% | 3.1% | | | |

FIG. 50

| | | | | | | | | | | |
|---|---|---|---|---|---|---|---|---|---|---|
| | | | | | | Mentions of: CVS | | | | |
| | Issue | Company Name | Symbol | Week Before | 30 yrs | 1 Week | 2 Week | 1 Month | 3 Months | 6 Months | 1 Year |
| | Worth, 1/1/98 | CVS Corp. | CVS | -2.8% | 2.9% | .8% | 5.5% | 6.3% | | | |
| | | | S&P 500 | .1% | .2% | 2.0% | 1.5% | 3.4% | | | |
| | Forbes, 12/1/97 | CVS Corp. | CVS | 1.1% | .2% | .9% | -3.8% | -7.8% | | | |
| | | | S&P 500 | .1% | .2% | 2.0% | 1.5% | 3.4% | | | |
| | CNN, 2/20/98 | CVS Corp. | CVS | -5.9% | 2.5% | -.4% | -10.6% | 17.2% | | | |
| | | | S&P 500 | .1% | .2% | 2.0% | 1.5% | 3.4% | | | |

| Issue | Product Name | Quarter 1 | Quarter 2 | Quarter 3 | Quarter 4 |
|---|---|---|---|---|---|
| PC Magazine, 1/1/97 | Compaq Presario | 100,000 | 200,000 | 275,000 | 325,000 |
| Boardwatch Magazine, 3/1/97 | SyQuest Hardrive | 200,000 | 275,000 | 325,000 | |
| PC Magazine, 2/24/97 | Front Page 98 | 200,000 | 275,000 | 325,000 | |

Mentions by: John C. Dvorak

MAGAZINE, ONLINE, AND BROADCAST SUMMARY RECOMMENDATION REPORTING SYSTEM TO AID IN DECISION MAKING

BACKGROUND—FIELD OF INVENTION

This invention relates to a computer-based system in the financial investment field, specifically a reporting structure that aids in the decision making on a single security or single element at a time or decision making on a hierarchy of recommendation sources for securities.

BACKGROUND—DESCRIPTION ART

The invention was conceptualized, designed and implemented in a quest to find answers to questions like:

Which of the financial magazines, like Barrons, Business Week, Smart Money, Money, Forbes, and Worth, give out the best performing recommendations of specific securities or strategies through articles and columns?

Can one make money following a recommendation in a magazine after one receives the magazine, and gets a chance to act on it? Or, is it too late?

If it is too late, the prices generally have peaked by the appears, can you make money by shorting or taking the opposite position from the recommendation?

Which of the columns has the best investment record?

Which of the columnists has the best investment record?

How do articles with well thought out strategies and ideas perform over time?

How do the recommendations of specific securities fare over time?

If a security/strategy is recommended in a magazine, online source, or broadcast media and the price of the security has significantly appreciated in the week or other prior period before the average investor has a chance to act on the recommendation, could an opposite strategy from that in the article be adopted to realize gains?

It was broadened during the implementation process to include online (or Internet) sources of articles containing security recommendations, and to include broadcast recommendations.

What other securities has a favorite recommendor recently recommended?

In researching a purchase or investment decision on an element, what do the popular magazines recommend about that element?

Prior developments in this field may be generally illustrated by reference to the following patent and product:

U.S. Pat. No. 5,132,899, Inventor: Fox, Phillip J., Date: Jul. 21, 1992

Stock and Cash Portfolio Development System—The system integrates three areas of data including investment performance for investment managers to generate a list of stock and cash position. Product: Hulbert Financial Digest newsletter publishes a summary of tracked results for portfolio performance of newsletters.

The Fox patent came up in a patent search because it was a computer-based application that included one or more databases about securities and about investment managers. Additionally, the end result of the Fox invention was a final report that included an investment recommendation. However, we found the Fox patent to be quite different than the present invention because the Fox patent generates a portfolio of securities and cash position, whereas one purpose of the current invention is to generate a report of the investment recommendations of a single security at a time. The invention report also optionally includes a summary of the reasoning for the recommendation, which the Fox patent was not intended to address at all. The invention report also optionally includes subsequent performance of the recommendations and sources of the recommendation. Finally, the current invention follows the recommendations made by financial magazines, online sources, and broadcast programs whereas the Fox patent had nothing whatsoever to do with the recommendations made by these sources, thereby resulting in a different invention.

The Hulbert product was identified as prior art because it rates the investment performance of a specific kind of published source. However, the Hulbert product is quite different in a few fundamental ways. The first is that the current invention is a computer-based application whereas Hulbert is not. Additionally, the Hulbert product does not allow for an interactive mode that allows the user to choose the element for which they want to view the recommendations of whereas the essence of the current invention does just that. Even if Hulbert were computerized, that product's focus is on the overall portfolio performance of a newsletter as contrasted to the current invention which is primarily focused on the performance of an individual security recommendation (primarily found in sources other than those followed by Hulbert) and the hierarchy of its recommendation sources (author, column, financial magazine, online sources, etc.).

There is no product similar to or the same as the invention using a computer system and algorithms to provide a security recommendation reporting system that is based on recommendations of securities in various published magazines, online sources, or broadcast programs.

OBJECTS AND ADVANTAGES

Accordingly, several objects and advantages of my invention are:

The invention can be used to answer the question: Can you still make money on a stock recommendation after it has appeared in a widely followed magazine or broadcast?

The invention can reveal the performance track record of sources—to aid in determining whom to follow or what strategy to follow.

With one click you can see the performance of other securities in the articles to see if the overall strategy of the article has paid off compared to the market.

The user saves time by getting, in one place, the summary of articles, from a large variety of sources, that are recommendations about the single element he or she is interested in.

The user gets more views, from quality sources, to corroborate other articles and understand more of the risks of the security they are interested in.

Furthermore these views are considered by some to be substantially less biased than opinions from brokerage houses that issue their own research reports. These brokerage houses are suspected of issuing favorable reports (and withholding negative recommendations) because they receive direct income from the investment banking business of the companies they cover and by churning the market of their retail customers thereby directly earning more brokerage transaction fees. Magazines and broadcast sources are generally thought to be unbiased.

Further objects and advantages of my invention are:

If you like an advisor, column or any source, with a single click you can see other recent recommendations by the same source.

The invention can help a user find advisors with pleasurable rides (those whose recommendations mostly stay above the initiation price) and avoid those with painful rides (those whose recommendations mostly stay below the initiation price). With advisors with high pain indexes, one could choose to follow them by taking the opposite investment action of what they recommend.

Users can be automatically notified of new recommendations by a strong performing stock picker mentioned in leading financial magazines or numerous other popular sources.

A user can see if a favorite advisor's key predictions about a company (i.e. will come out of a turnaround, will release a major new product, is a likely acquisition target, etc.) have come true in a reasonable time period.

Therefore this gives the user more of a reason to listen to this advisor when the advisor uses the same reason on another company.

The invention is a quick source of target prices for each security (from multiple sources) to help an individual in setting their target.

Researchers can look for and test particular general reasons and related variables which, if mentioned in an article, are hoped to have a relatively predictable effect on gains or losses, which can be exploited for profit.

Additionally, the invention could be utilized to display the recommendations of elements other than securities. For example, the system could display the recommendations for computer parts from well-respected computer analysts across a multitude of magazines, online sources, and broadcast media.

The invention could also report on the performance of securities that are merely mentioned in magazines, online sources, and broadcast media. As compared to reporting just the recommendations and the performance of these recommendations of securities, this feature would enable the user to see how well securities that were mentioned, and not necessarily recommended, in their favorite sources fared over time.

The reports that incorporate the performance of sources and performance of elements and securities provides a new tool to aid in the prediction problem (of which choices are likely to become successful) faced by many users who need to make investment decisions in rapidly changing markets.

Further objects and advantages of the invention will become apparent from a consideration of the drawings and ensuing description.

GLOSSARY

Action (Suggested/Implied for a security): The act of buying, selling or maintaining the status quo with respect to a security mentioned in the article. The acts of buying, selling and maintaining the status quo includes all common variations of these expressions such as "aggressive buy", "accumulate", "market outperform", "buy below $x (amount)", "hold", "short", etc. In cases where there is no fair interpretation from an article to buy or sell (that is, no reasonable action on the part of the reader can be implied or inferred), the action is treated as Neutral, which is the same as maintaining the status quo.

Action Date: The date a user could reasonably act on a recommendation made by a recommendation source.

Aggregated Performance: Results from the summation of the performance of a recommender or recommendation source divided by the number of recommendations that were accounted for in the summation.

Article: An essay, write-up, editorial report, feature or screen published in a magazine or on-line source, which mentions one or more recommendations. For broadcast media, this is a named segment or feature of a program.

Article Summarization: Brief synopsis of the article, broadcast program, or online column.

Bearish Reasons: The terminology in a report represents recommendations with negative advice or outlook.

Bullish Reasons: The terminology in a report represents recommendations with positive advice or outlook.

Column: A regular column featured periodically in a respective magazine. For example, Street Smart in Smart Money, Wall Street Newsletter in Money, Jim Jubak's column in Microsoft Investor online.

Data Storage Means: Refers to any logical structure or program, whether custom or commercial, implemented on computer hardware, to store data. Well known data storage means include relational databases (such as MS-Access, SQL Server, DB2, Oracle and Sybase), object oriented databases, network databases, flat text files, linked or indexed text strings embedded within a program or a file, and tables.

Date Identification: Includes a mode of identifying a recommendation source to a particular or exact period of time either by an explicit date or by identification numbers signifying the hour, minute, second, month, date, year, volume, issue. Date identification types include the date of article, date of publication, date of issue, date of first availability or date of dispatch. The time of day is an optional date identification.

Element: One item from a list of items within a specific subject.

Element Identification: A means within the system to uniquely identify each element. These means include a common name or formal name, a product number, a part number, a make and model, and a location.

Exit Style: The optional time or event, which suggests exiting out of the security, such as setting a stop 10% below your purchase price, or exiting when the price rises to "fair value."

Hierarchy of a Recommendation Source: The semantic and logical relationship between the identification layers of recommendation sources associated with a recommendation. The minimum layers are:
  a. name of the recommendation source
  b. issue
  c. article
  d. recommendor Additionally, in the investment world, there may be more layers. One such example is the investment style.

Initiation price: The price at which the reader/investor of a magazine or other source could have reasonably first acted upon the particular recommendation, usually the open or close of the next trading day. For example, an issue of Business Week is received on Friday, Nov. $21^{st}$, 1997, having various recommendations. One of the recommendations is to buy IBM. The closing price of IBM on Monday, the action date, which is the next trading day, is the initiation price.

Investment Style: The short name for an investment strategy, ideology or theory that reasons the selection of a security. Examples of investment styles include Value and Growth.

Issue: An issue is a particular magazine identified by its volume number or published date or a page on an on-line site identified by the date it is first accessible, or the date and time of a broadcast program. For example, Barron's Nov. 3, 1997, Smart Money November 1997, Microsoft Investor online Dec. 11, 1997, and 60 Minutes Feb. 1, 1998 6:00 pm.

Item: An item is what the user using a selection means selects. This can include a security, an element, a recommender, and a recommendation source.

Link/s: The link is a logical association of an index between two tables. For instance Table 1 of articles contains an index field called articleID and table 2, Article Authors, contains two indexes, an articlID and an authorID. The link between these two tables is the articleID index field.

Magazine: Any published periodical source or on-line information site. In the investment world the periodical published source or on-line information site related to the financial and investment world can include Money, Smart Money, Barrons, Forbes, The Hulbert Financial Digest, The Chartist, Fidelity Monitor, Business Week, Worth, etc. . . . and on-line investing sites that have articles with investment recommendations, like Momingstar.net, Microsoft Investor, and TheStreet.com, etc. . . . . .

Manipulation: Any of the processes run by an algorithm to retrieve, store, relate, screen, match or output data from the tables in the databases.

Mention source: Includes Magazines, Columns, Online sources, Broadcast programs, Newsletters, Digests, Issues, Articles, Authors, Advisors, and Columnists that mentions (i.e.-references, talks about, refers to, lists, or recommends) an element or a security.

Organization name (reference to Recommendor): Is the name of the firm where the recommender is employed, the recommendor's newsletter, or recommendor's fund, a fund managed by the recommender, firm owned by the recommender and the like.

Pain Index: A proprietary index that attempts to numerically describe the stress and unpleasantness if you had followed a recommendation. E.g. In the recommendation referred to in the article "Target Price", The price of Zoltek fell to $50 on Tuesday, $48 on Wednesday, $46 on Thursday or $40 one month later.

Reasons: Logical, fundamental and or technical factors, facts, opinions, judgements, views, and thoughts in support of a recommendation. In the investment world some reasons can focus on a company in any of its facets, like its products, its competitors, its industry, its performance, its management, its employees, its policies, its future expectations, its relation to government, its stock price, and its securities.

Recent Price: The price of the security as mentioned in the article, closest to the writing or publishing of the article, always a date before the receipt date or publication dates. E.g. Zoltek: A giant among small caps, article in Business Week of Sep. 29$^{th}$, 1997, recommends Zoltek (security name). The article states $53 as the price on Sept. 16, 1996.

Recommendation: The bottom line word or phrase that, with respect to an element such as a stock, gives the advice, praise, caution, warning, or commendation that is either stated or implied by a recommendation source. These can generally be classified into three categories 1. positive
2. negative
3. neutral The positive recommendations are typically translated from a word or phrase such as buy, bullish, bet on it, best bets, purchase it, good buy, pick, strong interest, some interest, five star (if five star is the best in the ranking system used), editor's choice, positive outlook, passes a selective screening, hot and aggressive buy. The negative recommendations are typically translated from a word or phrase such as don't buy, sell, don't bet on it, don't purchase it, not a good buy, bearish, pan, one star (if one star is the worst in the ranking system used), negative outlook, and short. The neutral recommendations are typically translated from a word or phrase such as hold, neutral, no interest, and not rated.

Recommendation capsule: The entire conceptual capsule that encompasses: an element, such as a security, mentioned in a recommendation source in a manner where a recommendation is stated or can be inferred, linked together with the hierarchy of its recommendation source, the reasons and any optional information the invention links to a recommendation.

Recommendation source: Includes Magazines, Columns, Recommendors, Online sources, Broadcast programs, Newsletters, Digests, Issues and Articles.

Recommendor: One or more person/s writing the article as author, editor or any other person referred to in the article as an authoritative source, like Analyst, Broker, Trader, Strategist, Economist, Money Manager, Portfolio Manager, Fund Manager, Editor, Consultants; with or without their quotes, view points, or thinking. . E.g. Jim Jubak, author of Going by the Books in Microsoft Investor, Jun. 10, 1997, Bruce Upbin in Computers: the earnings outlook in Forbes, Dec. 16, 1996; Gene G. Marcial in Could Ivax get swallowed? In Business Week, Oct. 2, 1995.

Report: A final summary, whether displayed or printed, generated by the system for an element such as a security, magazine, column, recommender, or recommendation source on a stand alone basis or in conjunction with one or more of these. E.g. Report for (IBM) security. Report for (Business Week magazine) recommendation source. Report for (Wall Street Newsletter column) recommendation source.

Sections of a Report: Includes columns, fields, rows, areas, headers, footers, paragraphs, etc. . . . of a report that store and display the items found within a report.

Security: Any company or investment vehicle that can include stocks, ADRs, Debentures, Convertibles, Units of Mutual Funds, Bonds, Warrants, Options, Futures, Partnerships, REITs, etc.

Security Identification: A means within the system to uniquely identify each security. These means include a ticker symbol, a company name, a CUSIP, or a proprietary master index of securities.

Smile Index: A proprietary index that attempts to numerically describe the pleasantness of each of the recommendations stored in the data storage means. E.g. In the recommendation referred to in "Target Price", The price of Zoltek rises to $55 on Tuesday, $58 on Wednesday, $60 on Thursday or $70 one month later. The index reflects the twin properties of time and rise in price for say 3 days, 5 days, 7 days etc.

Stop Code: The time or event that should put the investors/reader on alert.

Support Data (for article/for security): A proprietary codification for the level of fundamental, technical, analytical or other factual data supporting the hypothesis or the theme of the article leading up to the element such as a security, would be support data for Article.

A proprietary codification for the level of fundamental, technical, analytical or other factual data for an element such as a security, would be Support Data for Security.

Table/s: A Table is a type of data storage means, which consists of a logical organization of records relating to a particular concept. Examples are a table for Securities for recommendors, or a table that links recommendors to a security they have recommended. Each record consists of one or more fields, and data that pertain to that record. Columns to the table correspond to each field.

Target Price: The price a security is expected to reach at the end of a specified or unspecified time frame; or "should be" worth at present time (Different than the recent time). Mentioned in the article. E.g. Zoltek: A giant among small caps, article in Business Week of Sep. $29^{th}$, 1997, recommends Zoltek (security name). The article states, a recommender, Lawson, stating the price will hit $75 in a year.

Target Date: The particular time frame or date at the end of the time frame mentioned in the article, with reference to the price of the security in future time or present date if reference is to the worth of the security now (This is differentiated from present price). E.g. Zoltek: A giant among small caps, article in Business Week of Sept. $29^{th}$, 1997, recommends Zoltek (security name). The article states, a recommender, Lawson, stating the price will hit $75 in a year, the date would be Sept. $28^{th}$, 1997.

Target Percentage: The difference between the recent price and the target price (including or excluding other intermediate returns) in percentage.

Tone for recommendation: A proprietary codification for the level of enthusiasm for a recommendation for an element such as a security, in the article. Or it refers to a screen, which is a list of elements such as securities generated by applying a single or a set of criteria's, taken simultaneously or in a sequence, to a universe of elements such as securities

SUMMARY OF INVENTION

The invention utilizes a computer apparatus to automatically generate displays or reports containing security and element recommendations along with an optional summarization of the reasons for the recommendation from magazines, online sources, and broadcast programs for one specific security or element at a time or one specific recommendation source at a time selected by a user. Also, a performance ranking of each recommendation source may be optionally included on the report.

DRAWINGS AND DESCRIPTION OF PREFERRED EMBODIMENT

Brief Description of Drawings

The Invention can be summarized in three figures (FIG. 1, FIG. 2, and FIG. 3), which explain the schematic working of the system.

FIG. 4, which is most illustrative of the essence of the patent, illustrates the report that displays items of the recommendation capsules for the security selected by the user.

FIG. 5 illustrates the report that displays items of the recommendation capsules for the security selected by the user. Additionally it displays the performance rating of the recommendors recommending the security.

FIG. 6 illustrates the report that displays items of the recommendation capsules for the security selected by the user along with performance rating of the recommendors recommending the security. Additionally it displays the target data of the recommendation, code, and page number, exact URL, or show time.

FIG. 7 illustrates the report that displays the recommendations of the recommender selected by the user.

FIG. 8b illustrates the report that displays the aggregated and averaged performance of the recommender selected by the user for predetermined date ranges along with other aggregated and averaged performance variables for the same predetermined date ranges.

FIG. 8c illustrates the report that displays the aggregated and averaged performance of each recommendation made by the recommender selected by the user for predetermined date ranges. Additionally, items of the recommendation capsule are included.

FIG. 9a illustrates the report that displays the aggregated and averaged performance of the recommendation source selected by the user for predetermined date ranges.

FIG. 9b illustrates the report that displays the aggregated and averaged performance of the recommendation source selected by the user for predetermined date ranges along with other aggregated and averaged performance variables for the same predetermined date ranges.

FIG. 9c illustrates the report that displays the aggregated and averaged performance of each recommendation made by the recommendation source selected by the user for predetermined date ranges. Additionally, items of the recommendation capsule are included.

FIG. 10b illustrates the report that displays the aggregated and averaged performance of the recommendation source selected by the user for predetermined date ranges along with other aggregated and averaged performance variables for the same predetermined date ranges.

FIG. 10c illustrates the report that displays the aggregated and averaged performance of each recommendation made by the recommendation source selected by the user for predetermined date ranges. Additionally, items of the recommendation capsule are included.

FIG. 11a illustrates the report that displays the aggregated and averaged performance of the recommendation source selected by the user for predetermined date ranges.

FIG. 11b illustrates the report that displays the aggregated and averaged performance of the recommendation source selected by the user for predetermined date ranges along with other aggregated and averaged performance variables for the same predetermined date ranges.

FIG. 11c illustrates the report that displays the aggregated and averaged performance of each recommendation made by the recommendation source selected by the user for predetermined date ranges. Additionally, items of the recommendation capsule are included.

FIG. 12 represents the security selection screen that allows a user to select the security for which they wish to view an invention report for.

FIG. 13 represents the recommender selection screen that allows a user to select the recommender for whom they wish to view an invention report for.

FIG. 21 is a schematic flowchart depicting the generation of the report in FIG. 9a, FIG. 10a, and FIG. 11a.

FIG. 25 illustrates the evolved data capture form for the recommendation capsule and the desired additional variables currently being input into the system.

FIG. 36 is a schematic flowchart depicting the calculation and generation of the Recommendor Benchmark Aggregated Performance data set.

FIG. 47 illustrates the report that displays items of the recommendation capsules for the element selected by the user.

FIG. 49 illustrates the report that displays items of the mentions made by a source selected by the user. Additionally it displays the performance rating of the authors, columnists, magazines, online sources or columns mentioning the security.

FIG. 50 illustrates the report that displays items of the mentions for a security selected by the user. Additionally it displays the performance rating of the authors, columnists, magazines, online sources or columns mentioning the security.

FIG. 51 illustrates the report that displays items of the mentions for an element selected by the user. Additionally it displays the performance rating of the authors, columnists, magazines, online sources or columns mentioning the element.

Figure 1:
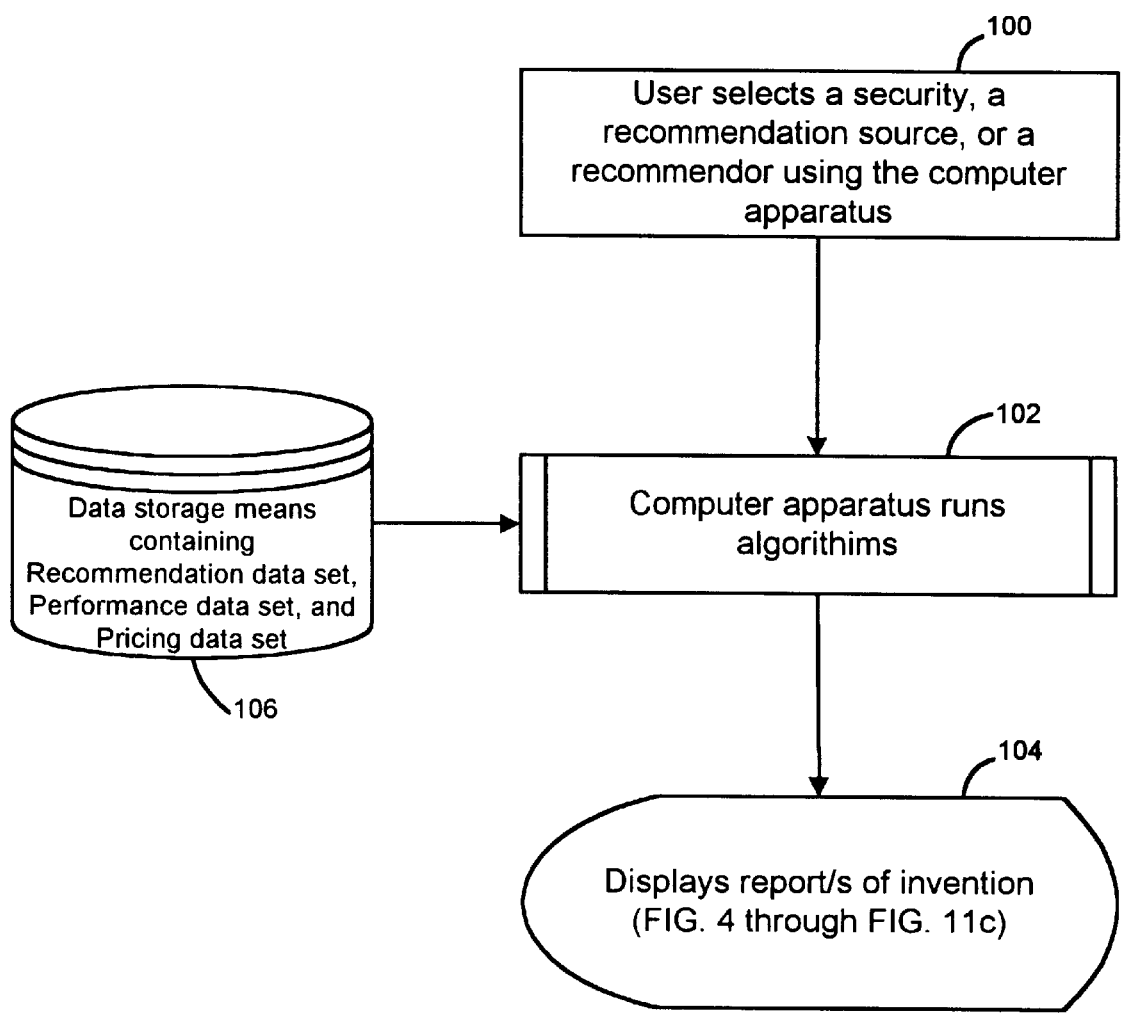
FIG. 1 is a schematic flowchart depicting the process by which the invention reports are generated based on a selection by the user for the report desired and based on the information stored within the computer apparatus.

A typical embodiment is described in the following section:

DESCRIPTION OF A PREFERRED EMBODIMENT

The detailed description of the FIG.s explain the nuances, sophistication and uniqueness of the invention. The system allows report generation independent of the means by which the data was input into the system. However, we have out of necessity created an optional system to capture the data required for the reports and to calculate the performance variables associated with the recommendations and recommendation sources (see "Origin of the Recommendation Data Set" and "Origin of the Performance Data Set" for more detail which is located at the end of the Specification section). Had there been an outside source for this information we could have utilized it to generate the invention reports in the same unique way.

In the drawings, closely related FIG.s have the same number but different alphabetic suffixes.

Simplified Overview Flowchart

FIG. 1 describes, in a macro sense, how the system generates the invention reports based on the selection made by the user regarding the report they wish to view (box 100) and the information stored in the computer apparatus utilizing a data storage means (box 106). The data storage means we have chosen to utilize are multiple Microsoft Access databases The relational database structure inherent in a Microsoft Access database allows the storage of up to 1.0G of information in multiple tables, and a system may employ multiple databases. In a relational structure, information is more easily maintained and can be flexibly designed to more easily create special reports. However, it is important to note that the database we have chosen to use is not the only data storage means available or desirable. For example, the information required to generate the reports could be found within a simple text file, a non-relational database structure, and other relational database sources such as Oracle, SQL Server, DB2, etc. . . . . Also, the data sets that we have created, that are stored within the data storage means, are in no way the only data sets that could have been created. For example, the Performance Data Set could have been combined with the Recommendation Data Set to form one Data Set. Or, the designer of the Data Sets could have created more than two Data Sets to store the necessary information. In either case the point still remains that the structure of the Data Sets is not important to the generation of the invention reports.

The computer apparatus mentioned throughout the patent is a personal desktop computer. It has 6.0 gigabytes of hard drive space and 32 megabytes of RAM memory. Additionally, the computer apparatus has a Pentium 200 MHz processor, and is running the Windows 95 operating system.

The processing of the information occurs when the computer apparatus retrieves the required informational variables and applies multiple algorithms (box 102) that organize the information for final display on the invention reports. The final step is the generation of the invention reports (box 104) in the desired format based on the selection made by the user. The reports will provide the user with important and unique information about recommendations made regarding the element, such as a security, that they are researching.

Overview of Data Sources Flowinq into the System

When the invention of the reports was first conceptualized, a source for the information required, more specifically the Recommendation Data Set (FIG. 26), was not available. Hence, an optional means to capture and store such information was needed. At this time we devised a data capture system and data entry system that would provide our invention reports with the necessary information to make them unique and most helpful to investors. The information found within the Recommendation Data Set is critical to the invention reports but its means of capture and calculation is not.

Figure 2:
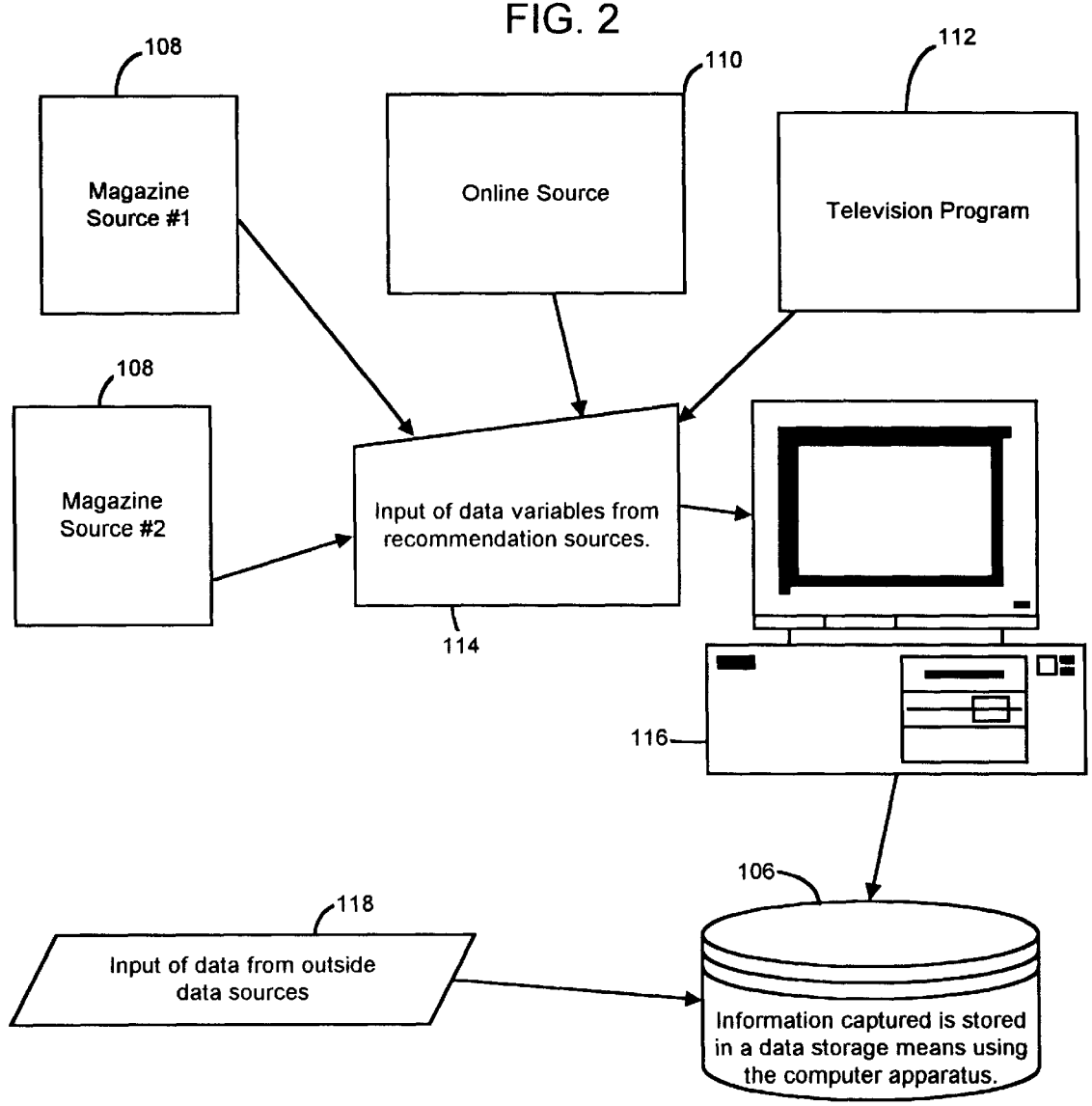
FIG. 2 is a schematic flowchart depicting the process by which the information subsets are optionally input and stored in the computer apparatus.

The information being displayed on the invention reports can be input into the system from multiple sources and stored in three different data sets (grouped by logically related data) within the data storage means. FIG. 2 displays where the information is input from, the process, in a macro sense, by which that information is input into the computer apparatus, and broadly where the information is stored.

Due to the multitude of magazines, on-line sources, and broadcast media programs available, our efforts, initially, have been focused on some of the most popular members of each group. Box 108 in FIG. 2 illustrates the financial magazines we have decided to capture security recommendations from. The universe we have chosen to initially cover includes Money, Smart Money, Forbes, Barrons, Business Week, Worth, Bloomberg Personal, and The Wall Street Journal.

Box 110 in FIG. 2 illustrates some of the on-line sources we have decided to capture recommendations from. An on-line source is a web site that is located on the World Wide Web. A portion of the universe we have chosen to cover includes Microsoft Investor.

Box 112 in FIG. 2 illustrates the broadcast programs we have chosen to capture recommendations from. A portion of the universe we have chosen to cover includes CNN Financial News.

There are numerous other recommendation sources that exist but we happen to be regular followers of many of the above sources. In other words, we were most interested in summarizing the recommendations made by these recommendation sources and tracking the performance across multiple variables to see if we could truly invest in their recommendations and make money.

In the data entry means we have designed (see the section "Origin of Recommendation Data Set" for more detail), each of the recommendations, along with the multitude of variables we were interested in, were input (FIG. 2, box 114) into the computer apparatus (box 116) utilizing the Access database mentioned above.

This process could either be manually completed or automatically completed. This information is then stored in the data storage means (box 106) where it is accessible to the computer algorithms that will be run in order to associate the appropriate variables, depending on the report the user desires to view, and prepare the variables for final display on the invention reports. At the current time we have input and analyzed over 10,000 recommendations made by the various recommendation sources chosen from the universe consisting of financial magazines, on-line sources, and broadcast programs.

The automatic entry of information could be completed by integrating (such as by importing or attaching) a pre-existing data set into the data storage means that is used to provide the variables for calculation and display on the invention reports.

The recommendations and the additional variables related to the recommendations are not the only data stored in the data storage means (box 106). We have accumulated pricing data for 15,000 securities dated as far back to Jan. 1, 1995 from an outside vendor called Dial Data of N.Y., NY. This pricing data will allow us to statistically analyze the price performance of the recommendations, recommendation sources of the recommendations, and related variables of interest such as the investment style of the recommendations. The recommendation sources mentioned in the previous sentence is referred to as the hierarchy of recommendation sources which includes but is not limited to magazines, online sources, broadcast media, articles, columns, and recommendors. The information being input into the data storage means (box 106) from Dial Data is illustrated in box 118.

Multiple Users Accessing the System

Figure 3:
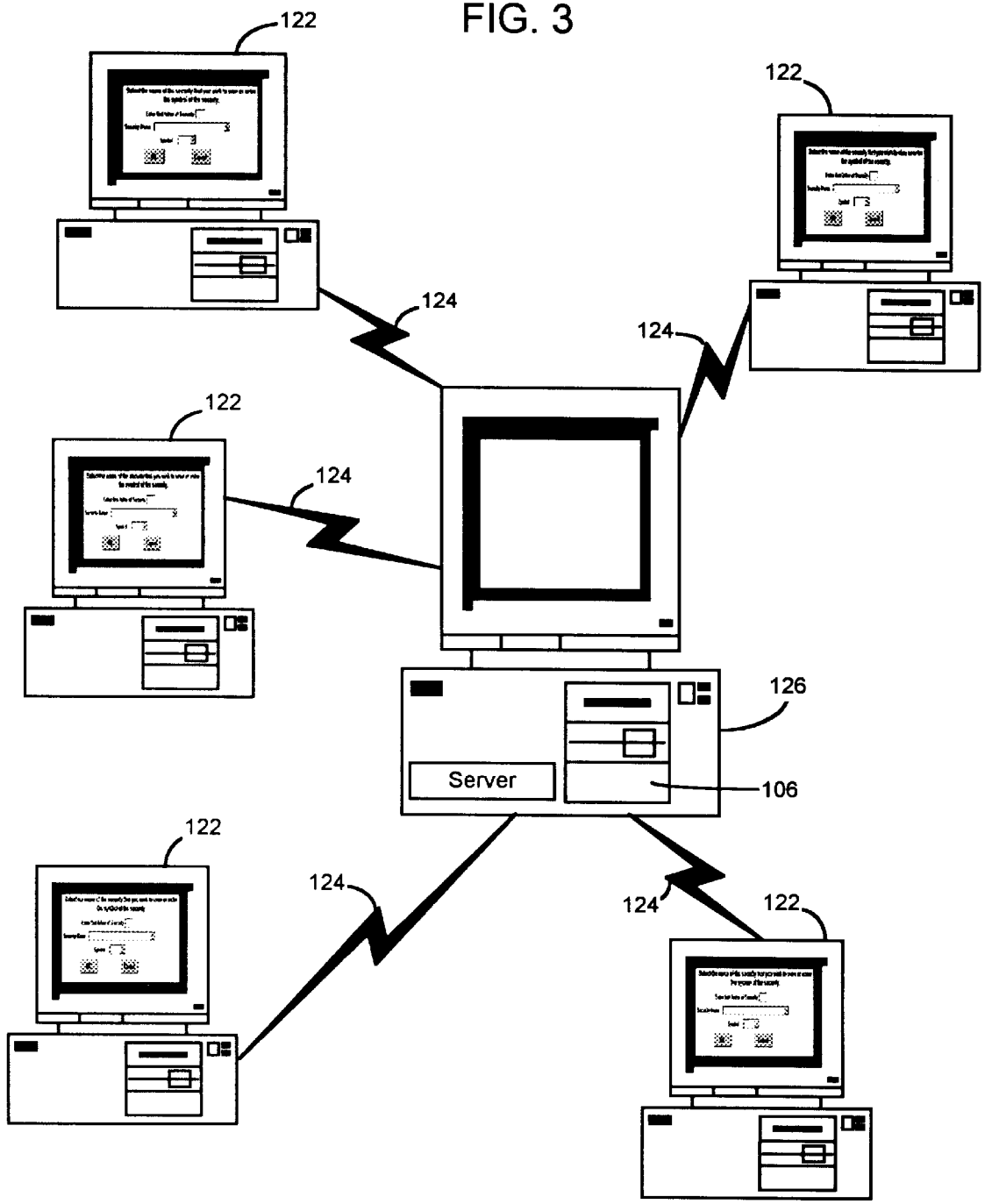
FIG. 3 is a schematic overview of how the system is accessible to individual users via an Intranet, Internet, World Wide Web, Local area network, and Wide area network.

FIG. 3 illustrates how the system can be accessible to individual users via an Intranet, Internet, World Wide Web, Local area network, and Wide area network. The individual users (FIG. 3, boxes 122) will be faced with multiple ways in which they can access the unique information being displayed on the invention reports. Along with the universe of accessibility options mentioned above, a user could also access the system via a standalone product.

The five ways highlighted above, which are outside the standalone arena, will access a server computer apparatus (box 126) which will have the data storage means (box 106) within its system that stores the information that is needed for the display of the invention reports. The requests by the user will be sent over the network or web of computers, whose structure will vary depending on which means are used to retrieve the reports, and processed by the server.

Boxes 124 illustrate that the requests will be transmitted from the individual users to the server computer apparatus. The moment the requests reach the server, the algorithms, which are programmed into the computer apparatus, will retrieve the required information and transmit the final invention reports back to the individual users utilizing the means illustrated by boxes 124. Each individual user receives the report they requested and can now use that information to make a more informed decision.

The reports of the system are illustrated in FIG. 4 through FIG. 11c. Each report is customized based on the user's request.

Report of Recommendation Capsules for a Security

Figure 12:
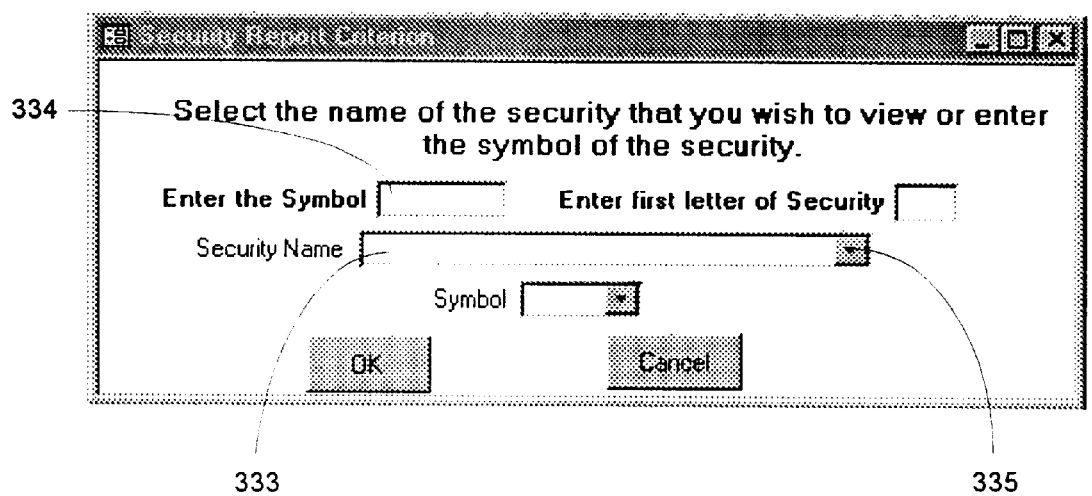

FIG. 4 illustrates a report that is generated when a user selects a security using a security selection means (FIG. 12). The user can access the report using one of the universe of techniques that include the following:

a) entering the company name they wish to view the recommendations of (FIG. 12, box 333)

b) entering the ticker symbol of the security of interest (box 334)

c) select the company name from the list provided in the drop down box or list box (box 335)

d) hyperlink to the security's report if the environment the user is operating in utilizes and supports hyperlinks.

The security is an item that is selected by the user using the security selection means. As will be discussed in the reports that follow, an item can referred to in alternative ways. An item can be a recommender, if the selection means was a recommender selection means. An item can be a recommendation source, if the selection means were a recommendation source selection means. And, the item could be an element, if the selection means were an element selection means. In either case, the item is what the user using a selection means selects.

The report displays the recommendations of the security over a predetermined date range from the universe of recommendation sources in the Recommendation Data Set. As stated above the recommendation sources include but are not limited to magazines, online sources, broadcast programs, columns, articles, and recommendors. The predetermined date range that we have arbitrarily selected is a one-year time frame.

We have chosen this time frame due to the fact that the number of recommendations made by a recommendation source was at a reasonable level for this date range. A longer time frame may have overwhelmed the user. This means that any predetermined date range could have been selected, we have simply chosen this date range for reasons of display purposes.

Figure 14:
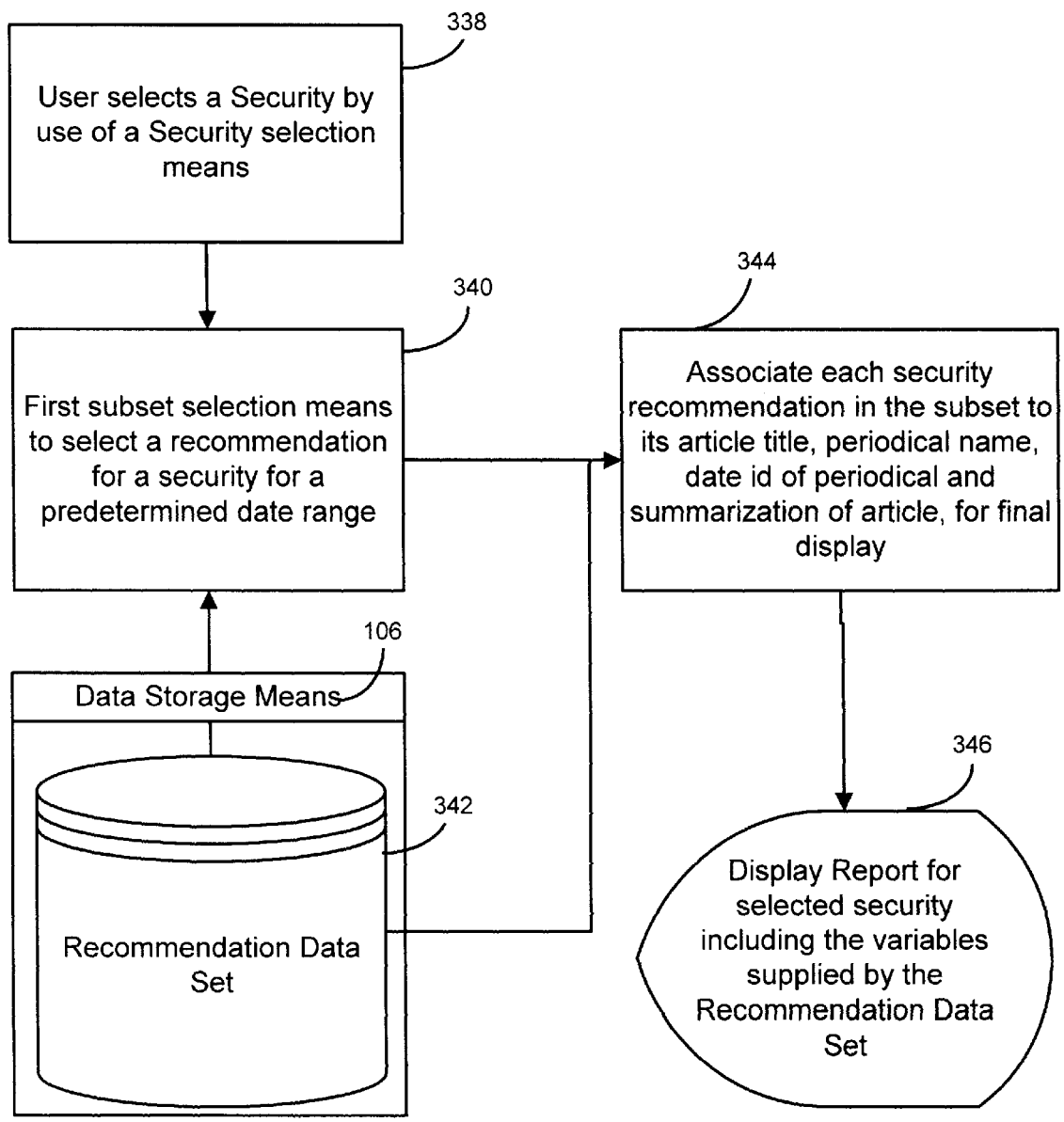
FIG. 14 is a schematic flowchart depicting the generation of the report in FIG. 4. It begins with the user selection through the final display of the report.

To better understand how the information is queried, processed, and finally displayed on the report in FIG. 4 we turn to FIG. 14. FIG. 14 is the flowchart to produce a report of recommendation capsules for a security, when the user submits their request. As stated before, the user selects a security by use of a security selection means (FIG. 14, box 338). The computer apparatus then processes the request utilizing the programmed algorithms to construct the first subset of information. This first subset consists of the recommendations for the security selected for the predetermined date range (box 340). This information is queried from the Recommendation Data Set (box 342) which is stored in the Data Storage Means (box 106). The Recommendation Data Set stores the information related to the recommendation capsules and the recommendation sources (for more detail on the Recommendation Data Set see "Origin of the Recommendation Data Set" which is located at the end of specification section in the section labeled "Origin of the Recommendation Set").

In the current embodiment the computer apparatus utilizes a Microsoft Access select query to construct this first subset. Through the utilization of criteria based upon the selection of the user the select query is able to retrieve just the recommendations for the security chosen for the predetermined date range. For example, if a user enters the ticker symbol WDC, the computer apparatus will retrieve from the Recommendation Data Set the recommendations captured for Western Digital (WDC). The first subset will consist of the unique ID number of the recommendations found within the Access database. This ID number will allow the association of the remainder of the variables that were captured along with the recommendation.

Box 344 illustrates the association of the variables with their respective recommendation capsule variables. These variables include the title of the article, column, or show in which the recommendation was made, the financial magazine name, on-line source name, or broadcast program name in which the article, column, or show was found, date ID of the financial magazine (which may optionally include the time of day), on-line source, or broadcast program, and the summarization of the article, column, or show. Box 344 organizes the variables and prepares them for final display on the invention report. Once again the current embodiment utilizes a Microsoft Access select query to accomplish this processing step. Using the unique recommendation ID from the first subset generated, the select query is able to link to the additional variables needed for the report via that recommendation ID. The report is then displayed to the user (box 346).

As stated in the prior sentence, the final step of the processing as illustrated in FIG. 14 is the display of the report as seen in FIG. 4. It is organized in such a way that the information requested by the user is easy to read and is useful in helping make an investment decision. The items within the report are displayed in sections of the report. A section of a report can be basically defined as a column, row, field, etc. . . . within a report that displays the items found within that report. Box 132 in FIG. 4 identifies the name of the security as selected by the user along with its ticker symbol. This could have been displayed with just the company name and conversely with just the ticker symbol. However, we felt it provided the user with more information with both the company name and ticker symbol. Box 130 identifies a column that contains the recommendation source. On this report it includes the following variables:

a) Box 138 identifies the financial magazine name, the on-line source name, or the broadcast program name.

b) Box 136 identifies the date ID of financial magazine, on-line source, or broadcast program which identifies the date of publication, column release, or show time c) Box 140 identifies the magazine article name, on-line source column name, or the broadcast program show name.

d) Box 142 identifies the recommender name.

Box 134 is a column that contains the optional summarization of the financial magazine article, the on-line column, or the broadcast program show. The summarization highlights the positive, negative, and neutral points that were made when referring to the recommendation made.

FIG. 4, boxes 133 illustrate the recommendation made by the recommendation source. In this report, the recommendation appears as either bullish or bearish. However, the verbiage used to describe the recommendation can vary. For example, the report could have displayed the recommendation as pick and pan or buy and sell. The way in which the recommendation is worded is not important, it is the fact that a recommendation was made that does.

Report with Performance Ratings

FIG. 5 illustrates a report that is generated when a user selects a security using a security selection means (FIG. 12) in the same fashion as described in FIG. 4. The report displays the recommendations of the security over a predetermined date range from the universe of recommendation sources we have researched along with the individual performance rankings for each recommender mentioned in the article. The performance ranking is processed before the processing of the user request and generation of the report and is calculated over a predetermined date range (see "Origin of the Performance Data Set" for more detail which is located at the end of the specification section under the heading "Origin of the Performance Data Set").

Again, it is important to note that the Performance Data Set can be combined with the Recommendation Data Set to form one Data Set that includes at least one item from the recommendation capsules along with the performance statistics. The two data sets were utilized to take advantage of the optimum flexibility when querying the information required for the reports. However, if the desire was to increase the speed of the querying of the required variables, one Data Set, that includes both the recommendation capsules and the performance statistics, can be used.

Figure 15:
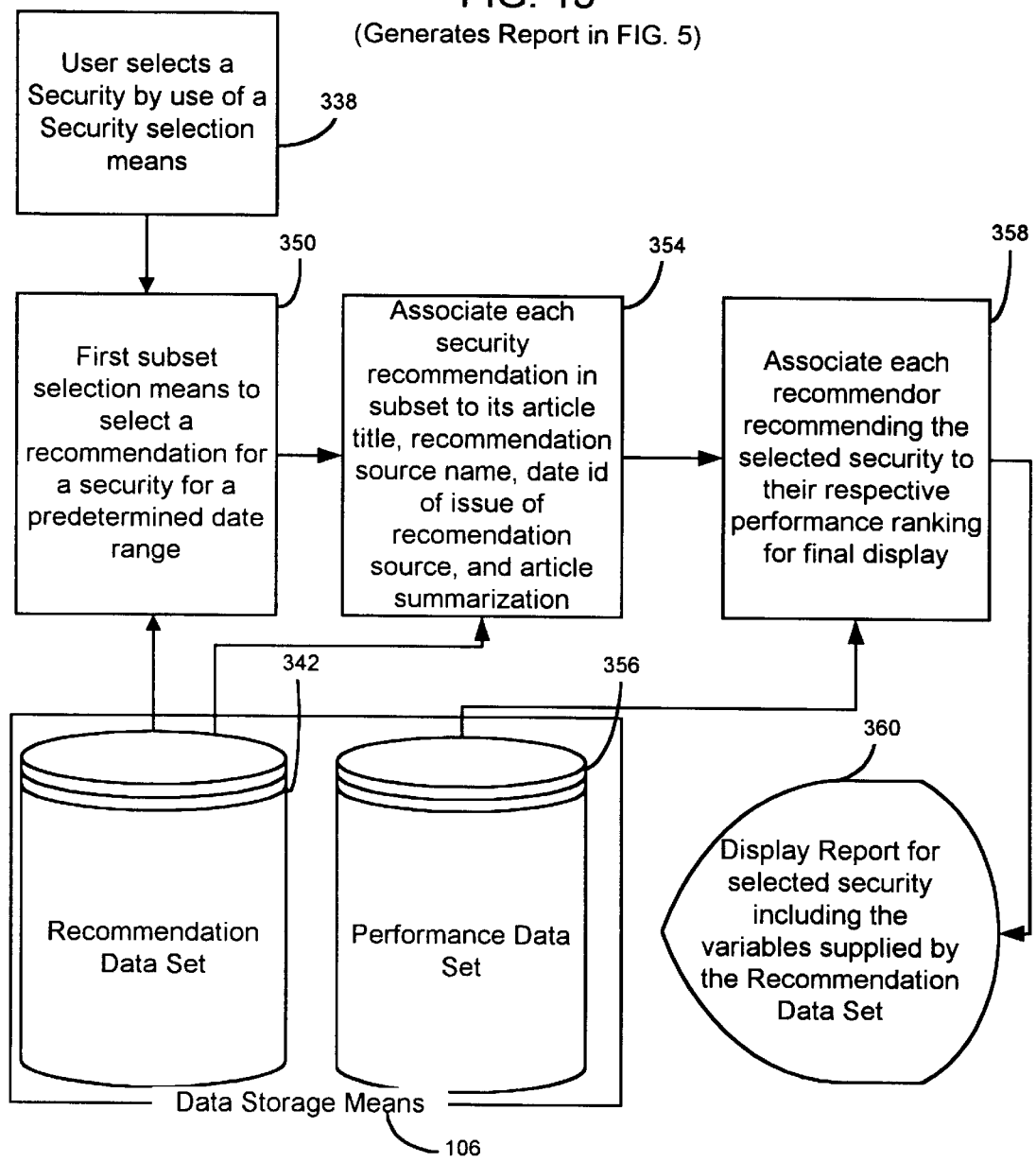
FIG. 15 is a schematic flowchart depicting the generation of the report in FIG. 5. It begins with the user selection through the final display of the report.

To better understand how the information is queried, processed, and finally displayed on the report in FIG. 5 we turn to FIG. 15. This illustrates the schematic flow of information when the user submits their request for the report desired. A user selects a security by use of a security selection means (box 338). The computer apparatus then processes the request utilizing the programmed algorithms to construct the first subset of information. This first subset consists of the recommendations for the security selected for the predetermined date range (box 350). This information is queried from the Recommendation Data Set (box 342) which is stored in the Data Storage Means (box 106). (In the same manner as described in FIG. 14) The first subset will consist of the unique ID number of the recommendations found within the Access database that meets the selected criteria. This ID number will allow the association of the remainder of the variables that were captured along with the recommendation.

Box 354 illustrates the association of the variables with their respective recommendation capsule variables. These variables include the title of the article, column, or show in which the recommendation was made, the financial magazine name, on-line source name, or broadcast program name in which the article, column, or show was found, date ID of the financial magazine, on-line source, or broadcast program, and optionally, the summarization of the article, column, or show. Box 354 organizes the variables and prepares them for the final processing of the information and the association with the performance rankings of the individual recommendors. (In the same manner as described in FIG. 14)

Box 358 illustrates the step that associates each recommender, who has recommended the security selected by the user, with their respective performance ranking. The performance ranking information is queried from the Performance Ranking Data Set (box 356) through a select query. (In the same manner as described in FIG. 14) This information is organized together and prepared for final display on the invention report. The report is then displayed to the user (box 360).

As stated in the prior sentence, the final step of the processing as illustrated in FIG. 15 is the display of an invention report as seen in FIG. 5. It is organized in such a way that the information requested by the user is easy to read and is useful in helping make an investment decision. The user is also supplied with some insight as to whether or not the security they have selected was recommended by recommendors who have performed well based on past recommendations that were captured and analyzed. This provides an additional, unique piece of information that a user can utilize when researching a security. Box 132 identifies the name of the security as selected by the user along with its ticker symbol. Box 130 identifies a column that contains the recommendation source. On this report it includes the following variables:

a) Box 138 identifies the financial magazine name, the on-line source name, or the broadcast program name.

b) Box 136 identifies the date ID of financial magazine, on-line source, or broadcast program. This indicates the date of publication, column release, or show.

c) Box 140 identifies the magazine article name, on-line source column name, or the broadcast program segment name.

d) Box 142 identifies the recommender name.

e) Box 156, which is the highlight of this report, identifies the individual recommender performance ranking. We have chosen to show the performance rating as a graphic symbol. However, the rating could easily have been presented as a number, letter or text designating a ranking.

Box 134 identifies the optional summarization of the financial magazine article, the on-line column, or the broadcast program show. The summarization highlights the positive, negative, and neutral points that were made when referring to the recommendation made.

FIG. 5, boxes 133 illustrate the recommendation made by the recommendation source. In this report, the recommendation appears as either bullish or bearish. However, the verbiage used to describe the recommendation can vary. For example, the report could have displayed the recommendation as pick and pan or buy and sell. The way in which the recommendation is worded is not important, it is the fact that a recommendation was made that does.

Report with Additional Data

FIG. 6 illustrates a report that is generated when a user selects a security using a security selection means (FIG. 12) in the same manner as described in FIG. 4. The report displays the recommendations of the security over a predetermined date range from the Recommendation Data Set. The report also includes individual performance rankings for each recommender mentioned in the article.

Additionally, the report includes three value-added variables. The first (FIG. 6, box 168) is the page number of the article, exact URL of the on-line column, or the broadcast network of the broadcast program segment. By providing this information, we are better servicing the user due to the fact that they can now go directly to the source of the information and view it for themselves. This will decrease the amount of time that the user has to conduct additional research. If they are interested in viewing the source of the recommendation further we've done 75% of the legwork for them.

The second additional variable (box 176) that this report offers is what is called the "Code". It consists of information that gives additional insight as to how detailed the article, column, or show was and how long it was. This provides yet another way for us to statistically analyze the recommendations and another way for the user to better understand the source and detail from which the recommendation was made.

The third (box 161) is the target data information. This includes the price that the recommender or recommendation source predicted the price of the security selected would reach and the date that this price would be realized, in their opinion. This provides the user with valuable information as to what they might expect to gain or lose from the recommendation of the recommender and the recommendation source.

Figure 16:
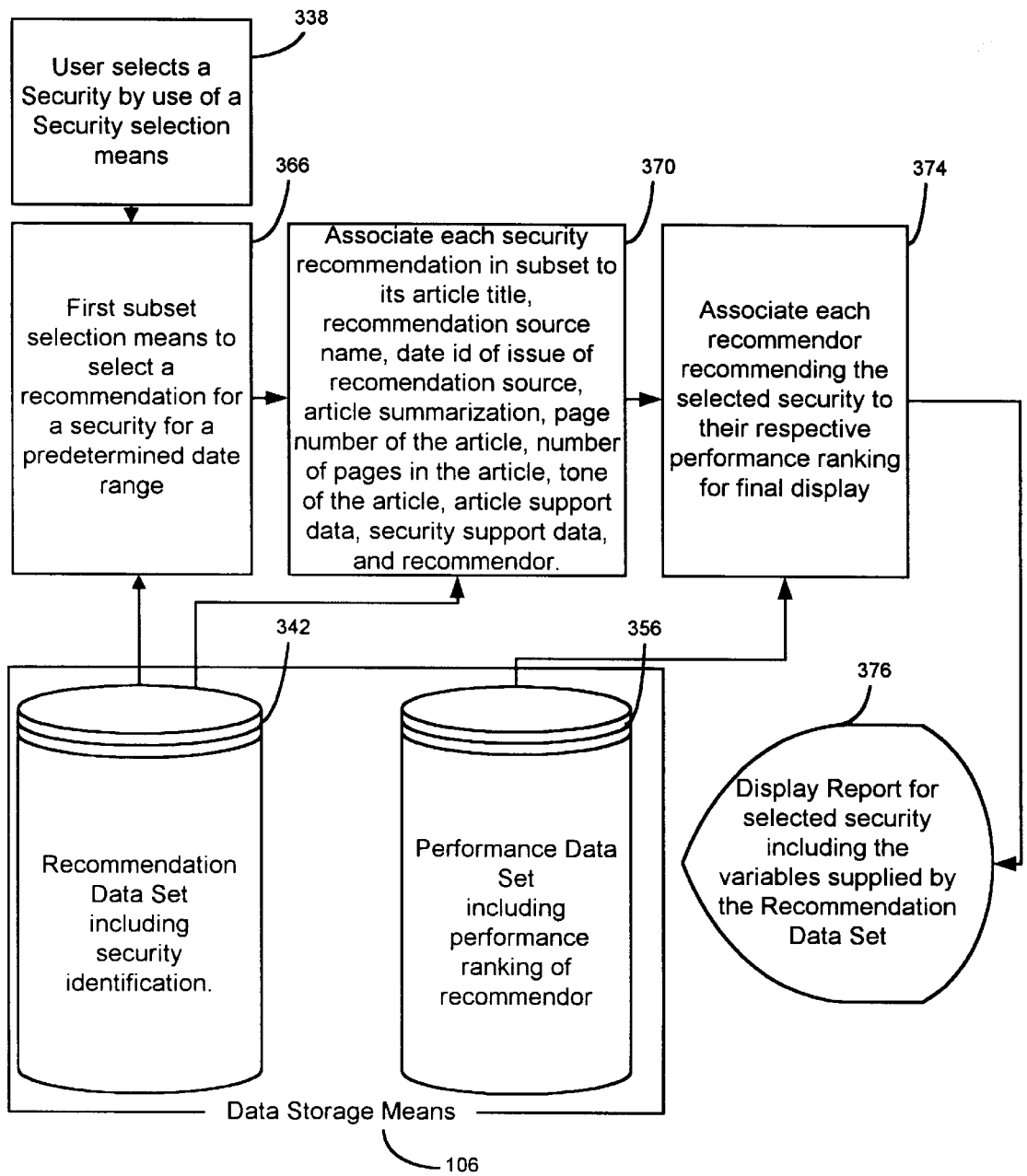
FIG. 16 is a schematic flowchart depicting the generation of the report in FIG. 6. It begins with the user selection through the final display of the report.

To better understand how the information is queried, processed, and finally displayed on the report in FIG. 6 we turn to FIG. 16. This illustrates the schematic flow of information when the user submits their request for the report desired. As stated before, the user selects a security by use of a security selection means (box 338). The computer apparatus then processes the request utilizing the programmed algorithms to construct the first subset of information This first subset consists of the recommendations for the security, with a matching security ID, selected for a predetermined data range (box 366). This information is queried from a Recommendation Data Set (box 342) which is stored in the Data Storage Means (106). (In the same manner as described in FIG. 14) Each recommendation of the first subset includes the unique ID number of the recommendation found within the Access database. This ID number will allow the association of the remainder of the variables that were captured along with the recommendation.

Box 370 illustrates the association of the variables with their respective recommendation capsule variables (in the same manner as FIG. 14). These variables include the title of the article, column, or show in which the recommendation was made, the financial magazine name, on-line source name, or broadcast program name in which the article, column, or show was found, date ID of the financial magazine, on-line source, or broadcast program, optionally, the summarization of the article, column, or show, the page number of the article, URL of the on-line column, or channel of the broadcast program, the number of pages in the article, length of the on-line column, or length of broadcast show, the tone of the article, on-line column, or broadcast show, the amount of general support data given within article, on-line column, or broadcast program, the amount of the support data given with regards to the security being recommended, and the recommendor(s). Box 370 organizes the variables and prepares for the final processing step of the information and the association with the performance rankings of the individual recommendors. (In the same manner described in FIG. 14)

FIG. 16, box 374 illustrates the step where each recommender who has recommended the security selected by the user is associated with their respective performance ranking. The performance ranking information is queried from the Performance Data Set (box 356). The two pieces of information from the two data sets are then linked together using the unique RecommendorID number. This number, through the utilization of a Microsoft Access select query, will allow the query to associate the recommendor with their performance ranking. This information is organized together and prepared for final display on the invention report. The report is then displayed to the user (box 376).

As stated in the prior sentence, the final step of the processing as illustrated in FIG. 16 is the display of the report as seen in FIG. 6. It is organized in such a way that the information requested by the user is easy to read and is useful in helping make an investment decision. The user is also supplied with some insight as to whether or not the security they have selected was recommended by recommendors who have performed well based on past recommendations we have captured and analyzed. As stated above, the user is supplied with three additional pieces of information.

Page Number

Box 168 in FIG. 6 identifies the page number of the magazine article, the URL of the on-line column, or the channel of the broadcast program. This will allow the user to easily locate the recommendation source they are interested in further researching.

Code

Box 176 is what is called the "Code" of the recommendation. It consists of four variables that were captured along with the recommendation. The first is the length of the recommendation. In the case of a magazine article, the length is measured in quarters of a page. For example if the article were one entire page long the length recorded would be 4 (indicating four quarters of a page long). Additionally, for a broadcast program this would be a measurement of how long the show was in minutes.

The second element of the "Code" is the tone of the recommendation. This identifies for the user the amount of enthusiasm surrounding the recommendation. For example if the host of a show were extremely enthusiastic about the recommendation the tone would be captured with the letter A.

The third element is the amount of general support data given. For example, if an on-line column has supported its recommendation with an abundant amount of industry information and market information the recommendation would receive an "A" for general support data.

The fourth element is the amount of security support data. This is data supporting the security that is being recommended. For example, if an author of an article included no fundamental support data and no technical support data for the security, the recommendation would receive the letter C. This unique coding system affords the user more insight as to the detail and confidence that surrounded the recommendation when it was made.

Target Data

Box 161 in FIG. 6 is a column that illustrates the target data that was supplied and captured along with the recommendation. The target data information includes the price that the recommendor or recommendation source felt the stock would reach and the date the recommender or recommendation source felt that target price would be realized.

Box 132 identifies the name of the security as selected by the user along with its ticker symbol. Box 130 illustrates a column that displays the recommendation source. On this report it includes the following variables:

f) Box 138 identifies the financial magazine name, the on-line source name, or the broadcast program name.

g) Box 136 identifies the date ID of financial magazine, on-line source, or broadcast program. This indicates the date of publication, column release, or show.

h) Box 140 identifies the magazine article name, on-line source column name, or the broadcast program show name.

i) Box 142 identifies the recommendor name.

j) Box 156 identifies the individual recommender performance ranking.

Optional Article Summarization

Box 134 identifies an optional column containing summarization of the financial magazine article, the on-line column, or the broadcast program show. The summarization highlights the positive, negative, and neutral points that were made when referring to the recommendation made. This report organizes the reasons supporting the recommendation into two sections. Box 166 identifies the section containing the bullish reasons captured when the recommendation was input into the system. The bullish reasons are considered positive support reasons why the company will do well or has done well.

Box 182 identifies the section containing the bearish reasons captured when the recommendation was input into the system. The bearish reasons are considered negative reasons why the company will not do well or has not done well. These two elements make up the article summarization as a whole on this report. It simply aids the user in better differentiating between the positive and negative things that were said regarding the security in each recommendation.

FIG. 6, boxes 133 illustrate the recommendation made by the recommendation source. In this report, the recommendation appears as either bullish or bearish and is presented with the reasons supporting the bullish or bearish recommendation. However, the verbiage used to describe the recommendation can vary. For example, the report could have displayed the recommendation as pick and pan or buy and sell. The way in which the recommendation is worded is not important, it is the fact that a recommendation was made that does.

Report of Recommendations by a Specific Recommendor

Figure 13:
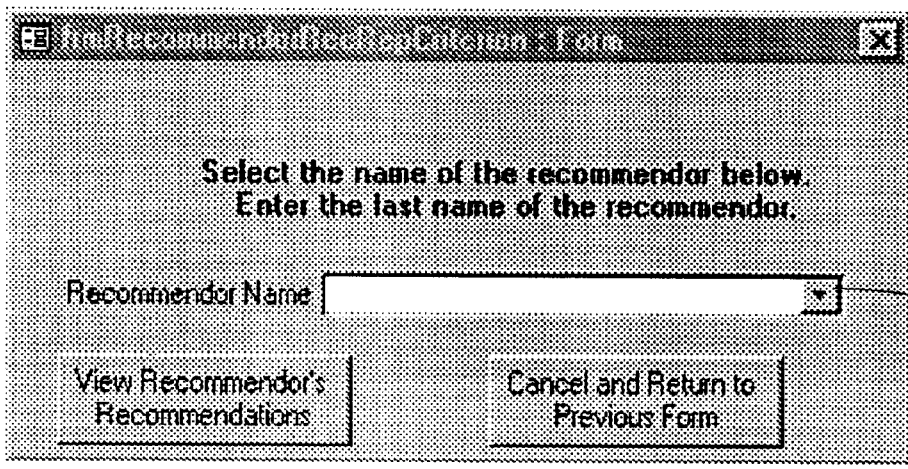

FIG. 7 illustrates a report that is generated when a user selects a recommender using a recommender selection means (FIG. 13). The user can access the report using the universe of techniques that include the following:

1) entering the recommender name for whom they wish to view the recommendations of (FIG. 13, box 336)

2) select the name from the list provided in the drop down combo box or list box (box 336)

3) hyperlink to the recommendor's report if the environment the user is operating in utilizes and supports hyperlinks.

A drop down combo box or list box is a programmatic object that allows a user to select an element from a list.

The recommender selection means is considered a more specific recommendation source selection means. A recommendation source selection means could be used to select a magazine, online source, broadcast media, article, column, and recommender. This recommender selection means was selected to merely display an example of a recommendation source selection means.

The report displays the recommendations for the recommender or recommendation source selected by the user for a predetermined date range and the summary of the recommendation. It also identifies the source of the recommendation and the date ID of the recommendation source.

Figure 17:
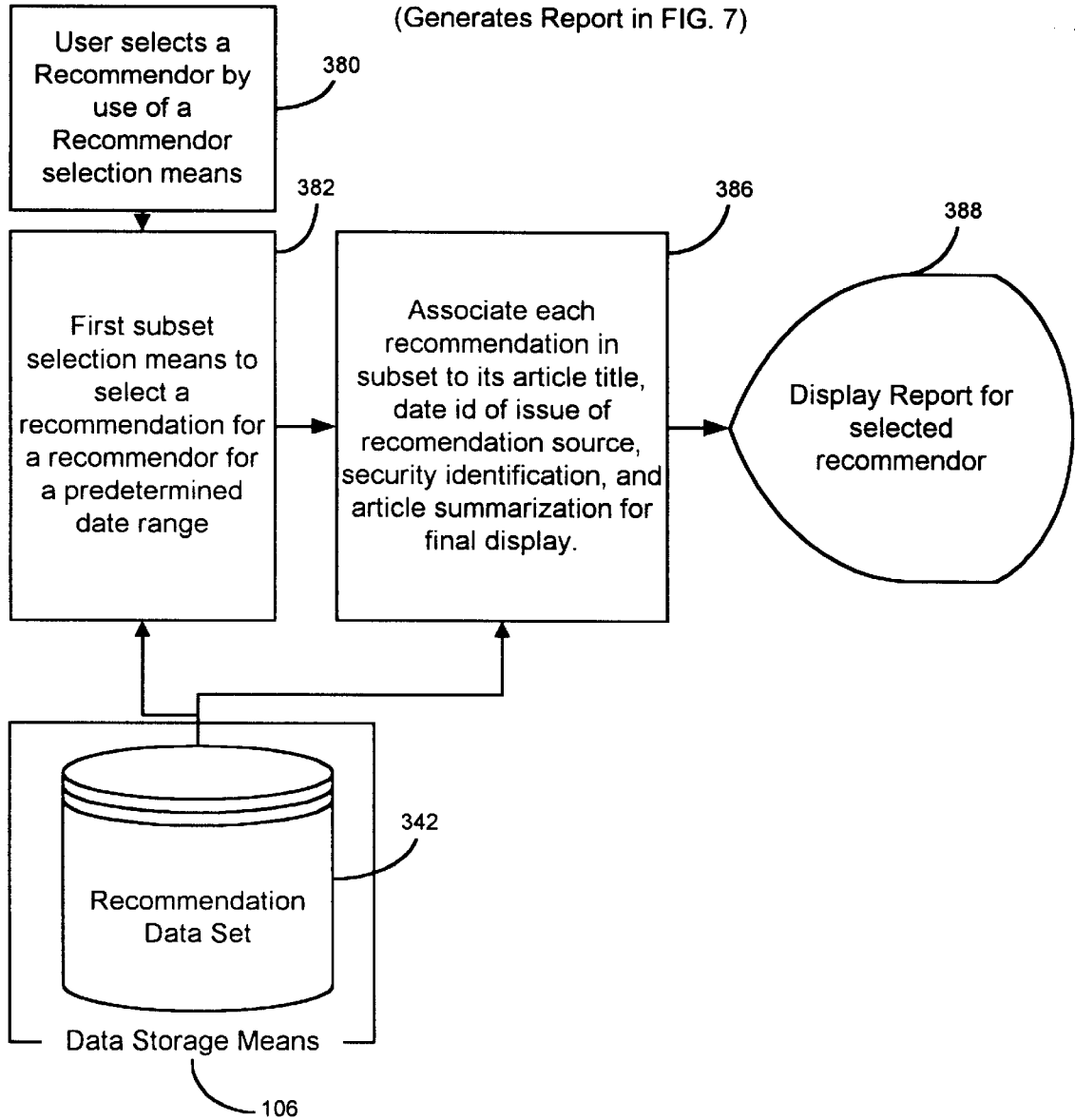
FIG. 17 is a schematic flowchart depicting the generation of the report in FIG. 7. It begins with the user selection through the final display of the report.

To better understand how the information is queried, processed, and finally displayed on the report in FIG. 7 we turn to FIG. 17. This illustrates the schematic flow of information when the user submits their request for the report desired. As stated before, the user selects the recommender by use of a recommender selection means (box 380). This allows the user to customize their search and view the recommendations of only the recommendors they are most interested in. As stated before, the recommender selection means is a general example of a recommendation source selection means.

Based on the recommender selected, the first subset of information is collected using a similar select query as described in FIG. 14. FIG. 17, box 382 retrieves the recommendation ID of each recommendation made by the selected recommender for a predetermined date range. This information is queried from the Recommendation Data Set (box 342) which is stored within the Data Storage Means (box 106). The next processing step the computer apparatus conducts is illustrated in box 386. Based on programmed algorithms, the computer apparatus assodates the remaining variables for the recommendation utilizing the recommendation ID using a similar select query as described in FIG. 14.

The additional variables are the magazine article title, on-line source column, or broadcast program show, date ID of the recommendation source, recommendation source which come from the universe including financial magazine, on-line source, and broadcast program, and optionally, the article summarization. The processing step in box 386 prepares the recommendation information for final display on the report. Box 388 illustrates the final step, which displays the report for the selected recommender.

As stated in the prior sentence, the final step of the processing as illustrated in FIG. 17 is the display of the report as seen in FIG. 7. The information displayed provides a source for users to utilize where they can get the recommendations made by their favorite or most frequently followed recommendors over a predetermined data range. FIG. 7, box 184 identifies the recommender that the user selected.

Currently, our universe of recommendors totals approximately 2,000 authors, advisors, columnists, and show hosts Box 190 is a column containing the security identification. This could consist of the company name and it could consist of the ticker symbol. In the case of the report in FIG. 7 it displays the company name in order to help the user better identify the securities being recommended.

Box 188 is a column containing the date ID of the recommendation source. The date ID refers to the publication date for financial magazines, posting date for on-line sources, and date of broadcast for broadcast programs. For example, Peter Lynch in FIG. 7 recommended Body Shop in a financial magazine that was dated Jan. 1, 1996. Box 186 is a column containing identifies the name of the article if the recommendation was made in a financial magazine, the name of the on-line column if the recommendation was made through an on-line source and name of the show if the recommendation was made on a broadcast program.

Box 192 is a column that optionally illustrates the summary of the recommendation as input into the Recommendation Data Set. The summary briefly describes the recommendation and what was said in regards to the security and the surrounding, relevant issues.

Box 193 is a column that illustrates the recommendation made by that recommender for the security. The report in FIG. 7 is an excellent tool for users who want to focus their research and investment decisions based on the advice of specific recommendors.

Report Showing Aggregated Performance for a Recommendor

Figure 8A:
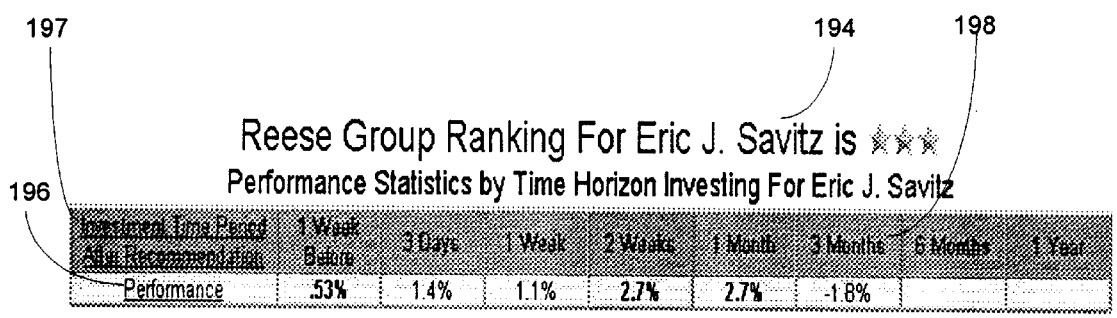
FIG. 8a illustrates the report that displays the aggregated and averaged performance of the recommender selected by the user for predetermined date ranges.

FIG. 8a illustrates a report that is generated when a user selects a recommender using a recommender selection means (FIG. 13) in the same manner as described in FIG. 7. The report displays the recommendor's aggregated and averaged performance based on the recommendations made and input into our Recommendation Data Set for predetermined date ranges.

Figure 18:
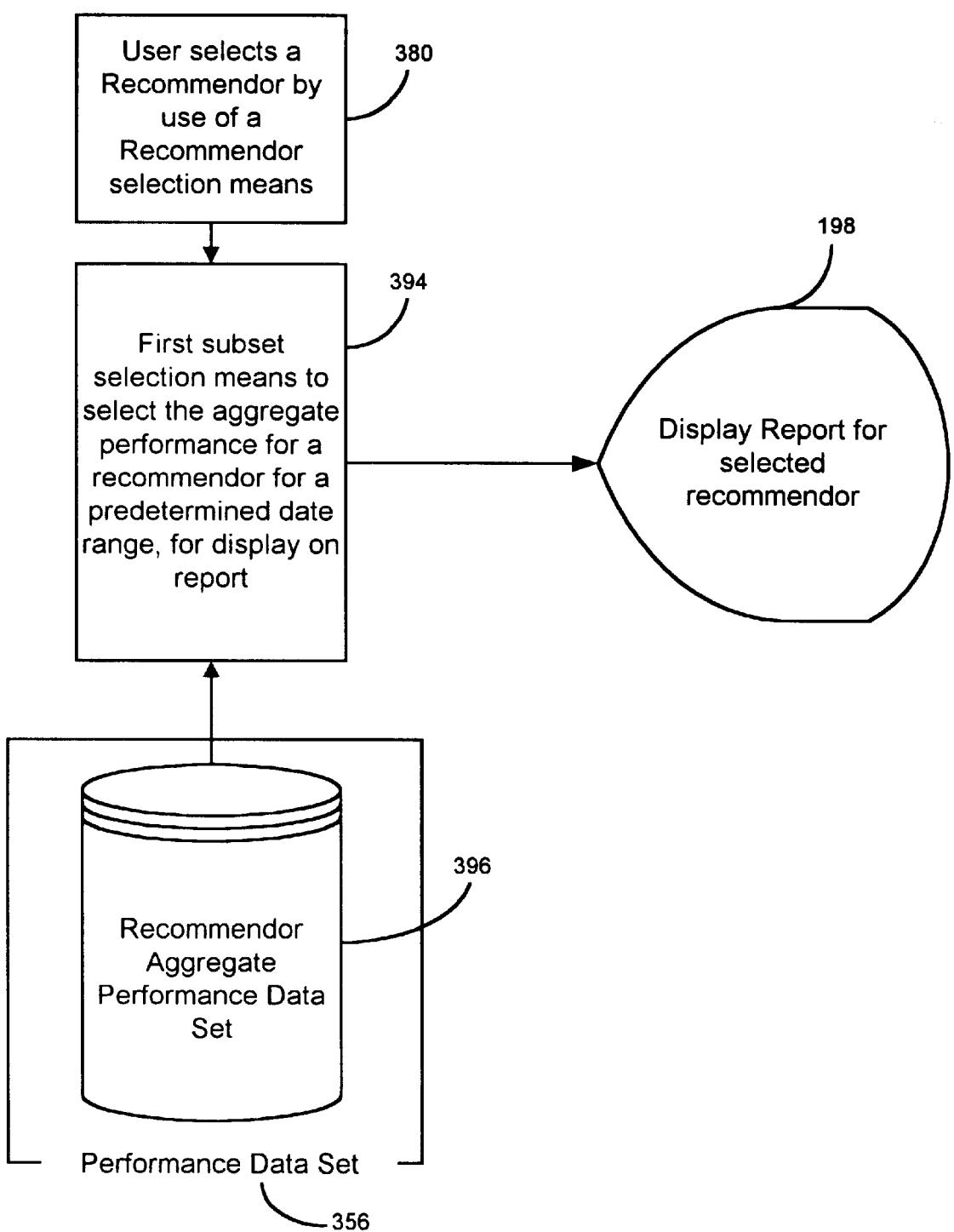
FIG. 18 is a schematic flowchart depicting the generation of the report in FIG. 8a. It begins with the user selection through the final display of the report.

To better understand how the information is queried, processed, and finally displayed on the report in FIG. 8a we turn to FIG. 18. This illustrates the schematic flow of information when the user submits their request for the report desired. As stated above the user selects a recommender using a recommender selection means (box 380). Based on the recommender chosen, the computer apparatus processes the request, using the programmed algorithms, and forms the subset of information (box 394) which includes the aggregated and averaged performance of the recommender selected for predetermined date ranges. The aggregated and averaged performance is queried from the Recommendor Aggregated Performance Data Set (box 396) which is a part of the Performance Data Set (box 356).

In the current system, the information is queried using a Microsoft Access select query. The select query uses the criteria specified by the user (recommender name) and retrieves the information available for that recommender. The information is arranged in a format that is available for final display. Box 198 illustrates the final step of the processing of the information, the display of the report for the selected recommendor. It is important to note that the performance information is calculated before this schematic flowchart and is processed within the computer apparatus (see "Origin of the Performance Data Set" for more detail).

The report that results from the processing described and illustrated in FIG. 18 can be found in FIG. 8a. The aggregated and averaged performance of the selected recommender over predetermined date ranges is an easy way for a user to analyze the performance of some of their favorite authors, columnists, and show hosts. This easy-to-read table format enables a user to quickly determine whether or not they could have made money on the recommendations input into our Recommendation Data Set after the recommendation source made the information available to the public. It will help them to make better-educated, short-term and long-term investments based on the recommendor's recommendations in the future if the past performance is any indication on future performance.

Box 194 in FIG. 8a indicates the recommender that the user has chosen to view the aggregated and averaged performance of. Box 197 is a row that illustrates the multiple, predetermined date ranges. Box 198 illustrates one example of a predetermined date range. This is the three-month date range for the performance of the recommender, following the first available date a subscriber could act on the recommendation. The multitude of available date ranges forced us to focus our report to display eight predetermined date ranges displayed. It is important to note that we have analyzed the recommendor's performances across many more date ranges and found similar results. Therefore, making the choice on which date ranges would be displayed was arbitrary, but we included both very short time frames and one year time frames. Box 196 is a row that illustrates the aggregated and averaged performance of the recommender across the predetermined date ranges (see "Origin of Performance Data Set" for more detail).

Report of Recommendors Showing Sharpe Ratio, Pain & Smile Index

FIG. 8b illustrates a report that is generated when a user selects a recommendor using a recommender selection means (FIG. 13) in the same manner as described in FIG. 7. The report displays the recommendor's aggregated and averaged performance along with at least one other performance measurement that comes from the universe that includes the following:

a) benchmark aggregated and averaged performance b) the number of recommendations analyzed c) the aggregated and averaged Sharpe ratio for the recommendor d) the aggregated and averaged Sharpe ratio for the benchmark e) the aggregated and averaged Pain Index of the recommender f) the aggregated and averaged Smile Index of the recommender These performance measurements are based on the recommendations made by the recommender that were input into our Recommendation Data Set for predetermined date ranges.

Figure 19:
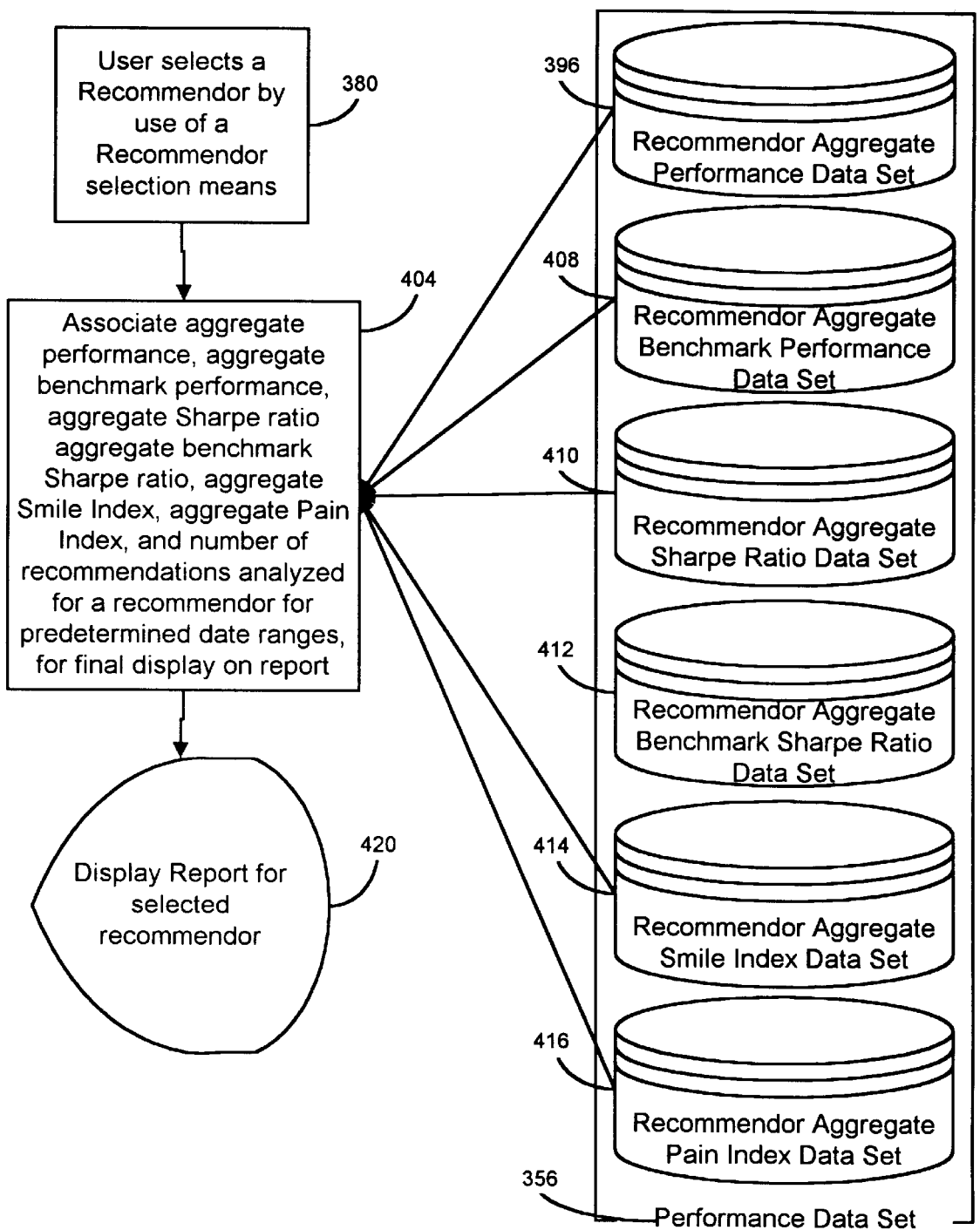
FIG. 19 is a schematic flowchart depicting the generation of the report in FIG. 8b. It begins with the user selection through the final display of the report.

To better understand how the information is queried, processed, and finally displayed on the report in FIG. 8b we turn to FIG. 19. This illustrates the schematic flow of information when the user submits their request for the report desired. As stated above, the user selects a recommendor using a recommendor selection means (box 380). Based on the recommender chosen, the computer apparatus processes the request, using the programmed algorithms, and associates the desired elements of the universe of performance measures mentioned above (box 404) for predetermined date ranges (in the same manner as FIG. 8a).

The aggregated and averaged performance is queried from the Recommendor Aggregated Performance Data Set (box 396). The aggregated and averaged recommendor benchmark performance is queried from the Recommendor Aggregated Benchmark Performance Data Set (box 408). The aggregated and averaged Sharpe ratio is queried from the Recommendor Aggregate Sharpe Ratio Data Set (box 410).

The aggregated and averaged recommender benchmark Sharpe ratio is queried from the Recommendor Aggregate Benchmark Sharpe Ratio Data Set (box 412). The aggregated and averaged recommendor Smile Index is queried from the Recommendor Aggregate Smile Index Data Set (box 414). The aggregated and averaged recommender Pain Index is queried from Recommendor Aggregate Pain Index Data Set (box 416).

Each of the performance data sets is located within the Performance Data Set (FIG. 19, box 356) in the form of an Access table. As stated multiple times, this data structure was designed by us in order to host the information needed for invention reports. The information could be stored in a variety of ways but the relational data structure offered by an Access database makes the storage and retrieval of information more efficient and logical. For example, the multiple performance variables displayed in the report in FIG. 8b could be stored in one text file for each recommendor or a non-relational database structure. However, due to the advancements of technology and the applications available, these alternative designs did not prove to be the best choice.

Upon association of the information, the variables are arranged in a format that is available for final display. FIG. 19, box 420 illustrates the final step of the processing of the information, the display of the report for the selected recommender. It is important to note that the performance information is calculated before this schematic flowchart is processed within the computer apparatus (see "Origin of the Performance Data Set" for more detail). The information is available for each recommender that has a recommendation within the Recommendation Data Set and is queried based on a unique recommender ID number.

The report that results from the processing described and illustrated in FIG. 19 can be found in FIG. 8b. This report affords the user the opportunity to not only view the aggregated and averaged price performance of the recommendations made by the recommender, but also the performance of variables found in the universe that includes recommender aggregated and averaged benchmark performance, recommender aggregated and averaged Sharpe ratio, recommendor aggregated and averaged benchmark Sharpe ratio, recommendor aggregated Smile Index and recommendor aggregated Pain Index. The ability to view the wide variety of performance variables across multiple predetermined date ranges can give additional insight to a user who is looking to make investment decisions based on recommendations made by the recommender chosen.

For example, if the user is the type of investor who prefers to check the price appreciation of the securities they have invested in, they would want to use the Smile Index as a good performance indicator. The reason is, the Smile Index (see calculation in "Origin of Performance Data Set" for more detail) indicates how happy or joyful the recommendations the recommendor made were over predetermined date ranges. If the securities recommended saw continual price increases over the predetermined date ranges it would receive a high Smile Index rating. In other words, the higher the Smile Index the happier the investment.

By providing the investor with a plurality of performance ratings it gives them the opportunity to pick and choose the statistics that they wish to follow. Hence, they are more educated and more confident when listening to a recommendor's recommendations. Box 194 in FIG. 8b indicates the recommendor name for which the performance statistics are being displayed. The user has previously selected this.

Predetermined Date Ranges

The row of box 197 illustrates the predetermined date ranges that the performance statistics are available for. In the report there are eight separate date ranges offered but this in no way should indicate that these are the only date ranges analyzed or important. Box 216 indicates an example of one of the predetermined date ranges In this case it is the three-month date range. The performance statistics listed are calculated based on the first trading action date of the recommendation and the first trading date three months after that first trading action date.

Performance

The row of box 196 illustrates the aggregated and averaged recommender performance across the predetermined date ranges (see calculation in "Origin of the Performance Data Set" for more detail). This allows the user to see which predetermined date range the chosen recommender has performed the best over. Depending on whether the user's investment time horizon is short-term or long-term the performance could help them feel more confident or less confident in following the recommendations made.

Benchmark Performance

The row of box 204 illustrates the aggregated and averaged recommender benchmark performance across the predetermined date ranges (see calculation in "Origin of the Performance Data Set" for more detail). This performance statistic displays to the user how the chosen recommender has performed as compared to a benchmark performance. If the recommendor has soundly beat the benchmark consistently the user may consider the future recommendations as a good way to outperform the benchmark. We have chosen to display the S&P 500 as the benchmark index. However, an industry index could be used along with several other widely used benchmark comparison indices.

Number of Recommendations

The row of box 206 indicates the number of recommendations the chosen recommendor made that were statistically analyzed in the performance ratings. This allows the user to determine for themselves if the performance ratings are statistically reliable enough or that the recommender had only recommended one security and his performance ratings are not justified.

Sharpe Ratio

The row of box 208 illustrates the recommender aggregated and averaged Sharpe ratio, or risk adjusted return (see calculation in "Origin of the Performance Data Set" for more detail). This is very insightful as it tells the user how well the recommendations of the recommender have done when the risk of the investment is taken into consideration. Particularly, for risk averse investors, this may be the only performance rating they choose to consider.

The row of box 210 illustrates the recommender aggregated and averaged benchmark Sharpe ratio or risk adjusted return of the benchmark (see calculation in "Origin of the Performance Data Set" for more detail). This too is a very insightful performance rating. It allows the user to see how the risk adjusted returns of the recommender chosen compares to the risk adjusted returns of the benchmark. In other words, a user could determine if the recommendations of their favorite recommendors are less or more risky than the index they like to compare against. In this case we have compared the Sharpe ratio of the recommender to that of the S&P 500 index Sharpe ratio. However, the benchmark could be an industry index as well as another market index.

Pain Index

The row of box 212 illustrates the recommendor's aggregated and averaged Pain Index over the predetermined date ranges (see calculation in "Origin of the Performance Data Set" for more detail). The Pain Index attempts to numerically describe the unpleasantness and stress of the recommendations made by the recommender during the holding period beginning with the first action date to the predetermined date ranges. It numerically represents the percentage amount and duration by which the stock price was below the initial purchase price during the holding period, and then is normalized for the number of days for the holding period to allow comparison between different holding periods.

Smile Index

The row of box 214 illustrates the recommendor's aggregated and averaged Smile Index over the predetermined date ranges (see calculation in "Origin of the Performance Data Set" for more detail). The Smile Index attempts to numerically describe the pleasantness of the recommendations made by the recommender during the holding period beginning with the first action date to the predetermined date ranges. It numerically represents the percentage amount and duration by which the stock price was above the initial purchase price during the holding period, and then is normalized for the number of days for the holding period to allow comparison between different holding periods.

Report of Recommendations and Performance of Each Recommendation Made by a Recommendor FIG. 8c illustrates a report that is generated when a user selects a recommendor using a recommender selection means (FIG. 13) in the same manner as in FIG. 8a. The report displays the recommendations made by the recommender selected for a predetermined date range along with the performance of each recommendation over multiple predetermined date ranges.

Figure 20:
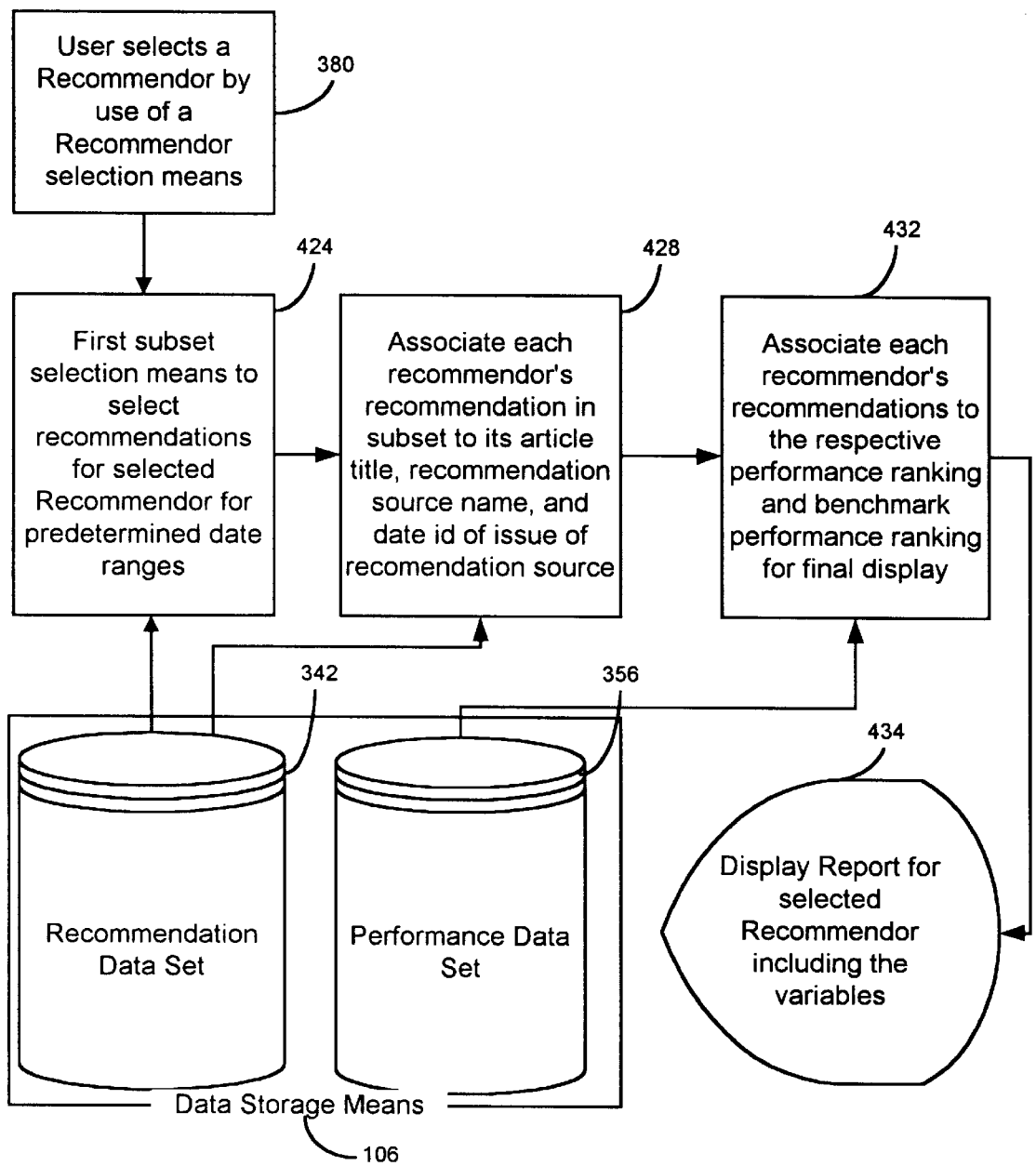
FIG. 20 is a schematic flowchart depicting the generation of the report in FIG. 8c. It begins with the user selection through the final display of the report.

To better understand how the information is queried, processed, and finally displayed on the report in FIG. 8c we turn to FIG. 20. This illustrates the schematic flow of information when the user submits their request for the report desired.

Process

As stated above the user selects a recommender using a recommendor selection means (FIG. 20, box 380). Based on the recommender chosen, the computer apparatus processes the request, using the programmed algorithms, and retrieves the recommendations (box 424) made by the recommender from the Recommendation Data Set (box 342) over a predetermined date range. The element queried is the recommendation ID of each record which uniquely identifies each recommendation made by the recommender.

Box 428 illustrates the association of the recommendation ID from the Recommendation Data Set (box 342) with the other related variables that also come from the Recommendation Data Set which is located in the Data Storage Means (box 106). The elements queried in this processing step are:

a) recommendation source name
b) date ID of the recommendation source
c) the article title if the recommendation came from a financial magazine, column name if the recommendation came from an on-line source, and show name or segment name if the recommendation came from a broadcast program
d) security identification The final step of processing before the variables are prepared for final display is the association of the recommendations with the performance statistics of those recommendations. Box 432 illustrates the processing step that retrieves the performance of each recommendation for multiple predetermined date ranges from the Performance Data Set (box 356) which is located in the Data Storage Means (box 106). Currently the only performance statistic that is displayed for the user is the price performance appreciation or depreciation (see calculation in "Origin of the Performance Data Set" for more detail). We have chosen to currently present the information in this fashion because it is easier to read and less overwhelming.

However, we have calculated multiple performance statistics for each recommendation that come from the universe consisting of the Smile Index, Pain Index, Sharpe Ratio, benchmark performance, and benchmark Sharpe ratio. These could also be elements displayed on the report. At the completion of this processing step the variables are prepared for final display on the report. Box 434 illustrates the processing step that displays the aforementioned variables on the report for the user to view.

Resulting Report Structure

The report that results from the processing described and illustrated in FIG. 20 can be found in FIG. 8c. The report displayed allows the user to individually see how each recommendation of the recommender they have chosen to analyze has performed over predetermined date ranges. The report is in an easy to read format so the user can quickly scan the performance of the recommendations to determine whether the recommender they are interested in has made recommendations, we have captured, that they could have made money on when they first read or heard about the recommendation. Box 194 in FIG. 8c indicates the recommender name whose recommendations are being displayed in the report. The recommender displayed is based upon the choice of each individual user.

Security ID

Box 220 indicates the security identification, which includes the universe of the ticker symbol and company name. We have chosen to display both the company name and ticker symbol in order to supply the user with the most information. However, the report could consist of just the ticker symbol and just the company name.

Recommendation Source Name

Box 224 illustrates the name of the recommendation source. In the case of a financial magazine, this would be the magazine name. In the case of an on-line source this would be the source's name. In the case of a broadcast program this would be the broadcast program name.

Date ID

Box 222 illustrates the date ID of the recommendation source. In the case of a financial magazine this would be the issue date. In the case of the on-line source this would be the posting date. In the case of a broadcast program this would be the date of the show.

Article Name

Box 226 illustrates the name of the article if the recommendation source was a financial magazine, the name of the on-line column if the recommendation source was an on-line source and the name of the show if the recommendation source was a broadcast program.

Predetermined Date Ranges

Box 228 illustrates an example of a predetermined date range that the performance of the recommendation was analyzed and displayed for. In this case it is the one-month date range. Therefore the performances of the recommendations would be calculated and displayed based on the price appreciation or depreciation from the first action date to one month after the first action date.

Performance

Box 229 illustrates an example of a performance statistic for a selected predetermined date range. It is important to note that we have statistically analyzed the performance of each recommendation over a multitude of predetermined date ranges. We have chosen to display the selected predetermined date ranges in order to present the user with what we thought was the most useful and actionable based on the returns of recommendors. This report is useful in determining what time frame a memorable recommendation made by a favorite recommender has performed the best in. It could also give some insight as to whether or not a recommendor's recommendations have consistently performed well on an individual basis over a particular time frame.

Figure 10A:
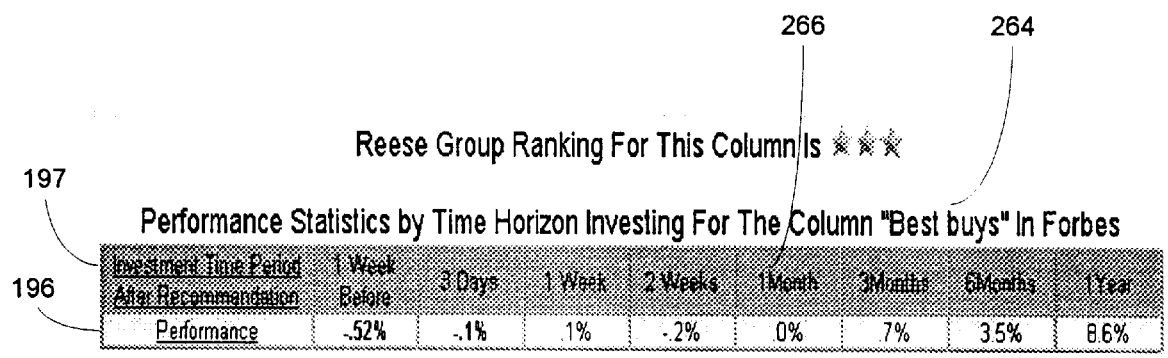
FIG. 10a illustrates the report that displays the aggregated and averaged performance of the recommendation source selected by the user for predetermined date ranges.

Reports of Aggregated Performance Statistics for an Article, Column, or Magazine FIG. 9a (by article), FIG. 10a (by column or segment), and FIG. 11a (by periodical or broadcast network) illustrate a report that is generated when a user selects a recommendation source using a recommendation source selection means (FIG. 13). The user can access the report using the universe of techniques that include the following:

1) entering the recommendation source name for whom they wish to view the recommendations of
2) select the name from the list provided in the drop down box
3) hyperlink to the recommendor's report if the environment the user is operating in utilizes and supports hyperlinks.

The report displays the recommendation source aggregate performance based on the recommendations made and input into our Recommendation Data Set for predetermined date ranges.

Process

Figure 21:
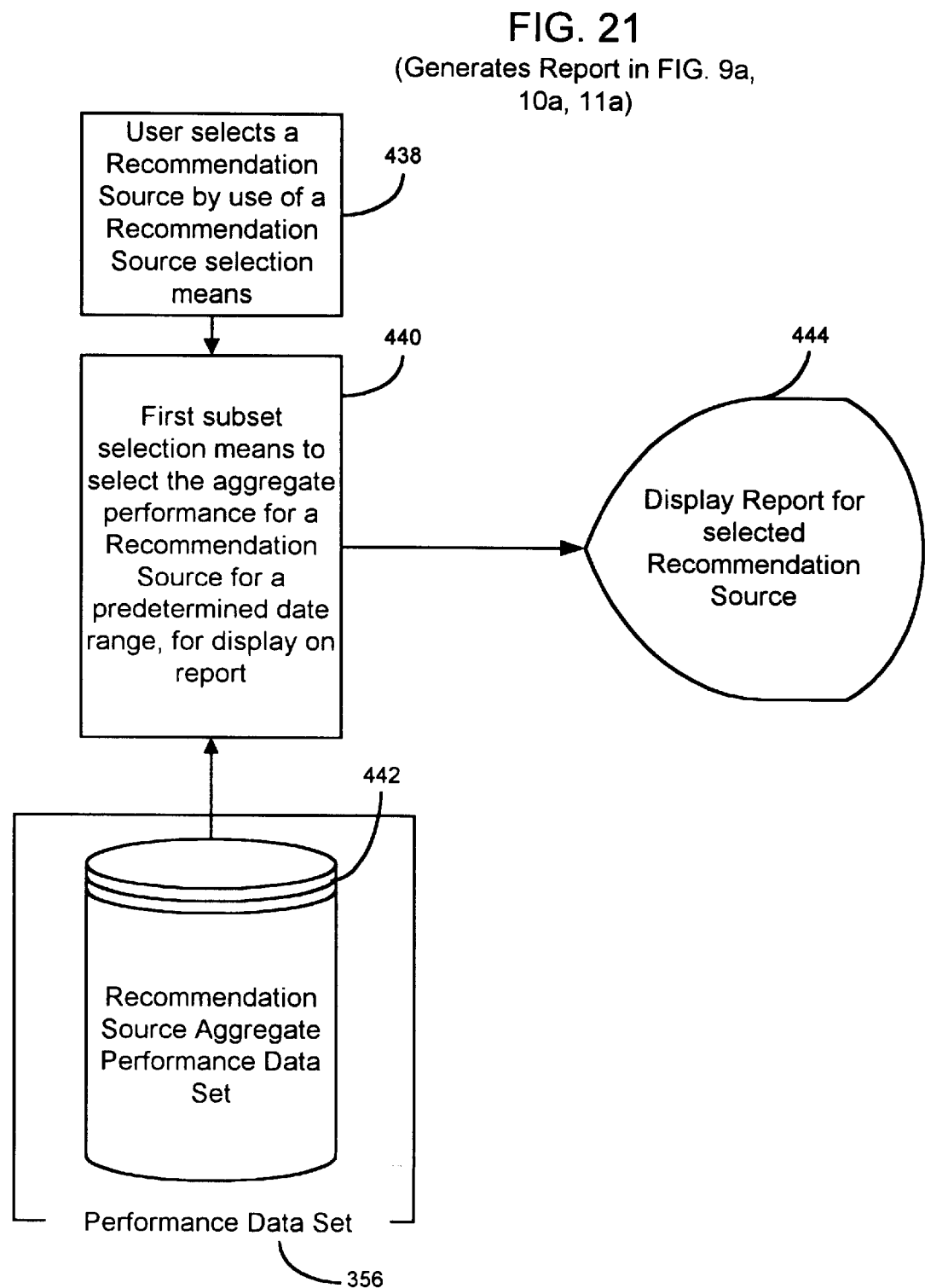

To better understand how the information is queried, processed, and finally displayed on the report in FIG. 9a, FIG. 10a, and FIG. 11a we turn to FIG. 21. This illustrates the schematic flow of information when the user submits their request for the report desired. As stated above the user selects a recommendation source using a recommendation source selection means (box 438). Based on the recommendation source chosen, the computer apparatus processes the request, using the programmed algorithms, and forms the subset of information (box 440) which includes the aggregated and averaged performance of the recommendation source selected for predetermined date ranges. The aggregated and averaged performance is queried from the Recommendation Source Aggregated Performance Data Set (box 442) which is a part of the Performance Data Set (box 356).

The current system accomplishes this processing through the use of a Microsoft Access select query. The select query retrieves the appropriate information from the tables based on the unique ID of the recommendation source selected by the user. The information is arranged in a format that is available for final display. Box 444 illustrates the final step of the processing of the information, the display of the report for the selected recommendation source. It is important to note that the performance information is calculated before this schematic flowchart is processed within the computer apparatus (see "Origin of the Performance Data Set" for more detail).

Resulting Report Structure

The report that results from the processing described and illustrated in FIG. 21 can be found in FIG. 10a, FIG. 11a, and FIG. 12a. FIG. 9a illustrates the report that is generated if the recommendation source selected was the name of an article, on-line column, or broadcast show. FIG. 10a illustrates the report that is generated if the recommendation source selected was the name of a column from a financial magazine. FIG. 11a illustrates the report that is generated if the recommendation source selected was the name of a financial magazine, on-line source, or broadcast program.

The aggregated and averaged performance of the selected recommendation source over predetermined date ranges is an easy way for a user to analyze the performance of some of their favorite financial magazines, on-line sources, broadcast programs, articles, and columns. This easy-to-read table format enables a user to quickly determine whether or not they could have made money on the recommendations input into our Recommendation Data Set after the recommendation source made the information available to the public. It will help them to make better educated short-term and long-term investments based on the recommendation source's recommendations in the future if the past performance is any indication of future performance.

Box 230 in FIG. 9a, box 264 in FIG. 10a, and box 300 in FIG. 11a indicates the recommendation source that the user has chosen to view the aggregated and averaged performance of. Box 197 in FIG. 9a, FIG. 10a, and FIG. 11a illustrates predetermined date ranges that the performance of the recommendation source is based on. One example of a predetermined date range is illustrated by box 232 in FIG. 9a, box 266 in FIG. 10a, and box 302 in FIG. 11a. This is one of the many predetermined date ranges for the performance of the recommendation source. The multitude of available date ranges forced us to focus our report to the display of the eight predetermined date ranges displayed. Box 196 in FIG. 9a, FIG. 10a, and FIG. 11a illustrates the aggregated and averaged performance of the recommendation source across the predetermined date ranges.

Report with Additional Performance Statistics for an Article, Column, or Magazine FIG. 9b (by article), FIG. 10b (by column), and FIG. 11b (by magazine) illustrate a report that is generated when a user selects a recommendation source using a recommendation source selection means (FIG. 13) in the same manner as in FIG. 9a, FIG. 10a, and FIG. 11a. The report displays the recommendation source's aggregated and averaged performance along with other performance measurements that come from the universe that includes the following:

a) the benchmark aggregated and averaged performance
b) the number of recommendations analyzed
c) the aggregated and averaged Sharpe ratio for the recommendation source
d) the aggregated and averaged Sharpe ratio for the benchmark
e) the aggregated and averaged Pain Index of the recommendation source
f) the aggregated and averaged Smile Index of the recommendation source These performance measurements are based on the recommendations made by the recommendation source and input into our Recommendation Data Set for predetermined date ranges.

Process

Figure 22:
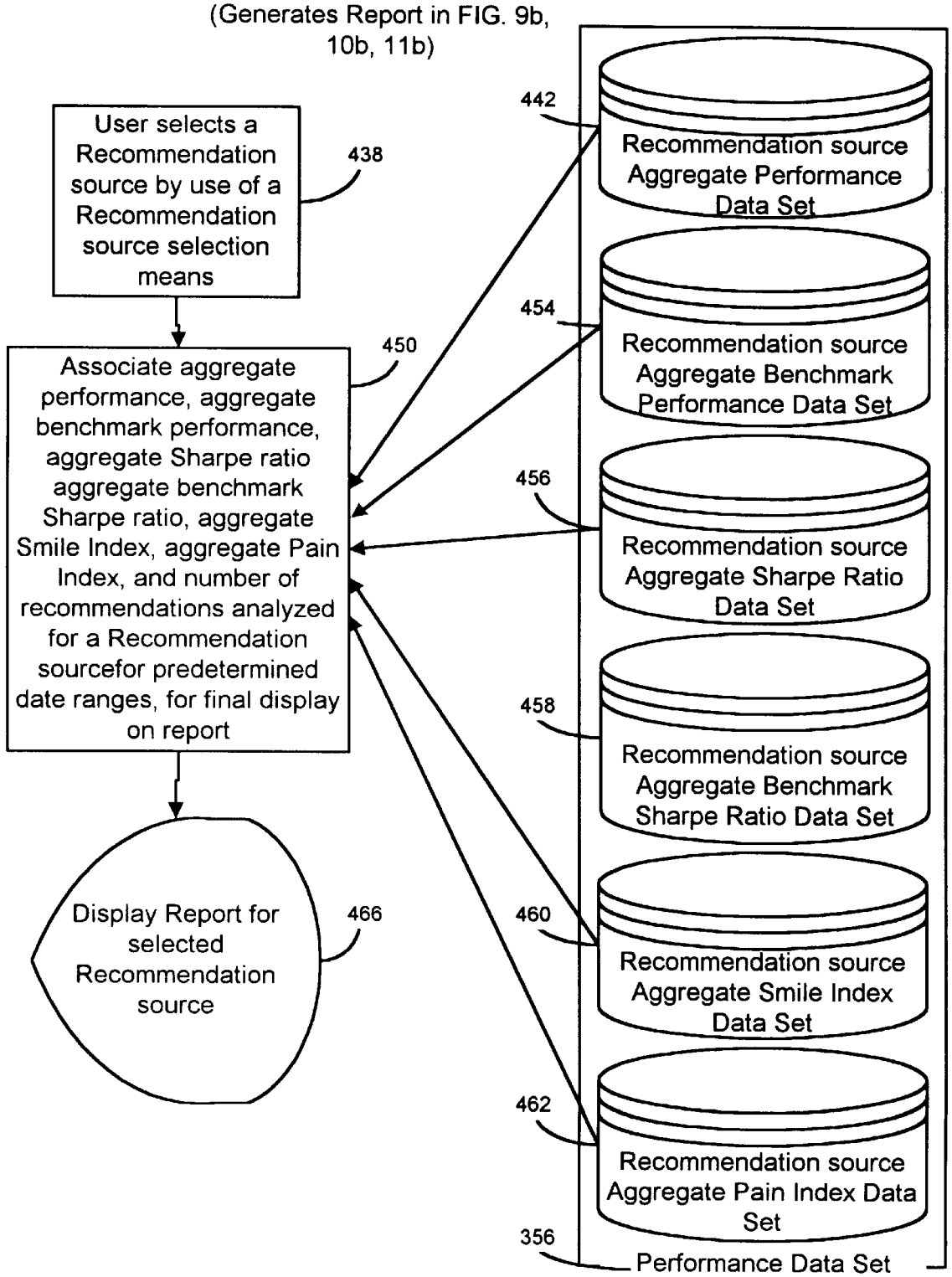
FIG. 22 is a schematic flowchart depicting the generation of the report in FIG. 9b, FIG. 10b, and FIG. 11b.

To better understand how the information is queried, processed, and finally displayed on the report in FIG. 9b, FIG. 10b, and FIG. 11b we turn to FIG. 22. This illustrates the schematic flow of information when the user submits their request for the report desired. As stated above the user selects a recommendation source using a recommendation source selection means (box 438). Based on the recommendation source chosen, the computer apparatus processes the request, using the programmed algorithms, and associates the desired elements of the universe of performance measures mentioned above (box 450) for predetermined date ranges (as in the same manner as FIG. 9a, FIG. 10a, and FIG. 11a). The aggregated and averaged recommendation source performance is queried from the Recommendation Source Aggregated Performance Data Set (box 442).

The aggregated and averaged recommendation source benchmark performance is queried from the Recommendation Source Aggregated Benchmark Performance Data Set (box 454). The aggregated and averaged recommendation source Sharpe ratio is queried from the Recommendation Source Aggregate Sharpe Ratio Data Set (box 456). The aggregated and averaged recommendation source benchmark Sharpe ratio is queried from the Recommendation Source Aggregate Benchmark Sharpe Ratio Data Set (box 458).

The aggregated and averaged recommendation source Smile Index is queried from the Recommendation Source Aggregate Smile Index Data Set (box 460). The aggregated and averaged recommendation source Pain Index is queried from Recommendation Source Aggregate Pain Index Data Set (box 462).

Each of the performance data sets are located within the Performance Data Set (FIG. 22, box 356) in the form of an Access table. As stated multiple times, this data structure was designed by us in order to host the information needed for invention reports. The information could be stored in a variety of ways but the relational data structure offered by an Access database makes the storage and retrieval of information more efficient and logical. For example, the multiple performance variables displayed in the report in FIG. 8b could be stored in one text file for each recommendation source or a non-relational database structure. However, due to the advancements of technology and the applications available these alternative designs did not prove to be the best choice.

Upon association of the information, the variables are arranged in a format that is available for final display. Box 466 illustrates the final step of the processing of the information, the display of the report for the selected recommendation source. It is important to note that the performance information is calculated before this schematic flowchart is processed within the computer apparatus (see "Origin of the Performance Data Set" for more detail).

Resulting Report Structure

The report that results from the processing described and illustrated in FIG. 22 can be found in FIG. 9b, FIG. 10b, and FIG. 11b. FIG. 9b illustrates the report that is generated when the user selects an article, on-line column, or broadcast show. FIG. 10b illustrates the report that is generated when the user selects a column from a financial magazine. FIG. 11b illustrates the report that is generated when the user selects a financial magazine, on-line source, or broadcast program.

This report affords the user the opportunity to not only view the aggregated and averaged price performance of the recommendations made by the recommendation source but also the performance of variables found in the universe that includes recommendation source aggregated and averaged benchmark performance, recommendation source aggregated and averaged Sharpe ratio, recommendation source aggregated and averaged benchmark Sharpe ratio, recommendation source aggregated Smile Index and recommendation source aggregated Pain Index.

The ability to view the wide variety of performance variables across multiple predetermined date ranges can give additional insight to a user who is looking to make investment decisions based on recommendations made by the recommendation source chosen. For example, if the user were the type of investor who prefers to monitor the price appreciation of the securities they have invested in they would want to use the Smile Index as a good performance indicator. The reason is, the Smile Index (see calculation in "Origin of Performance Data Set" for more detail) indicates how happy or joyful the recommendations the recommendation source made were over predetermined date ranges. If the securities recommended saw continual price increases over the predetermined date ranges it would receive a high Smile Index rating. In other words, the higher the Smile Index the happier the investment. We feel that providing the investor with a plurality of performance ratings gives them the opportunity to pick and choose the statistics that they wish to follow. Hence, they are more educated and more confident when listening to a recommendation source's recommendations.

Recommendation Source Name

Box 236 in FIG. 9b, box 270 in FIG. 10b, and box 306 in FIG. 11b indicate the recommendation source name for which the performance statistics are being displayed. The user has previously selected this. Box 197 in FIG. 9b, FIG. 10b, and FIG. 11b illustrate the predetermined date ranges that the performance statistics are available for.

Predetermined Date Ranges

Box 197 FIG. 9b, FIG. 10b, and FIG. 11b identifies the row that illustrates the predetermined date ranges that the performance was calculated for. Box 238 in FIG. 9b, box 272 in FIG. 10b, and box 308 in FIG. 11b indicate an example of one of the predetermined date ranges. The performance statistics listed are calculated based on the first trading action date of the recommendation and the first trading date of the predetermined date range after that first trading action date.

Aggregated Performance Statistics

Box 196 in FIG. 9b, FIG. 10b, and FIG. 11b identifies the row that illustrates the aggregated and averaged recommendation source performance across the predetermined date ranges (see calculation in "Origin of the Performance Data Set" for more detail). This allows the user to see which time frame the chosen recommendation source has performed the best over. Depending on whether the users investment time horizon is short-term or long-term the performance could help them feel more confident or less confident in following the recommendations made.

Aggregated Benchmark Performance

Box 204 in FIG. 9b, FIG. 10b, and FIG. 11b identifies the row that illustrates the aggregated and averaged recommendation source benchmark performance across the predetermined date ranges (see calculation in "Origin of the Performance Data Set" for more detail). This performance statistic displays to the user how the chosen recommendation source has performed as compared to a benchmark performance. If the recommendation source has soundly beat the benchmark consistently the user may consider the future recommendations as a good way to outperform the benchmark. We have chosen to display the S&P 500 as the benchmark index. However, an industry index could be used along with several other widely used benchmark comparison indices.

Number of Recommendations Analyzed

Box 206 in FIG. 9b, FIG. 10b, and FIG. 11b identifies the row that illustrates the number of recommendations that were made by the chosen recommendation source and that were statistically analyzed in the performance ratings. This allows the user to determine for themselves if the performance ratings are statistically reliable enough or that the recommendation source had only recommended one security and his performance ratings are not just.

Sharpe ratio Box 208 in FIG. 9b, FIG. 10b, and FIG. 11b identifies the row that illustrates the recommendation source aggregated and averaged Sharpe ratio, or risk adjusted return (see calculation in "Origin of the Performance Data Set" for more detail). This is very insightful as it tells the user how well the recommendations of the recommendation source have done when the risk of the investment is taken into consideration. Particularly, for risk averse investors this may be the only performance rating they choose to consider.

Benchmark Sharpe ratio

Box 210 in FIG. 9b, FIG. 10b, and FIG. 11b identifies the row that illustrates the recommendation source aggregated and averaged benchmark Sharpe ratio, or risk adjusted return of the benchmark (see calculation in "Origin of the Performance Data Set" for more detail). This too is a very insightful performance rating. It allows the user to see how the risk adjusted returns of the recommendation source chosen compares to the risk adjusted returns of the benchmark. In other words, a user could determine if the recommendations of their favorite recommendation sources are less or more risky than the index they like to compare against. In this case we have compared the Sharpe ratio of the recommendation source to that of the S&P 500 index Sharpe ratio. However, the benchmark could be an industry index as well as another market index.

Pain Index

Box 212 in FIG. 9b, FIG. 10b, and FIG. 11b identifies the row that illustrates the recommendation sources' aggregated and averaged Pain Index over the predetermined date ranges (see calculation in "Origin of the Performance Data Set" for more detail). The Pain Index attempts to numerically describe the unpleasantness and stress of the recommendations made by the recommendation source during the holding period beginning with the first action date to the predetermined date ranges. It numerically represents the percentage amount and duration by which the stock price was below the initial purchase price during the holding period, and then is normalized for the number of days for the holding period to allow comparison between different holding periods.

Smile Index

Box 214 in FIG. 9b, FIG. 10b, and FIG. 11b identifies the row that illustrates the recommendation sources' aggregated and averaged Smile Index over the predetermined date ranges (see calculation in "Origin of the Performance Data Set" for more detail).

The Smile Index attempts to numerically describe the pleasantness of the recommendations made by the recommendation source during the holding period beginning with the first action date to the predetermined date ranges. It numerically represents the percentage amount and duration by which the stock price was above the initial purchase price during the holding period, and then is normalized for the number of days for the holding period to allow comparison between different holding periods.

Report of Recommendations Made in a Specific Article

FIG. 9c (by article), FIG. 10c (by column), and FIG. 11c (by periodical, online source, or broadcast network) illustrate a report that is generated when a user selects a recommendation source using a recommendation source selection means (FIG. 13) in the same manner as FIG. 9a, FIG. 10a, and FIG. 11a. The report displays the recommendations made by the recommendation source selected for a predetermined date range along with the performance of each recommendation over multiple predetermined date ranges.

Process

Figure 23:
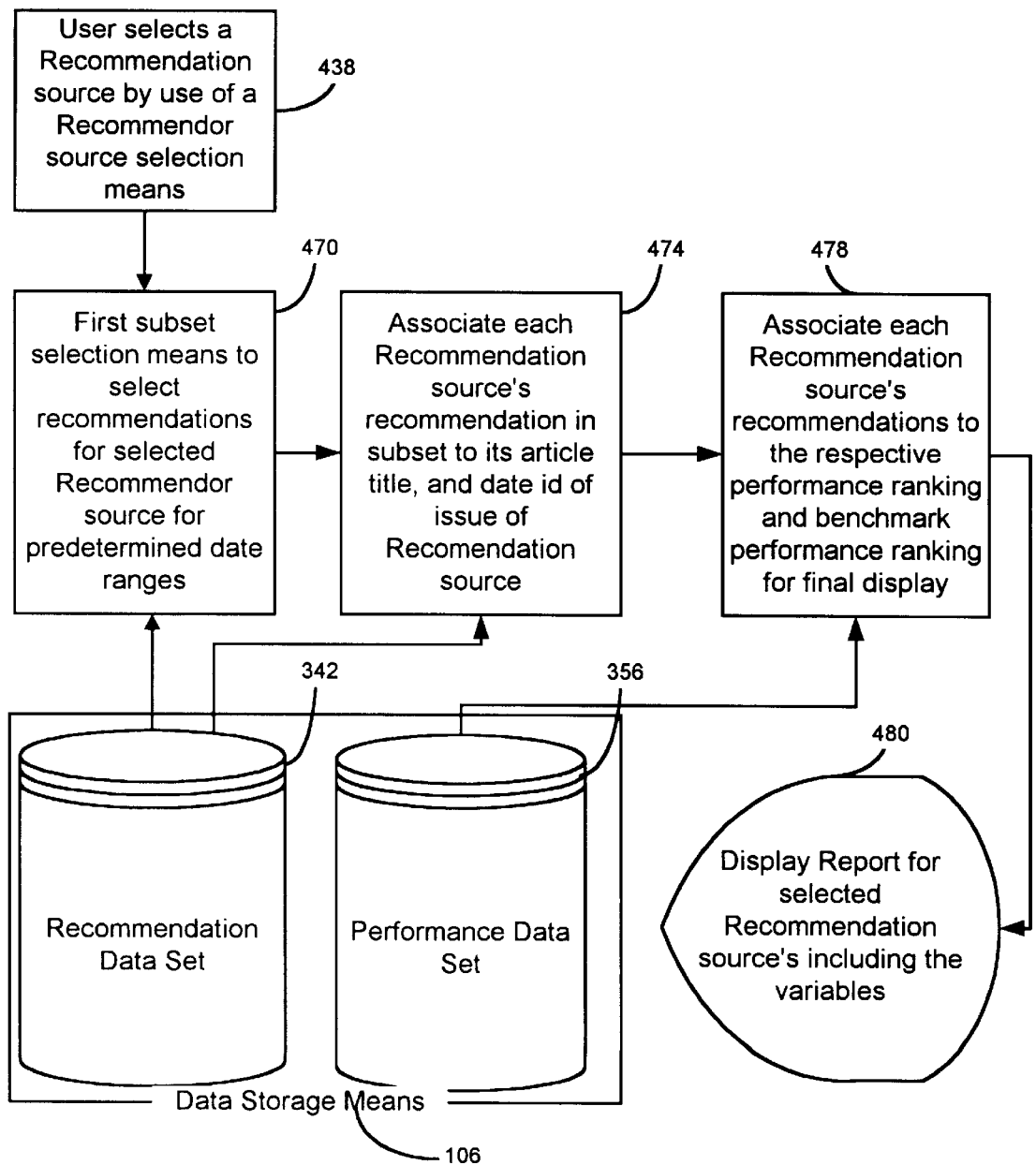
FIG. 23 is a schematic flowchart depicting the generation of the report in FIG. 9c, FIG. 10c, and FIG. 11c.

To better understand how the information is queried, processed, and finally displayed on the report in FIG. 9c, FIG. 10c, and FIG. 11c we turn to FIG. 23. This illustrates the schematic flow of information when the user submits their request for the report desired. As stated above the user selects a recommendation source using a recommendation source selection means (box 438). Based on the recommendation source chosen, the computer apparatus processes the request, using the programmed algorithms, and retrieves the recommendations (box 470) made by the recommendation source from the Recommendation Data Set (box 342) over a predetermined date range. The element queried is the recommendation ID, which uniquely identifies each recommendation made by the recommendation source (in the same manner as FIG. 9a, FIG. 10a, and FIG. 11a).

Box 474 illustrates the association of the recommendation ID from the Recommendation Data Set (box 342) with the other related variables that also come from the Recommendation Data Set which is located in the Data Storage Means (box 106). The items queried in this processing step are:

a) recommendation source name
b) date ID of the recommendation source
c) the article title if the recommendation came from a financial magazine, column name if the recommendation came from an on-line source, and show name if the recommendation came from a broadcast program
d) security identification The final step of processing before the variables are prepared for final display is the association of the recommendations with the performance statistics of those recommendations.

Box 478 illustrates the processing step that retrieves the performance of each recommendation for predetermined date ranges from the Performance Data Set (box 356) which is located in the Data Storage Means (box 106). Currently the only performance statistic that is displayed for the user is the price performance appreciation or depreciation (see calculation in "Origin of the Performance Data Set" for more detail). We have chosen to currently present the information in this fashion because it is easier to read and less overwhelming. However, we have calculated multiple performance statistics for each recommendation that come from the universe consisting of the Smile Index, Pain Index, Sharpe Ratio, benchmark performance, and benchmark Sharpe ratio. These could also be elements displayed on the report.

As stated before, at the completion of this processing step the variables are prepared for final display on the report. Box 480 illustrates the processing step that displays the aforementioned variables on the report for the user to view.

Resulting Report

The report that results from the processing described and illustrated in FIG. 23 can be found in FIG. 9c, FIG. 10c, and FIG. 11c. FIG. 9c illustrates the report that is generated when the user selects an article, on-line column, or broadcast show. FIG. 10c illustrates the report that is generated when the user selects a column from a financial magazine. FIG. 11c illustrates the report that is generated when the user selects a financial magazine, on-line source, or broadcast program. The report displayed allows the user to individually see how each recommendation of the recommendation source they have chosen to analyze have performed over predetermined date ranges.

The report is in an easy to read format so the user can quickly scan the performance of the recommendations to determine whether the recommendation source they are interested in has made recommendations, that we have captured, they could have made money on when they first read or heard about the recommendation.

Recommendation Source

Box 255 in FIG. 9c, box 290 in FIG. 10c, and box 326 in FIG. 11c indicate the recommendation source whose recommendations are being displayed in the report. The recommendation source displayed is based upon the choice of each individual user.

Security ID

Box 220 in FIG. 9c, FIG. 10c, and FIG. 11c indicate the security identification, which includes the universe of the ticker symbol and company name.

Recommendation Source Name

Box 224 in FIG. 9c and FIG. 10c illustrate the name of the specific recommendation source. In the case of a financial magazine, this would be the magazine name. In the case of an on-line source this would be the source's name. In the case of a broadcast program this would be the broadcast program name.

Date ID

Box 222 in FIG. 9c, FIG. 10c, and FIG. 11c illustrate the date ID of the recommendation source. In the case of a financial magazine this would be the issue date. In the case of the on-line source this would be the posting date. In the case of a broadcast program this would be the date of the show.

Article Name

Box 226 in FIG. 9c, FIG. 10c, and FIG. 11c illustrate the name of the article if the recommendation source was a financial magazine, the name of the on-line column if the recommendation source was an on-line source, and the name of the show if the recommendation source was a broadcast program.

Predetermined Date Ranges

Box 254 in FIG. 9c, box 288 in FIG. 10c, and box 324 in FIG. 11c illustrate an example of a predetermined date range that the performance of the recommendation was analyzed and displayed for. The performances of the recommendations would be calculated and displayed based on the price appreciation or depreciation from the first action date to the predetermined date range after the first action date.

Performance

Box 263 in FIG. 9c, box 299 in FIG. 10c, and box 333 in FIG. 11c illustrate an example of a performance statistic for a selected predetermined date range. It is important to note that we have statistically analyzed the performance of each recommendation over a multitude of predetermined date ranges. This report is useful in determining what time frame a memorable recommendation made by a favorite recommendation source has performed the best in. It could also give some insight as to whether or not a recommendation source's recommendations have consistently performed well on an individual basis over a particular time frame.

Element Selection Means

Figure 46:
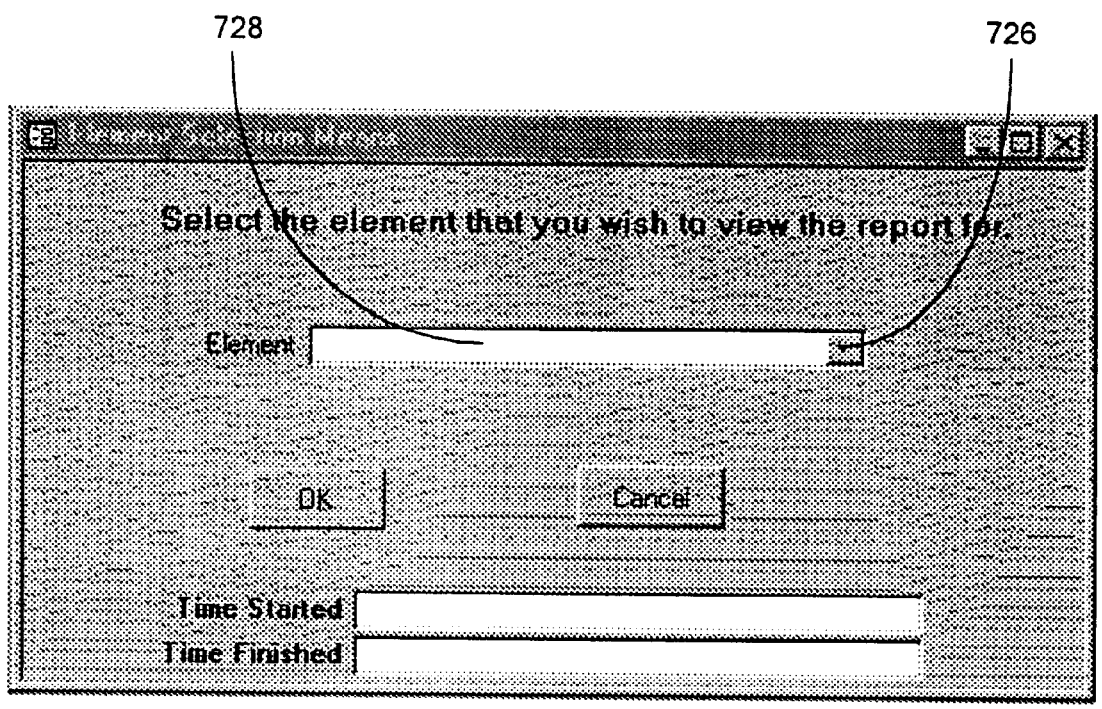
FIG. 46 illustrates an element selection means.

FIG. 46 illustrates an example of a selection means that is used to allow the user to indicate the element, recommendation source, or recommender that they wish to view a report for. Box 726 illustrates a drop down box that will allow the user to select the element, the recommendation source, or the recommender that they wish to view the report for. Box 728 illustrates where the user can enter the element, the recommendation source, or the recommendor that they wish to view the report for. In either case, the user will be afforded the opportunity to display the report for the element, the recommendation source, or the recommender of their choice.

Report of Recommendation Capsules for an Element

FIG. 47 illustrates a report that is generated when a user selects an element using an element selection means (FIG. 46). The user can access the report using the universe of techniques that include the following:

a) selecting the element name they wish to view the recommendations of (FIG. 46, box 726)

b) entering the element name they wish to view the recommendations of (FIG. 46, box 728)

c) hyperlink to the element's report if the environment the user is operating in utilizes and supports hyperlinks.

The report displays the recommendations of the element over a predetermined date range from the universe of recommendation sources we have researched. As stated above the recommendation sources include but are not limited to magazines, online sources, broadcast programs, columns, articles, and recommendors. The predetermined date range that we have arbitrarily selected is a one-year time frame. We have chosen this due to the fact that the number of recommendations made by a recommendation source was at a reasonable level for this date range. A longer time frame may have overwhelmed the user. This does mean that any predetermined date range could have been selected, we have simply chosen this date range for reasons of display purposes.

Figure 48:
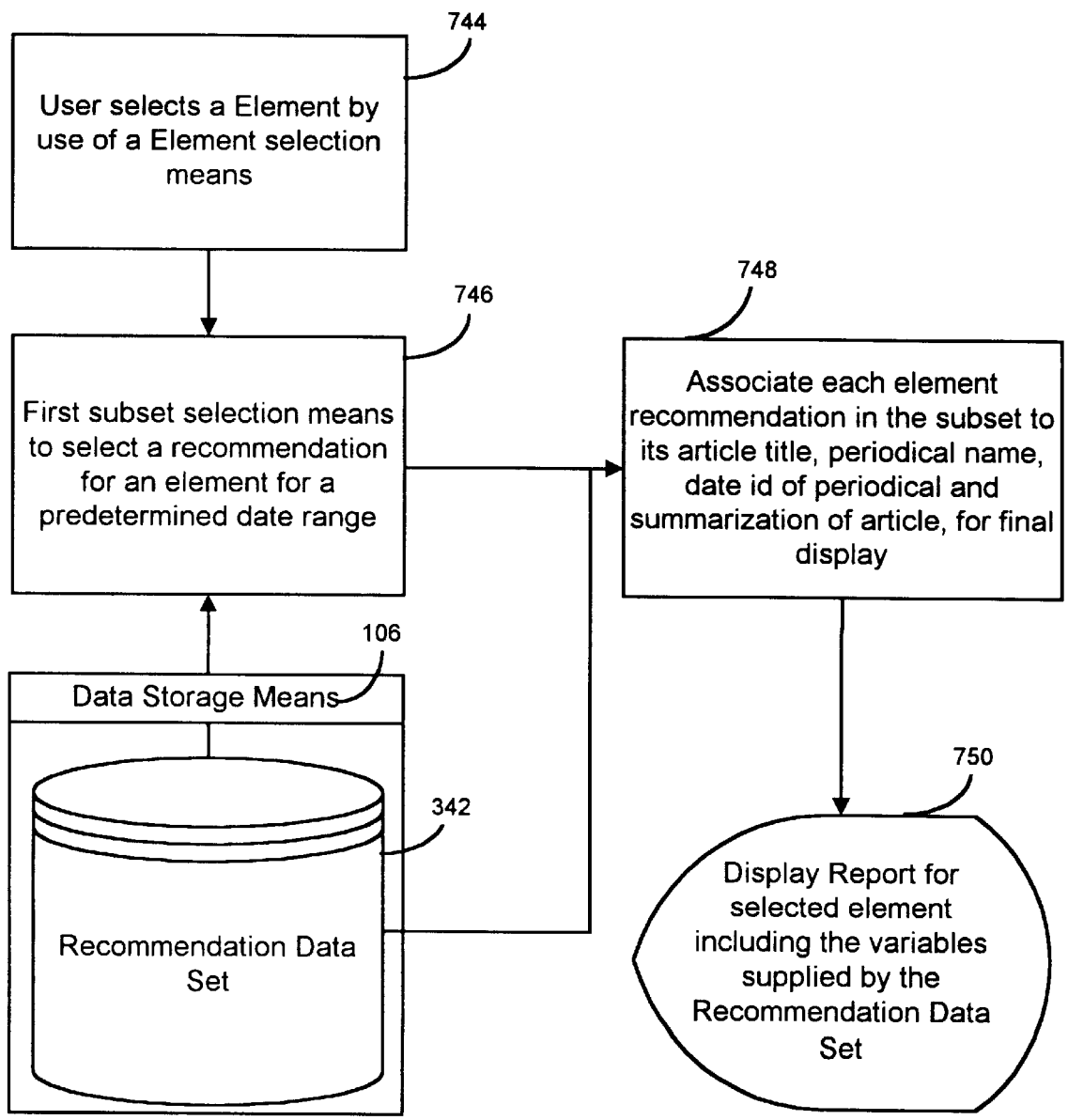
FIG. 48 is a schematic flowchart depicting the generation of the report in FIG. 47. It begins with the user selection through the final display of the report.

To better understand how the information is queried, processed, and finally displayed on the report in FIG. 47 we turn to FIG. 48. FIG. 48 illustrates the schematic flow of information, for a report of recommendation capsules for an element, when the user submits their request. As stated before, the user selects an element by use of an element selection means (FIG. 48, box 744).

The computer apparatus then processes the request utilizing the programmed algorithms to construct the first subset of information. This first subset consists of the recommendations for the element selected for a predetermined date range (box 746). This information is queried from the Recommendation Data Set (box 342) which is stored in the Data Storage Means (box 106). The Recommendation Data Set stores the information related to the recommendation capsules and the recommendation sources (for more detail on the Recommendation Data Set see "Origin of the Recommendation Data Set" which is located at the end of specification section in the section labeled "Origin of the Recommendation Set").

In the current embodiment the computer apparatus utilizes a Microsoft Access select query to construct this first subset. Through the utilization of criteria based upon the selection of the user the select query is able to retrieve just the recommendations for the element chosen for the predetermined date range. The first subset will consist of the unique ID number of the recommendations found within the Access database. This ID number will allow the association of the remainder of the variables that were captured along with the recommendation.

Box 748 illustrates the association of the variables with their respective recommendation. These variables include the title of the article, column, or show in which the recommendation was made, the magazine name, on-line source name, or broadcast program name in which the article, column, or show was found, date ID of the financial magazine (which may optionally include the time of day), on-line source, or broadcast program, and optionally, the summarization of the article, column, or show. Box 748 organizes the variables and prepares them for final display on the invention report.

Once again the current embodiment utilizes a Microsoft Access select query to accomplish this processing step. Using the unique recommendation ID from the first subset generated, the select query is able to link to the additional variables needed for the report via that recommendation ID. The report is then displayed to the user (box 750).

As stated in the prior sentence, the final step of the processing as illustrated in FIG. 48 is the display of the report as seen in FIG. 47. It is organized in such a way that the information requested by the user is easy to read and is useful in helping make a decision. Box 732 in FIG. 47 identifies the element identification as selected by the user. Box 739 identifies a column that contains the recommendation source. On this report it includes the following variables:

a) Box 738 identifies the magazine name, the on-line source name, the broadcast program name, the article name, or the column name.

b) box 740 identifies the date ID of the magazine, on-line source, or broadcast program which identifies the date of publication, column release, or show time c) Box 742 identifies the recommendor name.

Box 734 is optional and is a column that contains the summarization of the magazine article, the on-line column, or the broadcast program show. The summarization highlights the positive, negative, and neutral points that were made when referring to the recommendation made. Within the article summarization, a user can view the positive reasons, the negative reasons, and the neutral reasons as to why the recommendation was stated. Box 736 in FIG. 47 indicates the column that the positive reasons will be listed. This column, as stated before, could also list the negative reasons as well as the neutral reasons.

Box 730 illustrates the column that will store the recommendation information. This recommendation could come in many forms depending on the element being recommended. For example, if this were childrens' toys, the recommendation could be in the form of a buy or don't buy terminology. However, the terminology should not be restricted to only a few examples. The multiple alternatives available will depend greatly upon the wording as cited by the recommendation sources and or the choice wording of the report designer.

This report provides the user with an easy way to view the recommendations being made about the element of interest drawn from some of the most popular magazines, online sources, and broadcast media.

To better understand how the information being displayed on the reports was input into the system and how the performance statistics were precalculated read the sections labeled Origin of the Recommendation Data Set and Origin of the Performance Data Set below.

Origin of the Recommendation Data Set

As stated above in FIG. 2, when the invention of the reports was first conceptualized, a source for the information required, more specifically the Recommendation Data Set (FIG. 26), was not available. Hence, a means to capture and store such information was needed. At this time we devised a data entry means (data capture system or automatic entry) that would provide our invention reports with the necessary information to make them unique and most helpful to investors. The information found within the Recommendation Data Set is critical to the invention reports but its means of capture and calculation is not.

Figure 26:
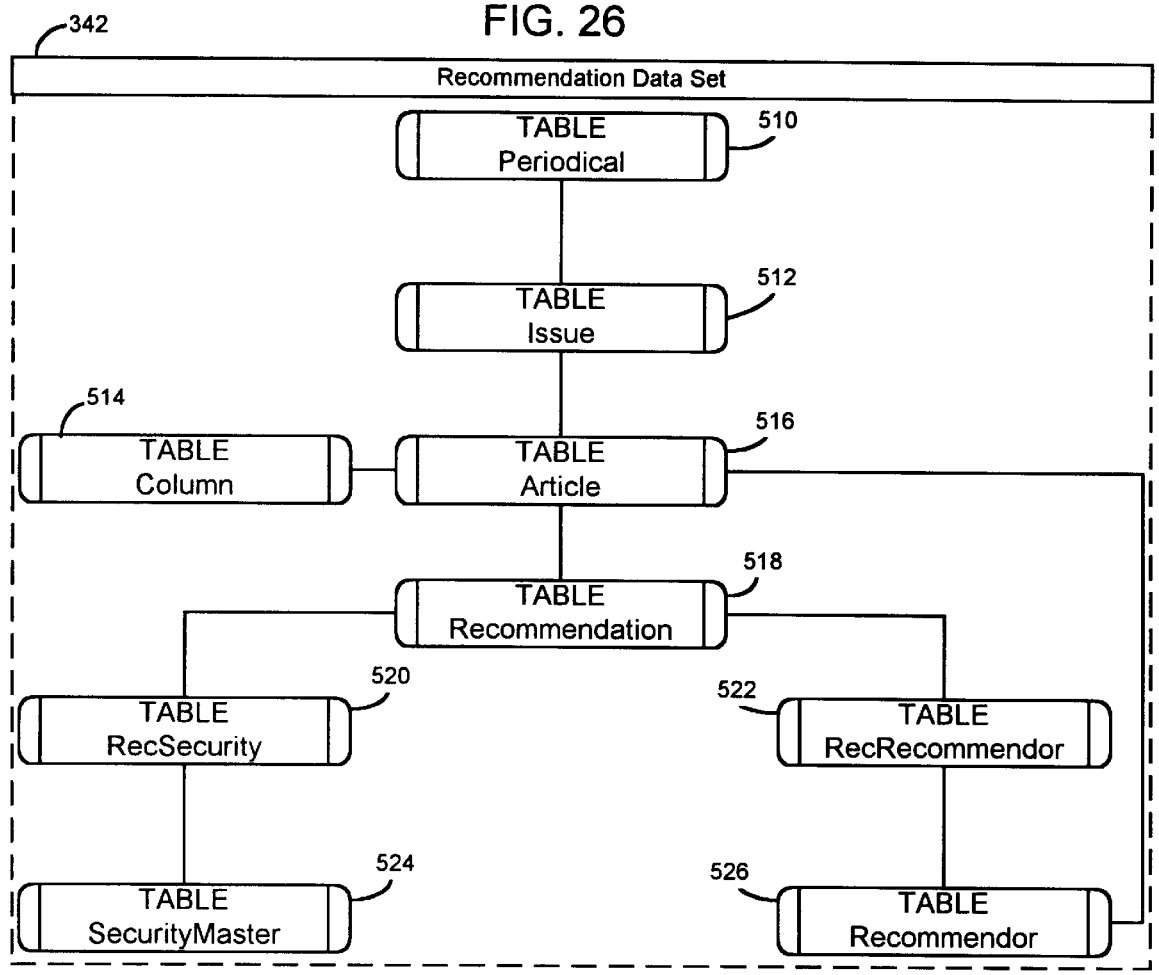
FIG. 26 depicts the Recommendation Data Set and its tables that store the information related to the recommendation capsules and recommendation sources.

FIG. 26 illustrates the Recommendation Data Set (box 342) which stores the recommendation capsules, the recommendation sources, and other recommendation related information. The information is stored in a Microsoft Access database. The database structure is relational and the information displayed on the reports is stored in multiple tables within the Access database. This information can be found in the following tables:

Table Periodical (box 510)—The Periodical table stores the information related to the financial magazines, on-line sources, and broadcast programs. The fields found within this table include:
  a) name of the magazine, on-line source, and broadcast program
  b) unique ID of the magazine, on-line source, and broadcast program Table Issue (box 512)—The Issue table stores the information related to the Periodical and the date of which the information in the Periodical was available to the investor. The fields found within this table include:
  a) unique ID of the magazine, on-line source, and broadcast program
  b) date ID of the magazine, on-line source, and broadcast program
  c) arrival date of the magazine, posting date of the on-line source, and show time of the broadcast program
  d) first action date of the recommendations made in the magazine, on-line source, and broadcast program
  e) multiple predetermined analysis dates
  f) unique ID of the issue Table Column (box 514)—The column table stores the name of the column as it appears in a magazine or on-line source. The fields found within this table include:
  a) column name
  b) unique column ID Table Article (box 516)—The Article table stores the information related to the specific article, on-line column, and broadcast show that the security was recommended in. The fields found within this table include:
  a) title of the article, name of on-line column, name of broadcast show
  b) column ID in which the article appeared (optional)
  c) recommender ID of the author of the article, author of the on-line column, and host of the broadcast show (optional).
  d) starting page number, specific URL, and specific time segment
  e) number of pages and length of show
  f) unique article ID Table Recommendation (box 518)—The Recommendation table stores the information related to the recommendation. It has evolved substantially over time. Originally the table contained a minimal amount of fields. The original fields found within this table are:
  a) unique article ID
  b) suggested recommendation
  c) article summarization which can be divided into bullish summarization and bearish summarization
  d) recommendation ID After continual evolution, the Recommendation table now contains a wide variety of fields. These additional fields allow for the performance analysis of the recommendation across multiple variable alternatives. They also provide the user with information they could not receive anywhere else. The fields contained in this table after the evolution are:
  a) unique article ID
  b) suggested recommendation
  c) article summarization which can be divided into bullish summarization and bearish summarization
  d) order in the article
  e) tone of the recommendation
  f) article support data
  g) security support data
  h) recent price
  i) date of recent price
  j) target price
  k) target date of target price
  l) target percentage
  m) currency of pricing information
  n) buy below
  o) sector ID of company
  p) industry ID of company
  q) verbal category of industry
  r) investment style of recommendation
  s) second investment style of recommendation
  t) exit strategy of recommendation u) stop code of recommendation v) unique recommendation ID As stated before, the continual evolution of the table and the invention reports could see the amount of variables captured increase over time. This would provide the investor with more information and the performance analysis with more variables to statistically analyze.

Table RecSecurity (box 520)—The RecSecurity table enables the recommendation information to be associated with the security information. The fields found within this table are:

a) unique recommendation ID b) unique security ID

Table SecurityMaster (box 524)—The SecurityMaster table stores the information related to the security. The fields found within this table are:

a) security name b) security ticker symbol c) unique security ID

Table RecRecommendor (box 522)—The RecRecommendor table enables the recommendation information to be associated with the recommender information. The fields found within this table are:

a) unique recommendation ID b) unique recommender ID

Figure 24:
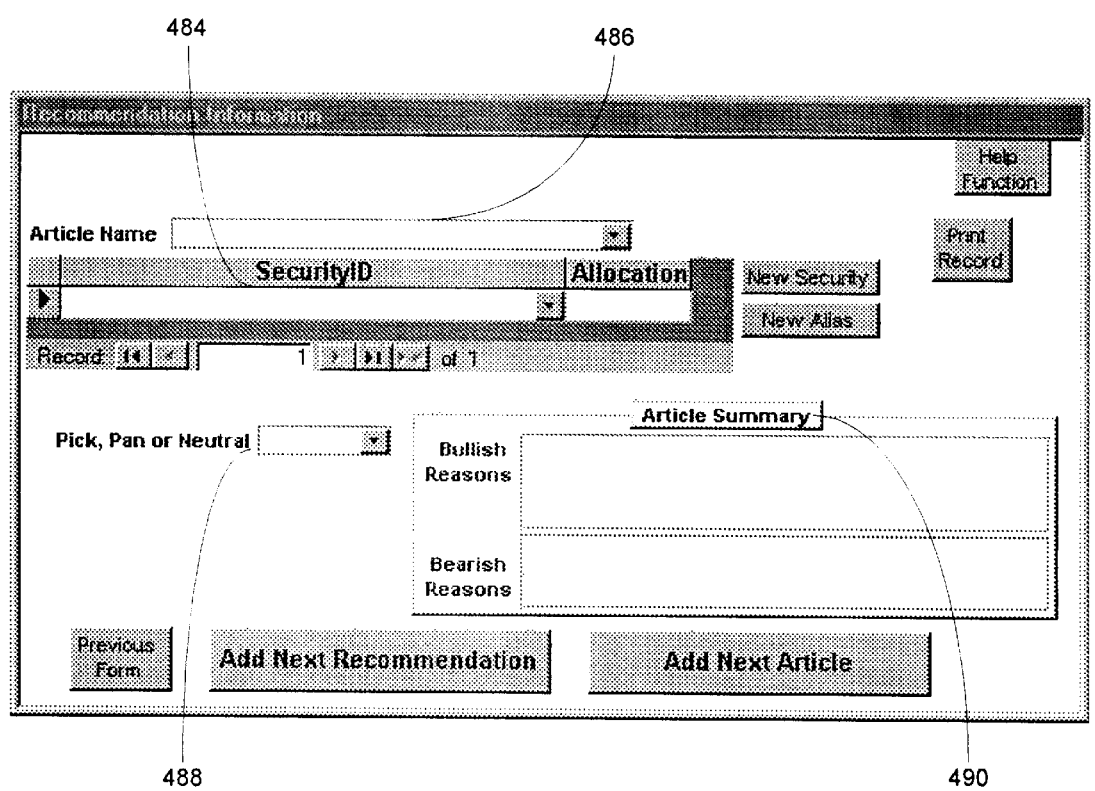
FIG. 24 illustrates the original data capture form for the recommendation capsule.

Table Recommendor (box 526)—The Recommendor table stores the information related to the recommender. The fields found within this table are:

a) recommender full name b) recommender last name c) recommendor first name d) firm of the recommender e) unique recommendor ID The main source of information found on the invention reports can be traced back to the Recommendation table. This would be considered the primary table in the web of tables found within the Access database. As stated before, the Recommendation table has evolved over time and will continue to evolve over time. The goal is to provide the user with the most useful information in an easy to read format. The input of the information into the original Recommendation table was completed through the Access form found in FIG. 24.

Input of Article ID

Box 486 illustrates where the input of the article ID field would occur. It allowed for the capture of the article title if the source was a magazine, an on-line column if the source was an on-line source, and show name if the source was a broadcast program which is associated to a unique ID number. Each recommendation is associated with an article ID.

Input of Security ID

Box 484 illustrates where the input of the security ID field would occur. This information would actually be stored in the table RecSecurity. Box 484 is part of a subform, which allows information to be stored in multiple tables.

Input of Recommendation

Box 488 illustrates where the input of the recommendation would come from. This includes the choices that come from the universe consisting of pick, pan, neutral, implied pick, implied pan, combo pick and pan, combo pick and short, short, and others. A combo pick and short is where one security is bought long and another security is shorted at the same time as part of the same recommendation. A combo pick and pan is where one security is bought long and another security is sold, assuming the user currently owns the security. (Note: These combo recommendations are very rare and constitute less than 1% of the recommendations found in our database.) The selection would be made based on the recommendation made in the recommendation source.

Input of Article Summarization

Box 490 illustrates where the input of the article summarization field would occur. Alternatively, the summarization could be captured by separating the reasons supporting or contradicting the recommendation into a bullish summarization or a bearish summarization. The bullish summarization would capture the positive points made about the company or the recommendation and the bearish summarization would capture the negative points made about the company or the recommendation.

Figure 25:
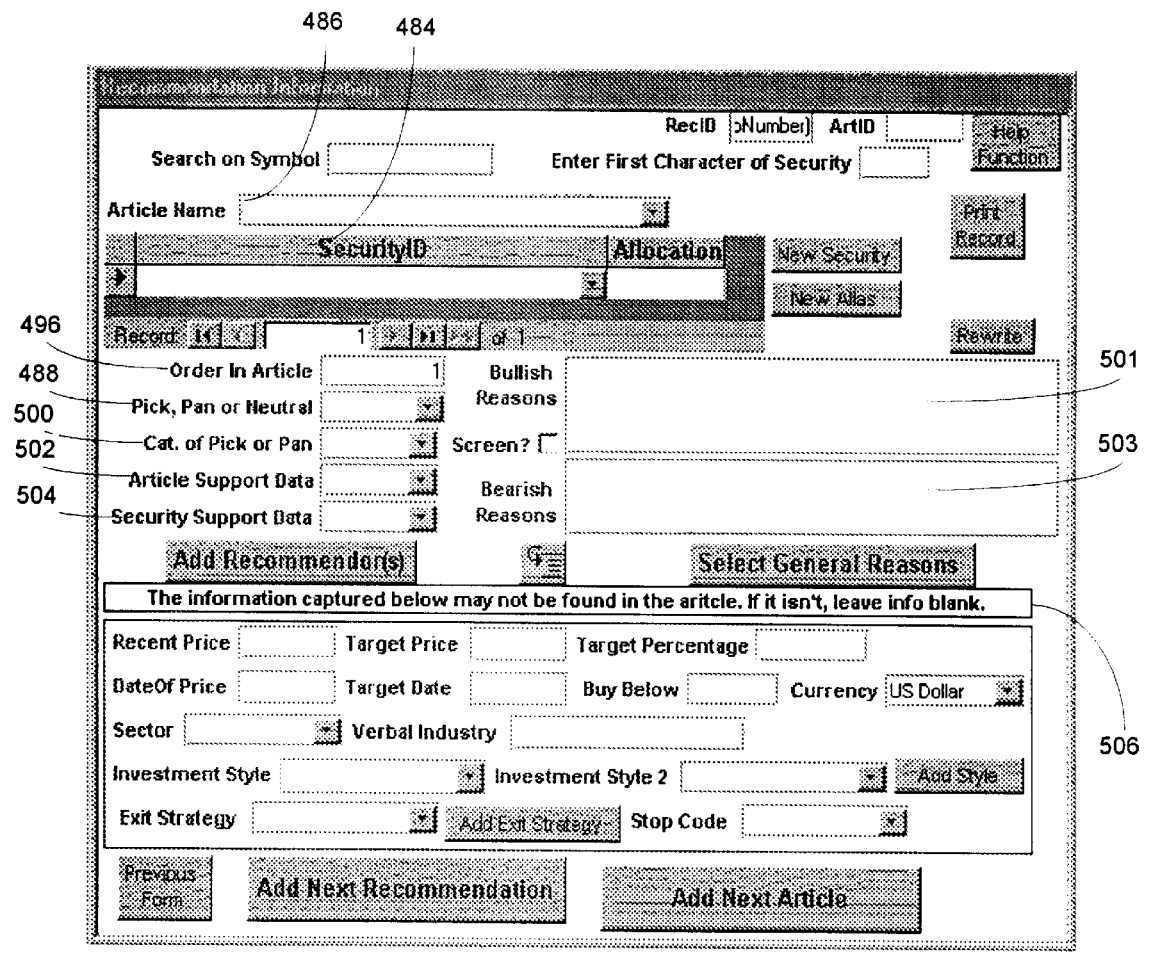

The input of the information into the evolved Recommendation table was completed through the Access form found in FIG. 25.

Selection of Associated Article

Box 486 illustrates where the selection of the article ID in a drop down box would occur. It allowed for the capture of the article title if the source was a magazine, an on-line column if the source was an on-line source, and show name if the source was a broadcast program which is associated to a unique ID number. Each recommendation is associated with an article ID.

Input of Security ID

Box 484 illustrates where the input or selection of the security ID field from a drop down list would occur. This information would actually be stored in the table RecSecurity. Box 484 is part of a subform which allows information to be stored in multiple tables.

Input of Recommendation

Box 488 illustrates where the input of the recommendation would occur. This includes the choices that come from the universe consisting of pick, pan, neutral, implied pick, implied pan, combo pick and pan, and combo pick and short. The selection would be made based on the recommendation made in the recommendation source.

Input of Order in Article

Box 496 illustrates where the input of the order in the article, on-line column, and broadcast show would occur. The order in the article refers to the order in which the recommendation was made as compared to the other recommendations in the article. For example, if there were three recommendations in an article, on-line column, and broadcast show and the first recommendation was being input, the number I would be entered.

Input of Tone

Box 500 illustrates where the input of the tone of the recommendation would occur. The tone of the recommendation refers to the amount of enthusiasm expressed by the recommendor when making the recommendation in the recommendation source. If the recommender was extremely enthusiastic about the recommendaton, the letter A would be captured. If the recommender was not enthusiastic at all the letter D would be entered.

Input of Article Support Data

Box 502 illustrates where the input of the amount of article support data would occur. The amount of article support data refers to the level of general fundamental and technical information supplied in the article in support of the recommendation being made. General information could include industry information and market information. If there was an abundant amount of general article support information the letter A would be input. If there was no general article support information given the letter C would be input.

Input of Security Support Data

Box 504 illustrates where the input of the amount of article security data would occur. The amount of article security data refers to the level of fundamental and technical information supplied in the article in support of the security being recommended. Security support information could include security stock price performance, new company CEO information, and ratio information. If there was an abundant amount of security support information the letter A would be input. If there was no security support information given the letter C would be input.

Input of Bullish Summarization

Box 501 illustrates where the input of the bullish summarization would occur. The bullish summarization refers to the positive things being said with regards to the recommendation being made.

Input of Bearish Summarization

Box 503 illustrates where the input of the bearish summarization would occur. The bearish summarization refers to the negative things being said with regards to the recommendation being made.

Input of Miscellaneous Variables for each Recommendation

Box 506 illustrates the section where the input of the multiple additional variables would occur. Some of the additional variables currently being captured are:

a) current price of security
b) date of price
c) target price of security
d) target date of target price
e) target percentage if target price is reached
f) buy below which indicates at what price the user should buy the stock or not buy the stock
g) currency that the security trades in based on recommendation
h) sector ID of the security
i) industry ID of the security
j) verbal industry as cited in the recommendation
k) investment style of recommendation
l) second investment style of recommendation
m) exit strategy of recommendation
n) stop code of recommendation These additional variables will continue to evolve. As long as we can identify variables that the end user is interested in seeing and the statistical analysis can analyze the evolution of this form and the underlying table will continue.

Origin of the Performance Data Set

In addition to not finding a source for the Recommendation Data Set we also discovered that there was no source that tracked and calculated the performance of the recommendations within the Recommendation Data Set. Hence, we devised a system that would calculate the needed performance measures such as general price appreciation or depreciation based on the first date that an investor could act on the recommendations and a corresponding predetermined ending date, the Sharpe ratio of each recommendation, and the Smile Index and Pain Index, which are proprietary ranking calculations.

The reason it is important to track the performances from the first day an investor could act is because magazines report on the performance of their articles based on the date an article is written (if they report it at all). Unfortunately, that does not answer the question whether the consumer could have made money by acting on a recommendation after the consumer received the recommendation. (The first trading day after receipt of issue).

The predetermined ending dates are automatically calculated upon input of the date ID that the recommendation was available to the user. It is calculated using a formula that ensures these action dates do not fall on a weekend or exchange holiday.

List of the Performance Data Sets

Figure 44:
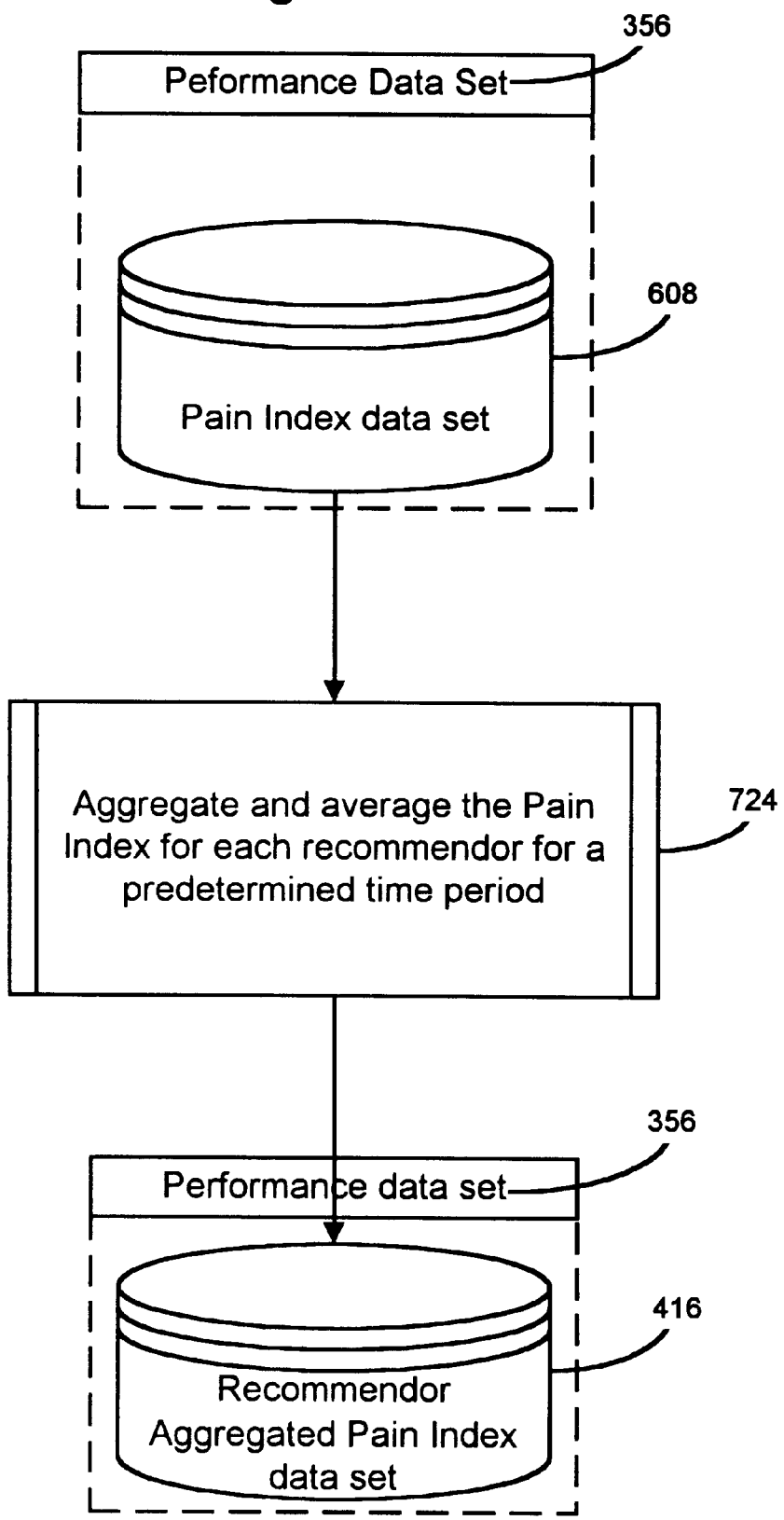
FIG. 44 is a schematic flowchart depicting the calculation and generation of the Recommendor Aggregated Pain Index data set.
Figure 45:
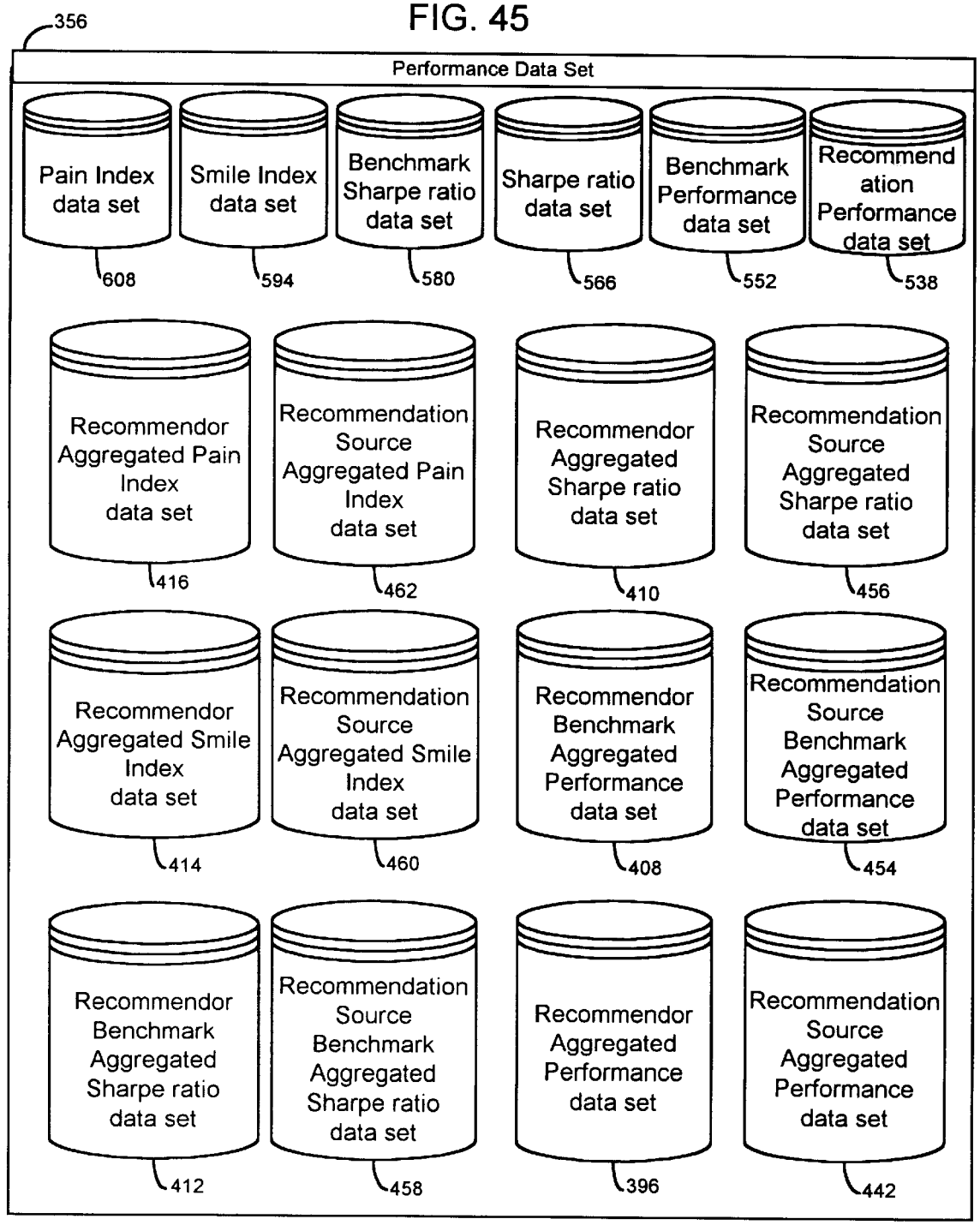
FIG. 45 depicts the Performance Data Set and the tables that store the information related to the performance of recommendors and recommendation sources.

FIG. 45 illustrates the Performance Data Set (box 356) and the tables that are found within the data set. As with the Recommendation Data Set, the Performance Data Set is found within a Microsoft Access database. The relational structure available in an Access database was the most easily accessible and most efficient structure we could find. Separating each performance analysis variable into a table within the Performance Data Set allowed the algorithms of the computer apparatus to access and process the performance information more quickly. However, the structure that the data is stored in could come in a wide variety of forms. FIG. 45 is the result of numerous calculations and processing. This calculating and processing is described in FIG. 27 through FIG. 44. The tables that result from the processing and that are stored in the Performance Data Set are as follows:

1) Recommendation Performance data set (box 538)
2) Benchmark Performance data set (box 552)
3) Sharpe ratio data set (box 566)
4) Benchmark Sharpe ratio data set (box 580)
5) Smile Index data set (box 594)
6) Pain Index data set (box 608)
7) Recommendor Aggregated Performance data set (box 396)
8) Recommendation Source Aggregated Performance data set (box 442)
9) Recommendor Benchmark Aggregated Performance data set (box 408)
10) Recommendation Source Benchmark Aggregated Performance data set (box 454)
11) Recommendor Aggregated Sharpe ratio data set (box 410)
12) Recommendation Source Aggregated Sharpe ratio data set (box 456)
13) Recommendor Benchmark Aggregated Sharpe ratio data set (box 412)
14) Recommendation Source Benchmark Aggregated Sharpe ratio data set (box 458)
15) Recommendor Aggregated Smile Index data set (box 414)
16) Recommendation Source Aggregated Smile Index data set (box 460)
17) Recommendor Aggregated Pain Index data set (box 416)
18) Recommendation Source Aggregated Pain data set (box 462)

Generation of Recommendation Performance Data Set

FIG. 27 through FIG. 32 are schematic flowcharts that illustrate the first stage in the performance calculations. The flowcharts outline the association of the recommendations with the appropriate pricing data for the predetermined date ranges. They then show the calculation stage of the processing. For each performance variable the calculation is different so a discussion of each calculation follows. Finally, the performance analysis for each variable is stored in a new table that is in a format that can either be used for final display or subjected to additional processing in order for the information to be available for final display.

Figure 27:
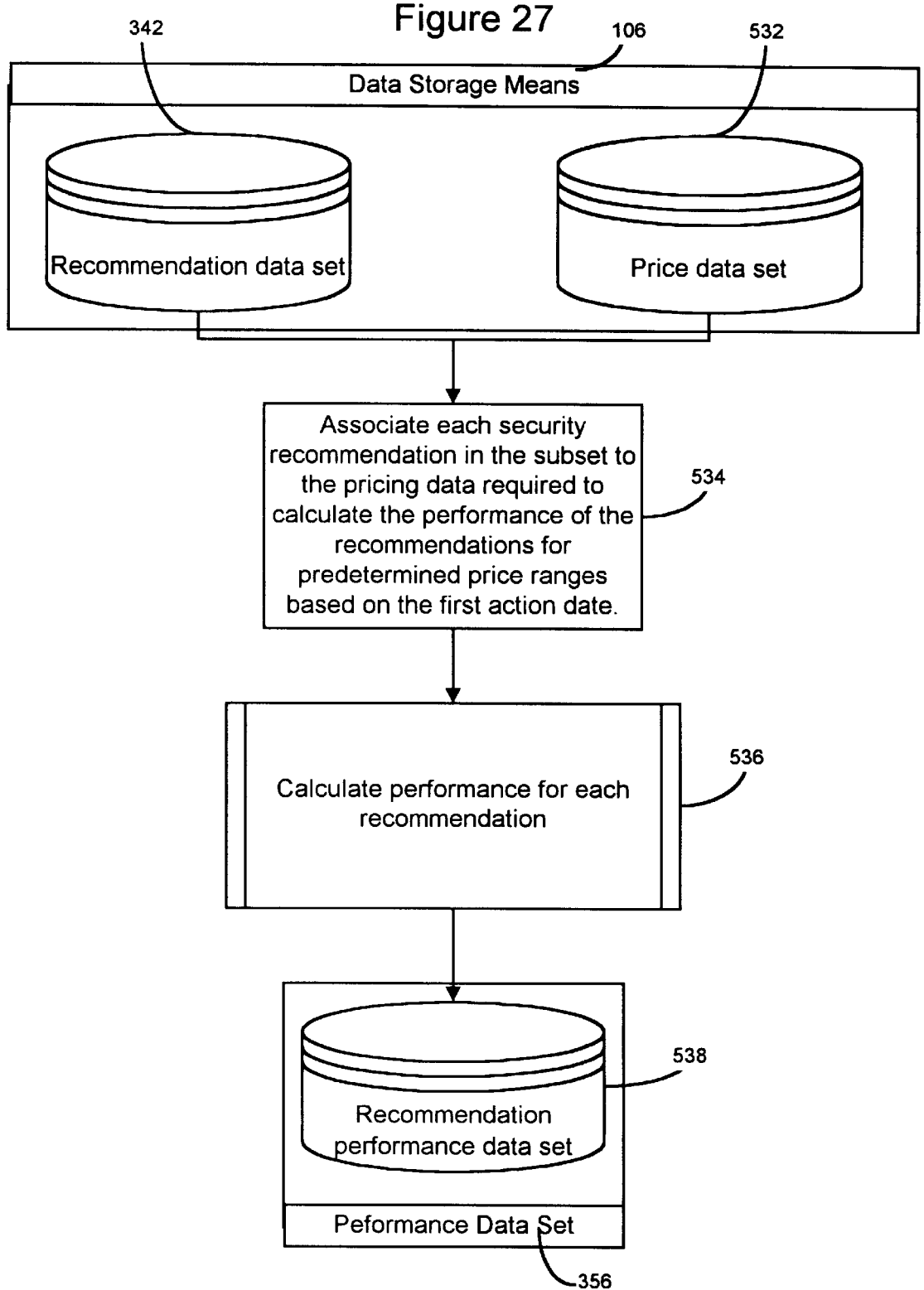
FIG. 27 is a schematic flowchart depicting the calculation and generation of the Recommendation performance data set.

FIG. 27 is a schematic flowchart that illustrates the generation of the Recommendation performance data set. The Recommendation performance data set is an Access table that stores the price performance of each recommendation stored in the Recommendation Data Set. Box 534 illustrates the processing stage that associates the recommendations from the Recommendation Data Set (box 342) and the pricing information from the Pricing Data Set (box 532) which are found in the Data Storage Means (box 106). The information queried from the Recommendation Data Set is the unique ID of each recommendation, the unique ID of the security for each recommendation, the first action date ID, and the predetermined date ranges that the performance will be analyzed for. In the current embodiment, the Microsoft Access database structure, the information is associated utilizing a select query. The select query is designed in such a way that it will link the unique ID of the security from the Recommendation Data Set with the unique ID of the security from the Pricing Data Set and retrieve all the pricing information of that security for the predetermined date ranges. For example, if the predetermined date range were the three month time frame, the select query would retrieve the pricing data for each security for the first action day and the three month date. This will enable the next processing step to calculate the price performance over the three month date range. Box 536 illustrates the processing step that calculates the price performance for each recommendation for the predetermined date ranges. The price performance can be calculated by applying the equation that follows:

Formula 1—Price Performance $$\text{Price performance} = ((\text{Stock price }(t_1) - \text{Stock price }(t_0))/\text{Stock price }(t_1)) * 100$$

$t_0$=first action date or the beginning date $t_1$=ending date of the predetermined date range after $t_0$ The formula above is processed by the computer within a make table query that is preprogrammed with the formula in Formula 1 for each predetermined date range. The make table query is used in order to complete the final processing step in the flowchart, the creation of the Access table. Box 538 illustrates the table that stores the recommendation performance information for the predetermined date ranges. This table is stored in the Performance Data Set (box 356). The fields found within the table are as follows:

a) unique recommendation ID
b) unique security ID
c) first action date ID
d) predetermined date ranges
e) performance for each predetermined date range.

The performance information is now available so that additional calculations can be applied or that the variables be used for display on the invention reports.

Figure 28:
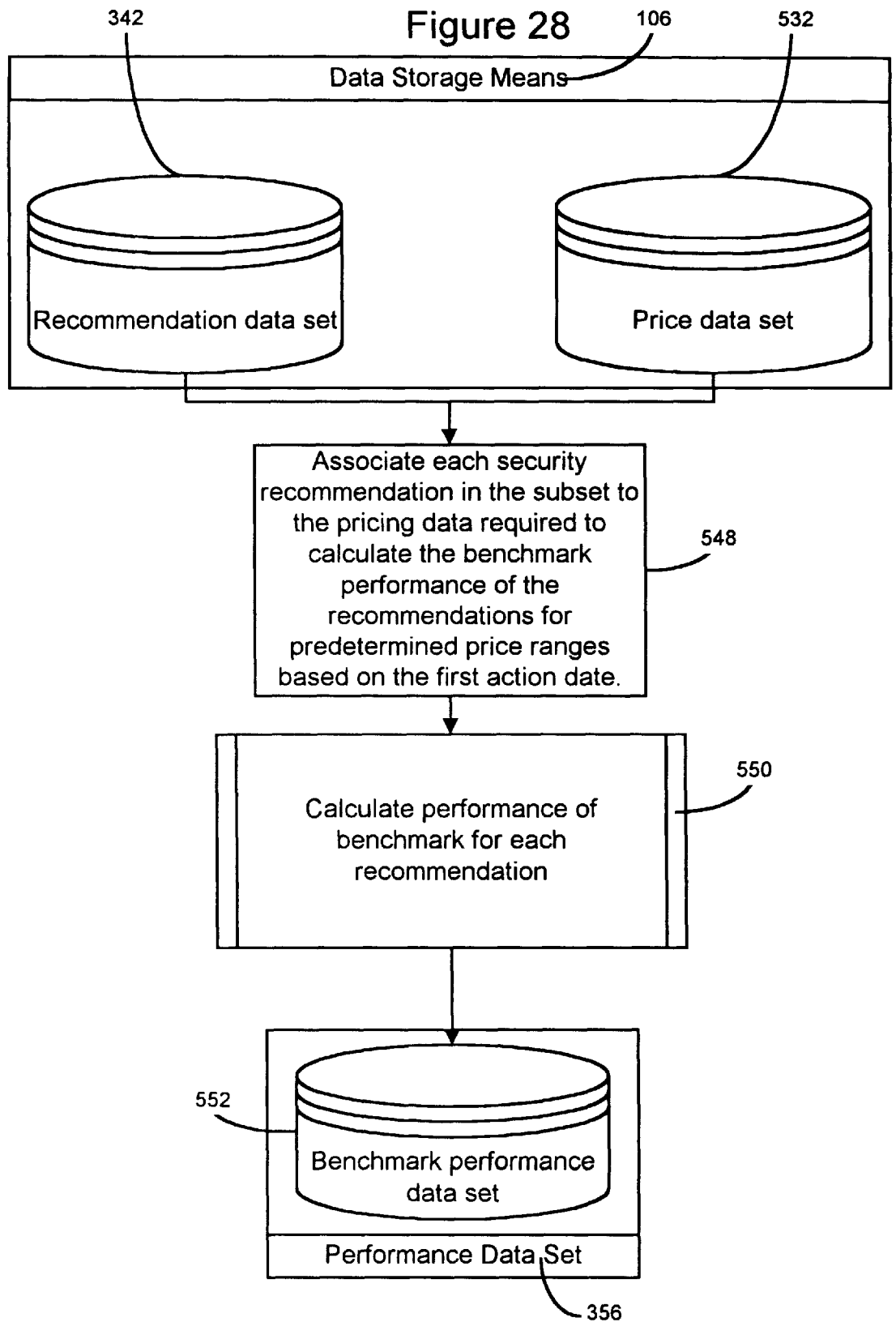
FIG. 28 is a schematic flowchart depicting the calculation and generation of the Benchmark performance data set.

FIG. 28 is a schematic flowchart that illustrates the generation of the Benchmark performance data set. The Benchmark performance data set is an Access table that stores the price performance of the benchmark for each recommendation stored in the Recommendation Data Set. Box 548 illustrates the processing stage that associates the recommendations from the Recommendation Data Set (box 342) and the pricing information for the benchmark from the Pricing Data Set (box 532) which are found in the Data Storage Means (box 106). The information queried from the Recommendation Data Set is the unique ID of each recommendation, the unique ID of the benchmark for each recommendation, the first action date ID, and the predetermined date ranges that the performance will be analyzed for.

In the current embodiment, the Microsoft Access database structure, the information is associated utilizing a select query. The select query is designed in such a way that it will link the unique ID of the benchmark from the Recommendation Data Set with the unique ID of the benchmark from the Pricing Data Set and retrieve all the pricing information of that benchmark for the predetermined date ranges. For example, if the predetermined date range were the three month time frame, the select query would retrieve the pricing data for each benchmark for the first action day and the three month date. This will enable the next processing step to calculate the price performance over the three month date range. Box 550 illustrates the processing step that calculates the price performance for the benchmark for each recommendation for the predetermined date ranges. The price performance can be calculated by applying the equation that follows:

Formula 2—Benchmark Performance $$\text{Benchmark Performance} = ((\text{Benchmark price }(t_1) - \text{Benchmark price }(t_0))/\text{Benchmark price }(t_1)) * 100$$

$t_0$=first action date or the beginning date $t_1$=ending date of the predetermined date range after $t_0$ The formula above is processed by the computer within a make table query that is preprogrammed with the formula in Formula 2 for each predetermined date range. The make table query is used in order to complete the final processing step in the flowchart, the creation of the Access table. Box 552 illustrates the table that stores the recommendation performance information for the predetermined date ranges. This table is stored in the Performance Data Set (box 356). The fields found within the table are as follows:

a) unique recommendation ID
b) unique benchmark ID
c) first action date ID
d) predetermined date ranges
e) performance for each predetermined date range.

The performance information is now available so that additional calculations can be applied or for display on the invention reports.

Sharpe ratio

Figure 29:
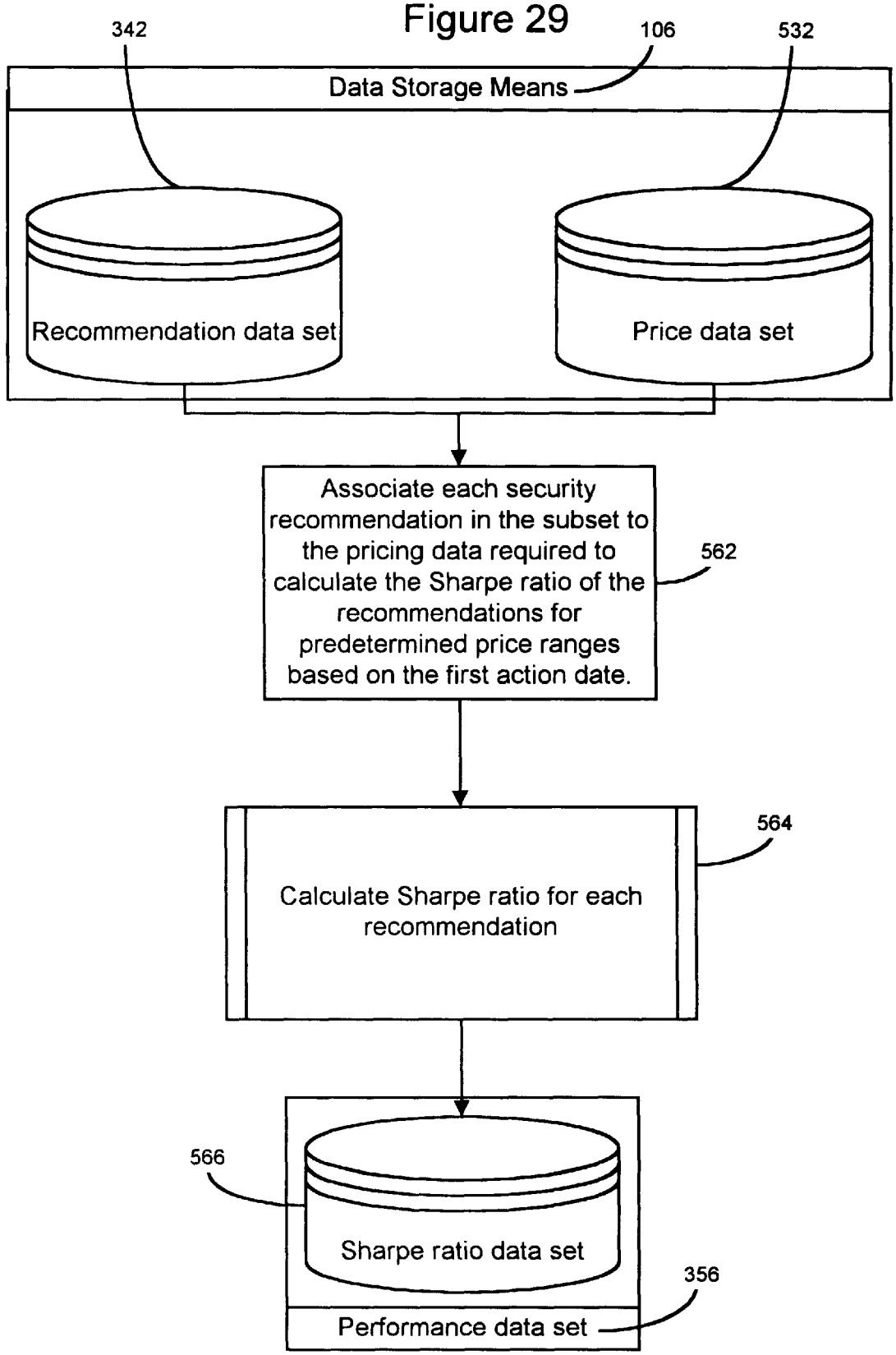
FIG. 29 is a schematic flowchart depicting the calculation and generation of the Sharpe ratio data set.

FIG. 29 is a schematic flowchart that illustrates the generation of the Sharpe ratio data set. The Sharpe ratio data set is an Access table that stores the risk adjusted price performance for each recommendation stored in the Recommendation Data Set. Box 562 illustrates the processing stage that associates the recommendations from the Recommendation Data Set (box 342) and the pricing information for the security from the Pricing Data Set (box 532) which are found in the Data Storage Means (box 106). The information queried from the Recommendation Data Set is the unique ID of each recommendation, the unique ID of the security for each recommendation, the first action date ID, and the predetermined date ranges that the performance will be analyzed for. In the current embodiment, the Microsoft Access database structure, the information is associated utilizing a select query (in the same manner as FIG. 28). Box 564 illustrates the processing step that calculates the risk adjusted price performance, Sharpe ratio, for the security for each recommendation for the predetermined date ranges. The Sharpe ratio can be calculated by applying the equation that follows:

Formula 3—Sharpe ratio $$\text{Sharpe ratio} = ((\text{Avg. ROR} - \text{T-Bill Interest Rate})/\text{Standard Deviation}) * 100$$

Avg. ROR=Average recommendation rate of return for one of the predetermined time periods T-Bill Interest Rate=Treasury bill interest rate for one of the predetermined time periods Standard Deviation =Standard deviation of return for one of the predetermined time periods The formula above is processed by the computer within a make table query that is preprogrammed with the formula in Formula 3 for each predetermined date range. The make table query is used in order to complete the final processing step in the flowchart, the creation of the Access table. Box 566 illustrates the table that stores the recommendation Sharpe ratio information for the predetermined date ranges. This table is stored in the Performance Data Set (box 356). The fields found within the table are as follows:

a) unique recommendation ID b) unique security ID c) first action date ID d) predetermined date ranges e) Sharpe ratio for each predetermined date range.

The Sharpe ratio information is now available so that additional calculations can be applied or that the variables be used for display on the invention reports.

At the time of the submission of the patent, we have begun to calculate the Sharpe ratio in an alternative way. The three variables utilized remain the same, but the time periods for which the calculation is generated varies. In the above formula, the Sharpe ratio is calculated for one time frame. The way we are beginning to calculate the Sharpe ratio is for one time period and multiple data points within that one time period. For example, if the Sharpe ratio for the one-year time period were desired, the calculation can use the standard deviation of each month within the one-year time frame to calculate the overall Sharpe ratio for the one year time period.

With this as the basis, the Sharpe ratio calculation for the one-year time period will use 12 months, the six-month time period will use six months, the three-month time period will use 12 weeks, the one-month time frame will use 4 weeks, the one-week time period will use 7 days, and the three-day time period will use three days. The calculation could utilize varying data points depending on the desired results. In other words, the number of data points utilized in the calculation of the standard deviation, and hence, the Sharpe ratio can vary.

Benchmark Sharpe ratio

Figure 30:
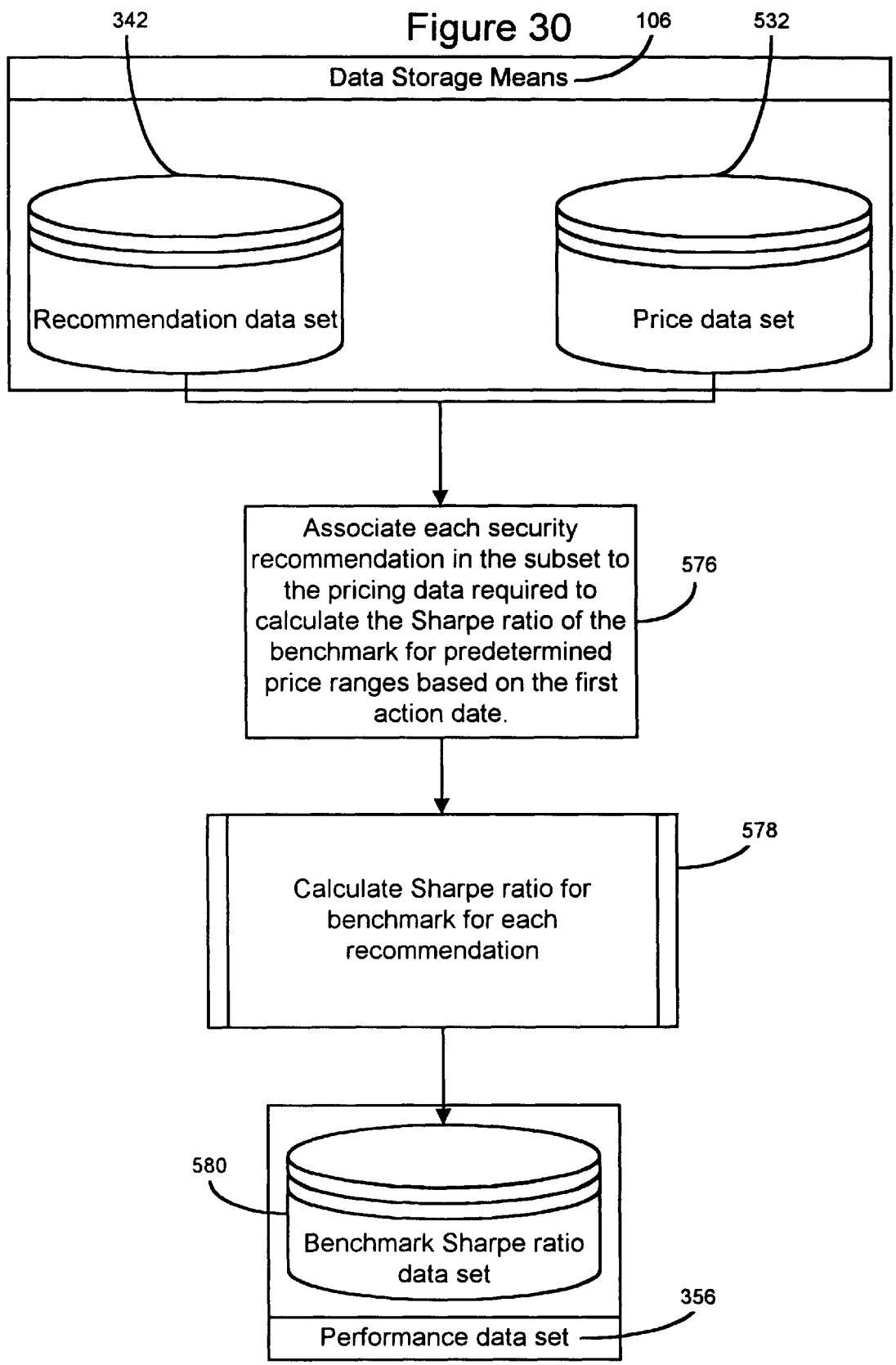
FIG. 30 is a schematic flowchart depicting the calculation and generation of the Benchmark Sharpe ratio data set.

FIG. 30 is a schematic flowchart that illustrates the generation of the Benchmark Sharpe ratio data set. The Benchmark Sharpe ratio data set is an Access table that stores the risk adjusted price performance of the benchmark for each recommendation stored in the Recommendation Data Set. Box 576 illustrates the processing stage that associates the recommendations from the Recommendation Data Set (box 342) and the pricing information for the benchmark from the Pricing Data Set (box 532) which are found in the Data Storage Means (box 106). The information queried from the Recommendation Data Set is the unique ID of each recommendation, the unique ID of the benchmark for each recommendation, the first action date ID, and the predetermined date ranges that the performance will be analyzed for. In the current embodiment, the Microsoft Access database structure, the information is associated utilizing a select query (in the same manner as FIG. 29). Box 578 illustrates the processing step that calculates the risk adjusted price performance, Sharpe ratio, of the benchmark for each recommendation for the predetermined date ranges. The Sharpe ratio can be calculated by applying the equation that follows:

Formula 4—Benchmark Sharpe ratio $$\text{Benchmark Sharpe ratio} = ((\text{Avg. ROR} - \text{T-Bill Interest Rate})/\text{Standard Deviation}) * 100$$

Avg. ROR=Average benchmark rate of return for one of the predetermined time periods T-Bill Interest Rate=Treasury bill interest rate for one of the predetermined time periods Standard Deviation=Standard deviation of return for one of the predetermined time periods The formula above is processed by the computer within a make table query that is preprogrammed with the formula in Formula 4 for each predetermined date range. The make table query is used in order to complete the final processing step in the flowchart, the creation of the Access table. Box 580 illustrates the table that stores the benchmark Sharpe ratio information for each recommendation for the predetermined date ranges. This table is stored in the Performance Data Set (box 356). The fields found within the table are as follows:

a) unique recommendation ID b) unique benchmark ID c) first action date ID d) predetermined date ranges e) benchmark Sharpe ratio for each predetermined date range.

The benchmark Sharpe ratio information is now available so that additional calculations can be applied or that the variables be used for display on the invention reports.

Smile Index

Figure 31:
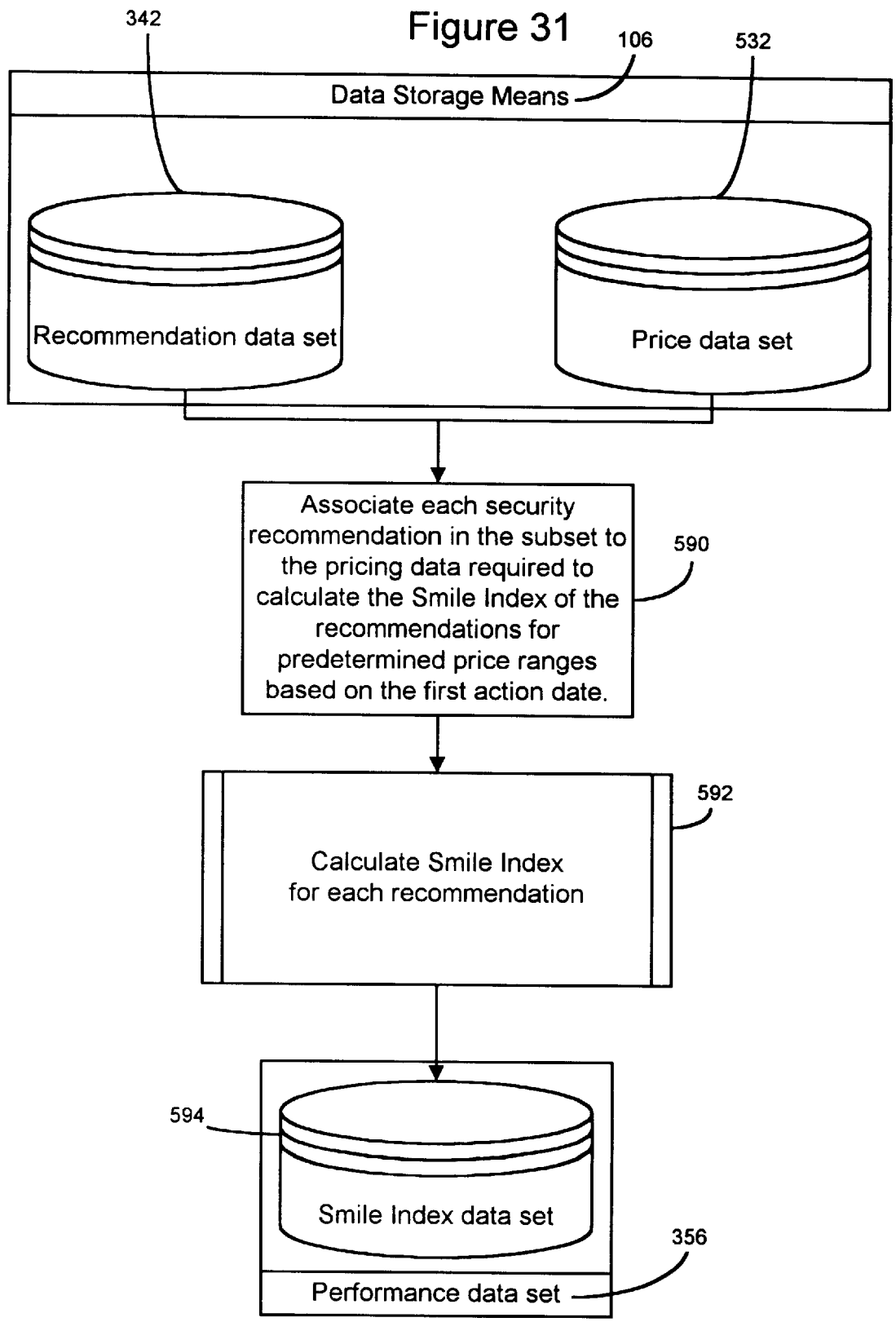
FIG. 31 is a schematic flowchart depicting the calculation and generation of the Smile Index data set.

FIG. 31 is a schematic flowchart that illustrates the generation of the Smile Index data set. The Smile Index data set is an Access table that stores the proprietary calculation that attempts to numerically describe the pleasantness of each of the recommendations stored in the Recommendation Data Set. Box 590 illustrates the processing stage that associates the recommendations from the Recommendation Data Set (box 342) and the pricing information for the security from the Pricing Data Set (box 532) which are found in the Data Storage Means (box 106). The information queried from the Recommendation Data Set is the unique ID of each recommendation, the unique ID of the security for each recommendation, the first action date ID, and the predetermined date ranges that the Smile Index will be analyzed for.

In the current embodiment, the Microsoft Access database structure, the information is associated utilizing a select query. The select query is designed in such a way that it will link the unique ID of the security from the Recommendation Data Set with the unique ID of the security from the Pricing Data Set and retrieve all the pricing information of that security for the predetermined date ranges. For example, if the predetermined date range were the three month time frame, the select query would retrieve the pricing data for each security for the first action day and the pricing data for each subsequent trading date throughout the three month date. This will enable the next processing step to calculate the Smile Index for the three month date range. Box 592 illustrates the processing step that calculates the Smile Index for each recommendation for the predetermined date ranges. The Smile Index can be calculated by applying the equation that follows:

Formula 5—Smile Index $$\text{Smile Index} = \frac{\sum_{i=1}^{d}(IIf(\text{Price}_i > \text{First Days' Price}), ((\text{Price}_i - \text{First Days' Price})/\text{First Days' Price}) * 100, 0)}{\text{Total \# of days in period}}$$

d=Total # of days in period

The formula above is processed by the computer within a make table query that is preprogrammed with the formula in Formula 5 for each predetermined date range. The make table query is used in order to complete the final processing step in the flowchart, the creation of the Access table. Box 594 illustrates the table that stores the recommendation Smile Index information for the predetermined date ranges. This table is stored in the Performance Data Set (box 356). The fields found within the table are as follows:

a) unique recommendation ID
b) unique security ID
c) first action date ID
d) predetermined date ranges
e) Smile Index for each predetermined date range.

The Smile Index information is now available so that additional calculations can be applied or that the variables be used for display on the invention reports.

Pain Index

Figure 32:
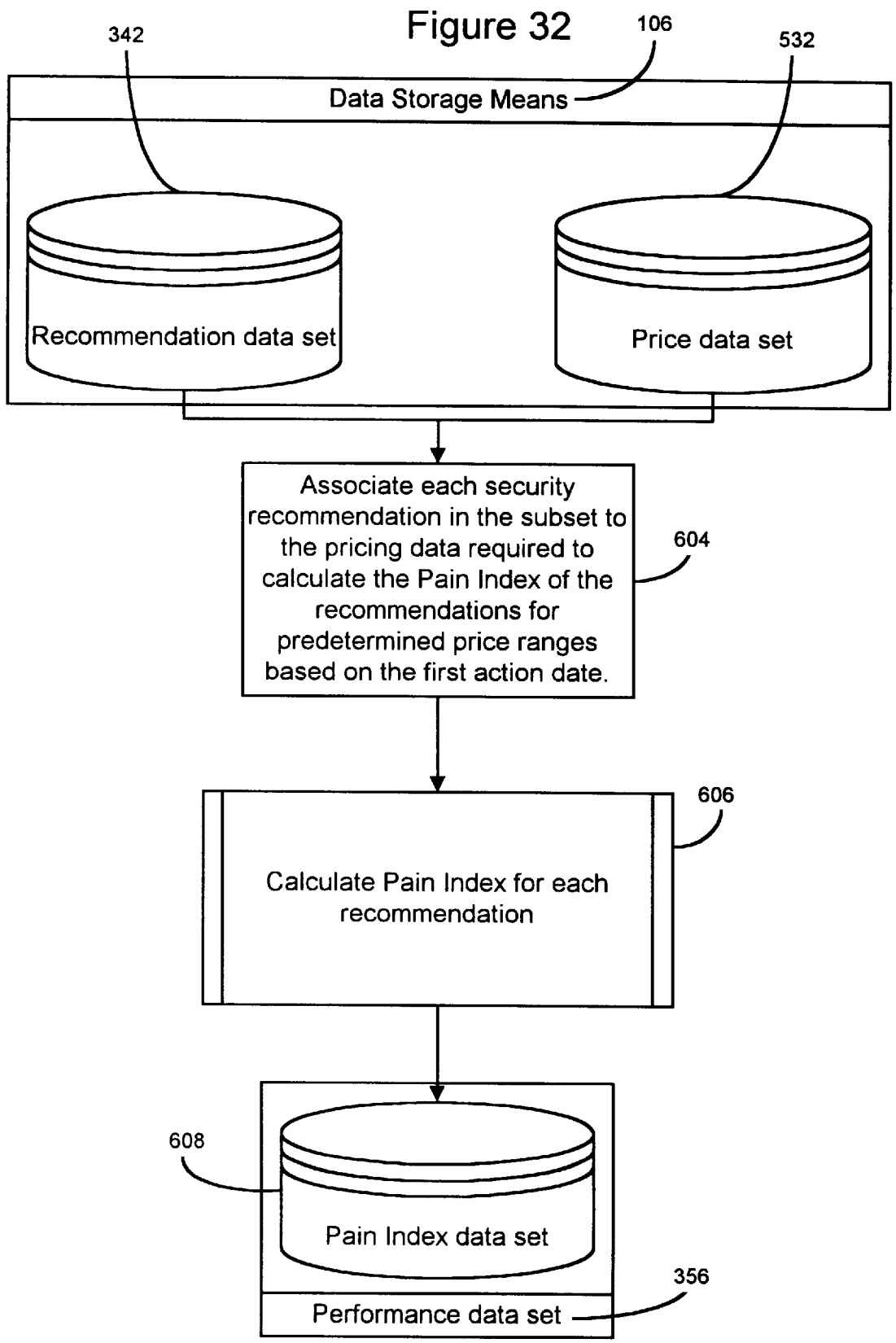
FIG. 32 is a schematic flowchart depicting the calculation and generation of the Pain Index data set.

FIG. 32 is a schematic flowchart that illustrates the generation of the Pain Index data set. The Pain Index data set is an Access table that stores the proprietary calculation that attempts to numerically describe the unpleasantness and stress of each of the recommendations stored in the Recommendation Data Set. Box 604 illustrates the processing stage that associates the recommendations from the Recommendation Data Set (box 342) and the pricing information for the security from the Pricing Data Set (box 532) which are found in the Data Storage Means (box 106). The information queried from the Recommendation Data Set is the unique ID of each recommendation, the unique ID of the security for each recommendation, the first action date ID, and the predetermined date ranges that the Pain Index will be analyzed for.

In the current embodiment, the Microsoft Access database structure, the information is associated utilizing a select query (in the same manner as FIG. 32). Box 606 illustrates the processing step that calculates the Pain Index for each recommendation for the predetermined date ranges. The Pain Index can be calculated by applying the equation that follows:

Formula 6—Pain Index $$\text{Pain Index} = \frac{\sum_{i=1}^{d}(IIf(\text{Price}_i < \text{First Days' Price}), ((\text{First Days' Price} - \text{Price}_i)/\text{First Days' Price}) * 100, 0)}{\text{Total \# of days in period}}$$

d=Total # of days in period

The formula above is processed by the computer within a make table query that is preprogrammed with the formula in Formula 6 for each predetermined date range. The make table query is used in order to complete the final processing step in the flowchart, the creation of the Access table. Box 608 illustrates the table that stores the recommendation Pain Index information for the predetermined date ranges. This table is stored in the Performance Data Set (box 356). The fields found within the table are as follows:

a) unique recommendation ID
b) unique security ID
c) first action date ID
d) predetermined date ranges
e) Pain Index for each predetermined date range.

The Pain Index information is now available so that additional calculations can be applied or for display on the invention reports.

Upon completion of the preliminary performance calculations the computer apparatus continues one step further to obtain the aggregated and averaged performance measures for recommendors and recommendation sources. FIG. 33 through FIG. 44 are the schematic flowcharts that illustrate the processing completed by the computer apparatus which results in the aforementioned aggregated and averaged performance measures. Each of the data sets generated by the processing in FIG. 33 through FIG. 44 result in an Access table which is stored in the Performance Data Set. We have chosen the Microsoft Access environment for the same reasons mentioned above.

Recommendation Source Aggregated Performance Data Set

Figure 33:
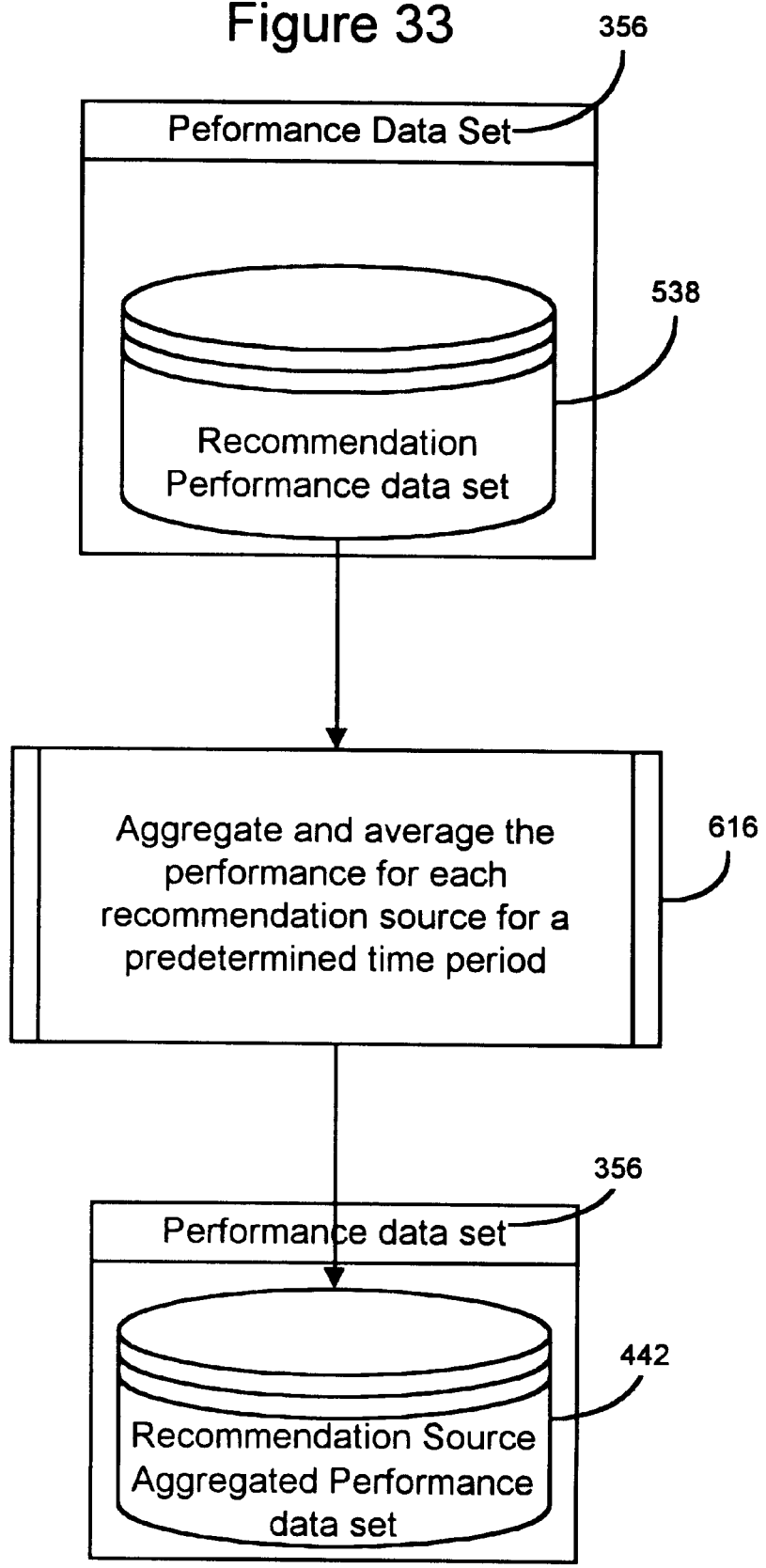
FIG. 33 is a schematic flowchart depicting the calculation and generation of the Recommendation Source Aggregated Performance data set.

FIG. 33 is a schematic flowchart that illustrates the process by which the computer apparatus generates the Recommendation Source Aggregated Performance data set. Box 538 illustrates the Recommendation Performance data set, as generated in FIG. 27, which is located within the Performance Data Set (box 356). Box 616 retrieves the recommendations and corresponding price performance information for each recommendation made by each recommendation source from the Recommendation Performance data set. Upon retrieval of the information, box 616 calculates the aggregated and averaged price performance rating for each recommendation source. It processes this by utilizing the following calculation:

Formula 7—Aggregated Recommendation Source Performance $$\begin{array}{l}\text{Aggregated}\\\text{Recommendation}\\\text{Source performance}\end{array} = \frac{\sum_{i=1}^{r}((\text{Stock price}_i(t_1) - \text{Stock price}_i(t_0))/\text{Stock price}_i(t_1)) * 100}{\text{Total \# of recommendation source recommendations}}$$

Stock price$_i$=Stock price of specific recommendation i
t$_0$=first action date for recommendation i
t$_1$=ending date of the predetermined date range after t$_0$
r=Total # or recommendation source recommendations Currently, the Access database achieves this processing using a make table query. The make table query associates the appropriate information, then aggregates the performance across all recommendation sources. Finally, it calculates the average price performance rating of the recommendation source utilizing the formula in Formula 7 for each predetermined date range. Box 442, the Recommendation Source Aggregated Performance data set, is the resulting Access table that is created when the processing in box 616 is completed. It stores the aggregated and averaged price performance for each recommendation source. The Recommendation Source Aggregated Performance data set is stored within the Performance Data Set (box 356). The information is now ready for final display on the invention reports.

Recommendor Aggregated Performance Data Set

Figure 34:
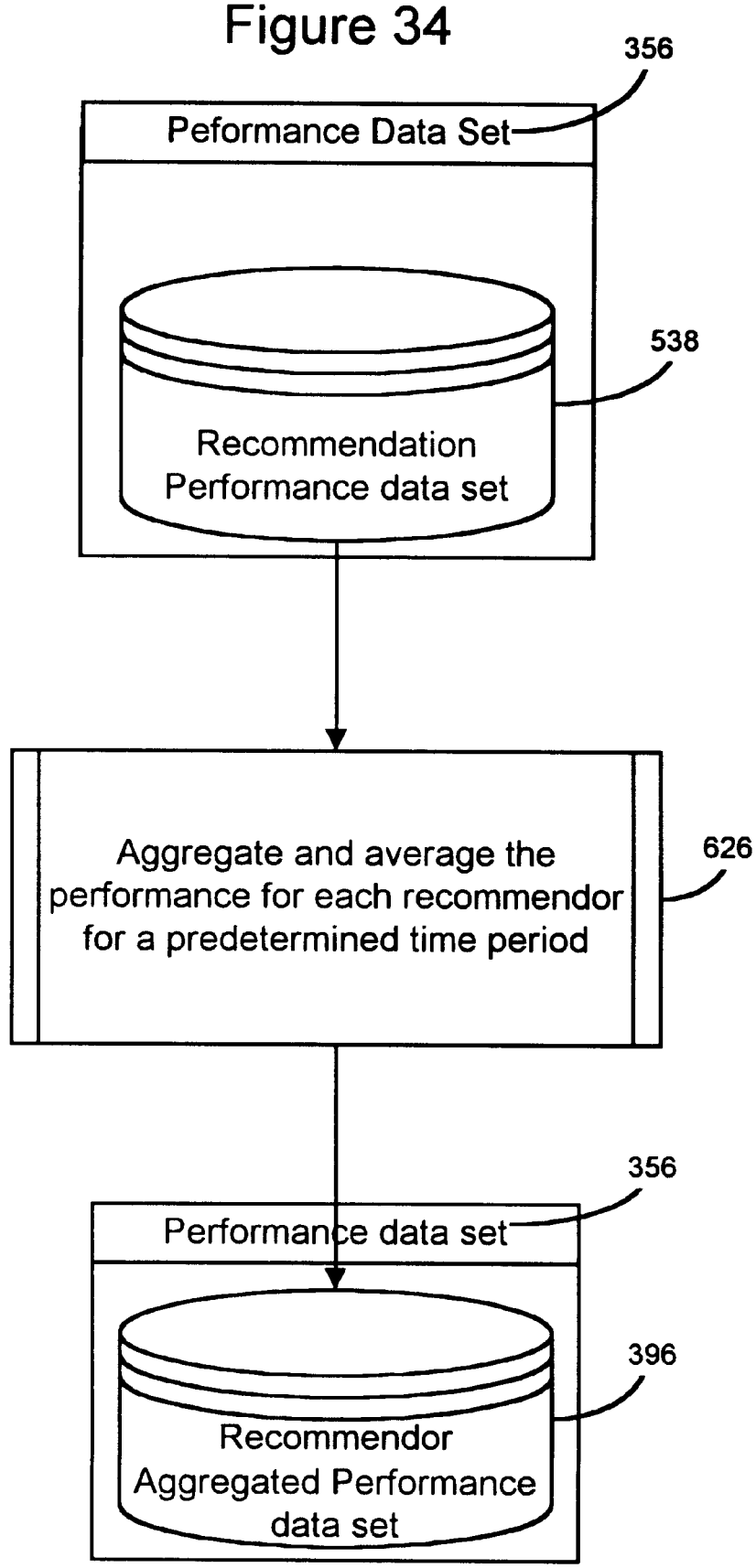
FIG. 34 is a schematic flowchart depicting the calculation and generation of the Recommendor Aggregated Performance data set.

FIG. 34 is a schematic flowchart that illustrates the process by which the computer apparatus generates the Recommendor Aggregated Performance data set. Box 538 illustrates the Recommendation Performance data set, as generated in FIG. 27, which is located within the Performance Data Set (box 356). Box 626 retrieves the recommendations and corresponding price performance information for each recommendation made by each recommender from the Recommendation Performance data set. Upon retrieval of the information, box 626 calculates the aggregated and averaged price performance rating for each recommender. It processes this by utilizing the following calculation:

Formula 8—Aggregated Recommendor Performance $$\text{Aggregated Recommendor performance} = \frac{\sum_{i=1}^{r}((\text{Stock price}_i(t_1) - \text{Stock price}_i(t_0))/\text{Stock price}_i(t_1)) * 100}{\text{Total \# of recommendor recommendations}}$$

Stock price$_i$=Stock price of specific recommendation i $t_0$=first action date for recommendation i $t_1$=ending date of the predetermined date range after $t_0$ r=Total # of recommendator recommendations Currently, the Access database achieves this processing using a make table query. The make table query associates the appropriate information, then aggregates the performance across all recommendors. Finally, it calculates the average price performance rating of the recommendor utilizing the formula in Formula 8 for each predetermined date range. Box 396, the Recommendor Aggregated Performance data set, is the resulting Access table that is created when the processing in box 626 is completed. It stores the aggregated and averaged price performance for each recommender. The Recommendor Aggregated Performance data set is stored within the Performance Data Set (box 356). The information is now ready for final display on the invention reports.

Recommendation Source Benchmark Aggregated Performance Data Set

Figure 35:
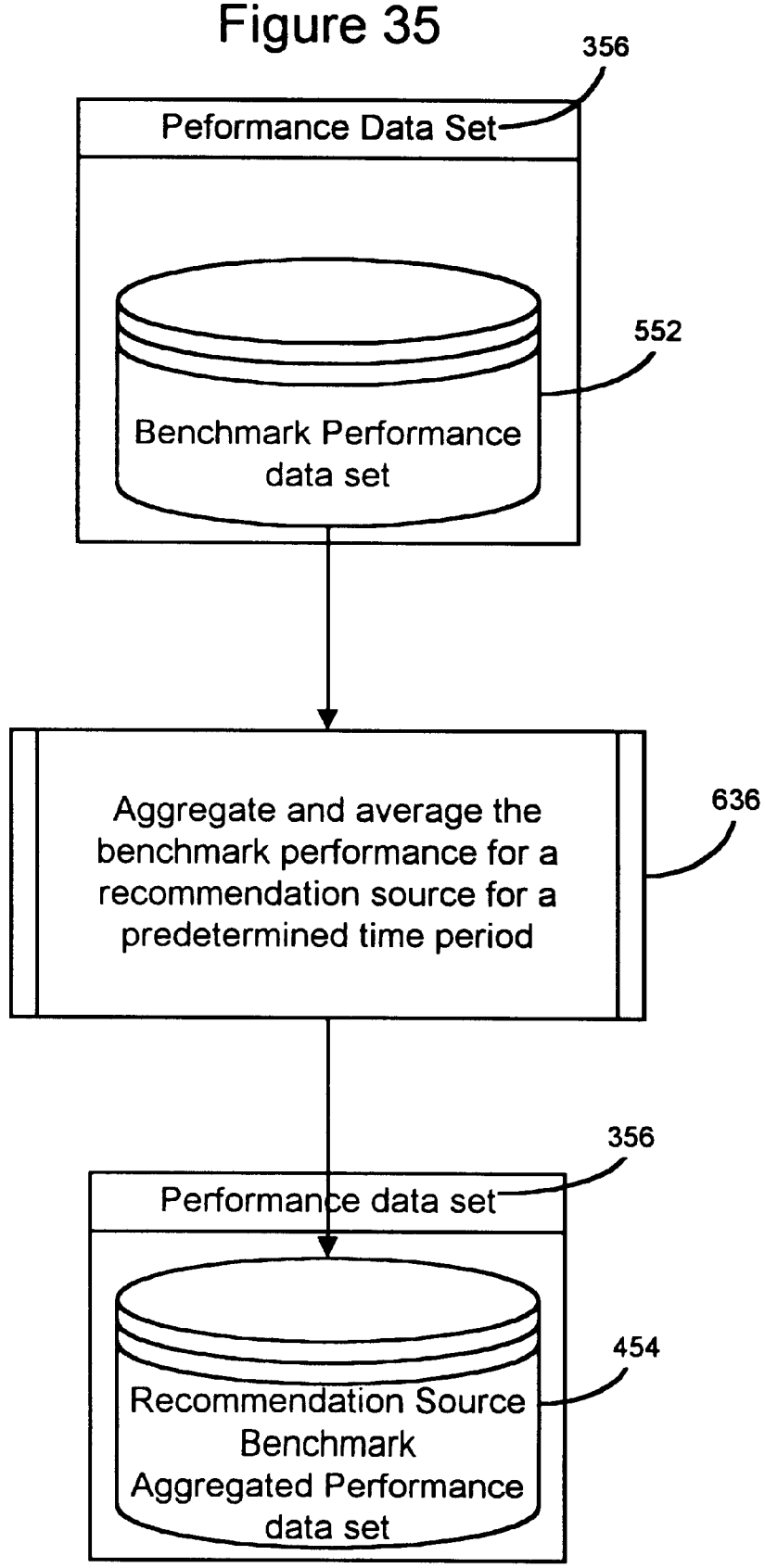
FIG. 35 is a schematic flowchart depicting the calculation and generation of the Recommendation Source Benchmark Aggregated Performance data set.

FIG. 35 is a schematic flowchart that illustrates the process by which the computer apparatus generates the Recommendation Source Benchmark Aggregated Performance data set. Box 552 illustrates the Benchmark Recommendation Performance data set, as generated in FIG. 28, which is located within the Performance Data Set (box 356). Box 636 retrieves the recommendations and corresponding benchmark price performance information for each recommendation made by each recommendation source from the Benchmark Recommendation Performance data set. Upon retrieval of the information, box 636 calculates the aggregated and averaged benchmark price performance rating for each recommendation source. It processes this by utilizing the following calculation:

Formula 9—Aggregated Recommendation Source Benchmark Performance $$\text{Aggregated Recommendation Source Benchmark Performance} = \frac{\sum_{i=1}^{r}((\text{Benchmark price}_i(t_1) - \text{Benchmark price}_i(t_0))/\text{Benchmark price}_i(t_1)) * 100}{\text{Total \# of recommendation source recommendations}}$$

Beachmark price$_i$=Beachmark stock price of recommendation i $t_0$=first action date for a specific recommendation i (or other beginning date)

$t_1$=ending date of the predetermined date range after $t_0$ for recommendation i r=Total # of recommendation source recommendations Currently, the Access database achieves this processing using a make table query. The make table query associates the appropriate information, then aggregates the benchmark performance across all recommendation sources. Finally, it calculates the average benchmark price performance rating of the recommendation source utilizing the formula in Formula 9 for each predetermined date range. Box 454, the Recommendation Source Benchmark Aggregated Performance data set, is the resulting Access table that is created when the processing in box 636 is completed. It stores the aggregated and averaged benchmark price performance for each recommendation source. The Recommendation Source Aggregated Performance data set is stored within the Performance Data Set (box 356). The information is now ready for final display on the invention reports.

Recommendor Benchmark Aggregated Performance Data Set

FIG. 36 is a schematic flowchart that illustrates the process by which the computer apparatus generates the Recommendor Benchmark Aggregated Performance data set. Box 552 illustrates the Benchmark Recommendation Performance data set, as generated in FIG. 28, which is located within the Performance Data Set (box 356). Box 646 retrieves the recommendations and corresponding benchmark price performance information for each recommendation made by each recommendor from the Benchmark Recommendation Performance data set. Upon retrieval of the information, box 646 calculates the aggregated and averaged benchmark price performance rating for each recommender. It processes this by utilizing the following calculation:

Formula 10—Aggregated Recommendor Benchmark Performance $$\text{Aggregated Recommendor Benchmark Performance} = \frac{\sum_{i=1}^{r}((\text{Benchmark price}_i(t_1) - \text{Benchmark price}_i(t_0))/\text{Benchmark price}_i(t_1)) * 100}{\text{Total \# of recommendor recommendations}}$$

Beachmark price$_i$=Beachmark stock price of recommendation i $t_0$=first action date (or other beginning date) for recommendation i $t_1$=ending date of the predetermined date range after $t_0$ for recommendation i r=Total # of recommendor recommendations Currently, the Access database achieves this processing using a make table query. The make table query associates the appropriate information, then aggregates the benchmark performance across all recommendors. Finally, calculates the average benchmark price performance rating of the recommender utilizing the formula in Formula 10 for each predetermined date range. Box 408, the Recommendor Benchmark Aggregated Performance data set, is the resulting Access table that is created when the processing in box 646 is completed. It stores the aggregated and averaged benchmark price performance for each recommender. The Recommendor Aggregated Performance data set is stored within the Performance Data Set (box 356). The information is now ready for final display on the invention reports.

Recommendation Source Aggregated Sharpe Ratio Data Set

Figure 37:
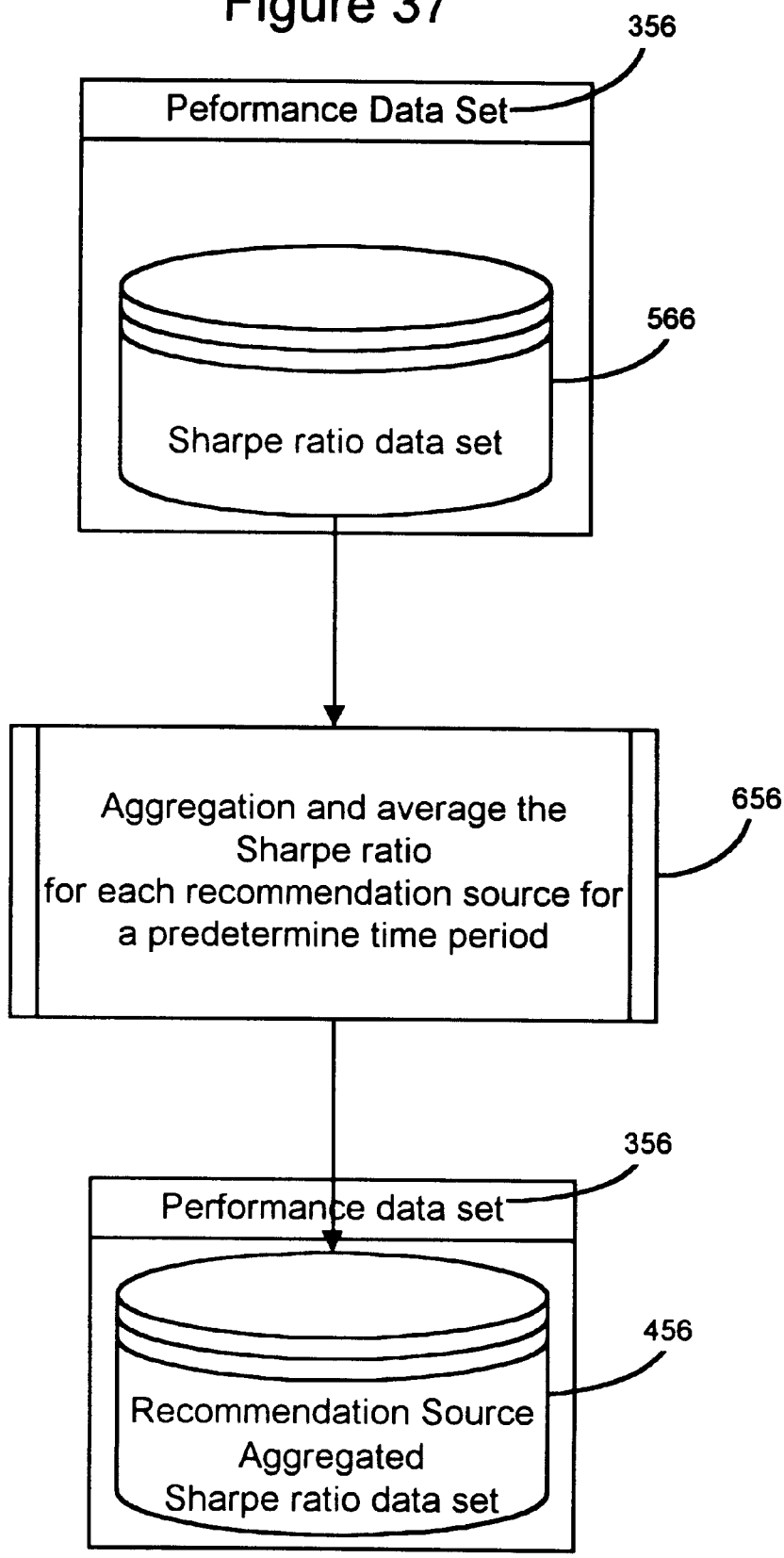
FIG. 37 is a schematic flowchart depicting the calculation and generation of the Recommendation Source Aggregated Sharpe ratio data set.

FIG. 37 is a schematic flowchart that illustrates the process by which the computer apparatus generates the Recommendation Source Aggregated Sharpe ratio data set. Box 566 illustrates the Sharpe ratio data set, as generated in FIG. 29, which is located within the Performance Data Set (box 356). Box 656 retrieves the recommendations and corresponding Sharpe ratio information for each recommendation made by each recommendation source from the Sharpe ratio data set. Upon retrieval of the information, box 656 calculates the aggregated and averaged Sharpe ratio for each recommendation source. It processes this by utilizing the following calculation:

Formula 11—Aggregated Recommendation Source Sharpe ratio $$\text{Aggregated Recommendation Source Sharpe ratio} = \frac{\sum_{i=1}^{r}((ROR_i - T\text{-Bill Interest Rate}_i)/ \text{StandardDeviation}_i)*100}{\text{Total \# of recommendation source recommendations}}$$

ROR=Percent return of recommendation i for the time period

T-Bill Interest Rate=Average Treasury bill interest rate for recommendation i over the time period Standard Deviation=Standard deviation for the time period for recommendation i r=Total # of recommendor recommendations Time period is the predetermined time period from the first action date (or other beginning date) of each recommendation through the end of the predetermined date range Currently, the Access database achieves this processing using a make table query. The make table query associates the appropriate information, then aggregates the Sharpe ratio across all recommendation sources. Finally, it calculates the average Sharpe ratio of the recommendation source utilizing the formula in Formula 11 for each predetermined date range. Box 456, the Recommendation Source Aggregated Sharpe ratio data set, is the resulting Access table that is created when the processing in box 656 is completed. It stores the aggregated and averaged Sharpe ratio for each recommendation source. The Recommendation Source Aggregated Sharpe ratio data set is stored within the Performance Data Set (box 356). The information is now ready for final display on the invention reports.

Recommendor Aggregated Sharpe ratio Data Set

Figure 38:
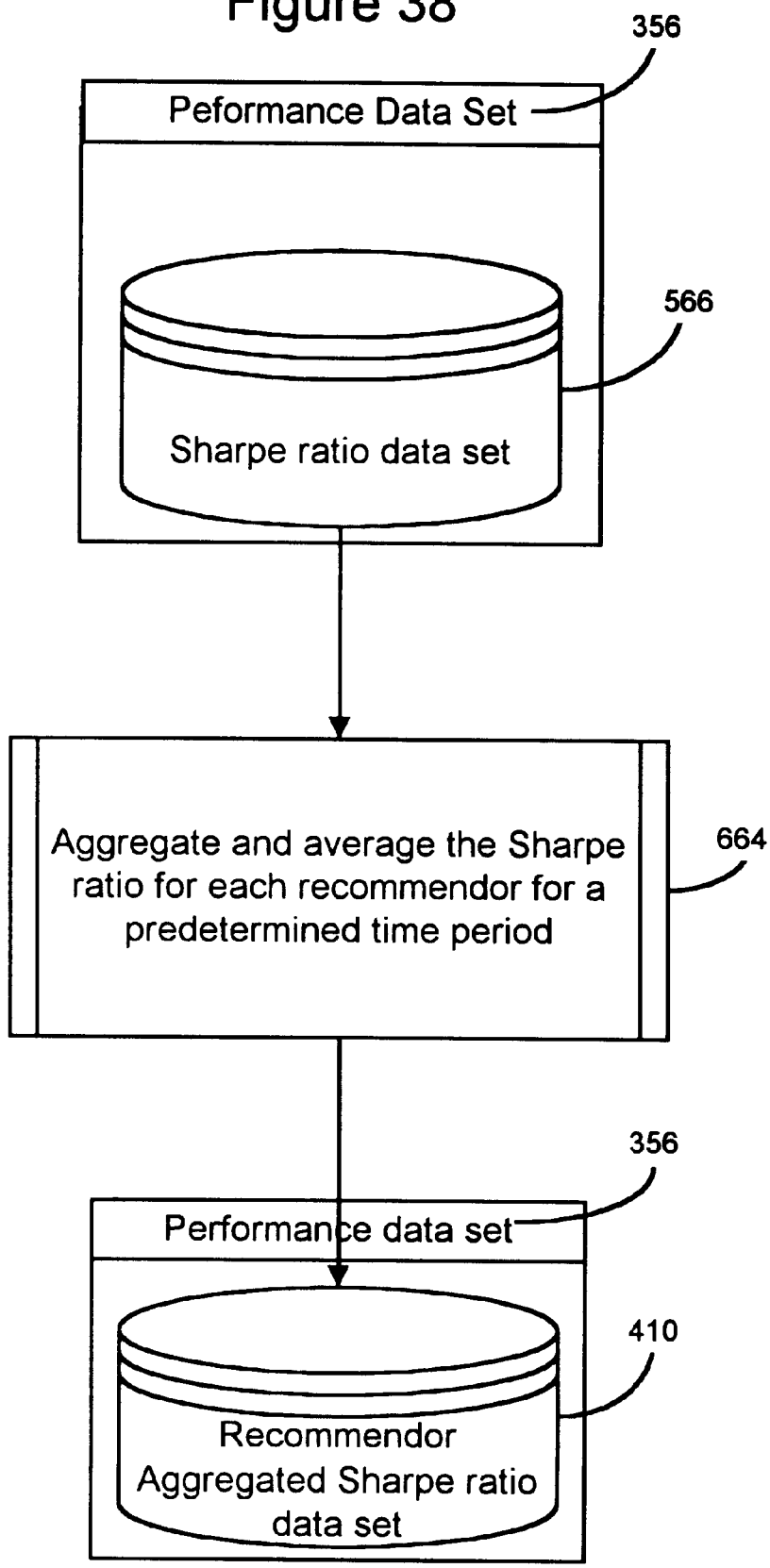
FIG. 38 is a schematic flowchart depicting the calculation and generation of the Recommendor Aggregated Sharpe ratio data set.

FIG. 38 is a schematic flowchart that illustrates the process by which the computer apparatus generates the Recommendor Aggregated Sharpe ratio data set. Box 566 illustrates the Sharpe ratio data set, as generated in FIG. 29, which is located within the Performance Data Set (box 356). Box 664 retrieves the recommendations and corresponding Sharpe ratio information for each recommendation made by each recommender from the Sharpe ratio data set. Upon retrieval of the information, box 664 calculates the aggregated and averaged Sharpe ratio for each recommender. It processes this by utilizing the following calculation:

Formula 12—Aggregated Recommendor Sharpe Ratio $$\text{Aggregated Recommendor Sharpe ratio} = \frac{\sum_{i=1}^{r}((ROR_i - T\text{-Bill Interest Rate}_i)/ \text{Standard Deviation}_i)*100}{\text{Total \# of recommendor recommendations}}$$

ROR=Percent return of recommendation i for the time period

T-Bill Interest Rate=Average Treasury bill interest rate for recommendation i over the time period Standard Deviation=Standard deviation for the time period for recommendation i r=Total # of recommendor recommendations Time period is the predetermined time period from the first action date (or other beginning date) of each recommendation through the end of the predetermined date range Currently, the Access database achieves this processing using a make table query. The make table query associates the appropriate information, then aggregates the Sharpe ratio across all recommendors. Finally, it calculates the average Sharpe ratio of the recommender utilizing the formula in Formula 12 for each predetermined date range. Box 410, the Recommendor Aggregated Sharpe ratio data set, is the resulting Access table that is created when the processing in box 664 is completed. It stores the aggregated and averaged Sharpe ratio for each recommender. The Recommendor Aggregated Sharpe ratio data set is stored within the Performance Data Set (box 356). The information is now ready for final display on the invention reports.

Recommendation Source Benchmark Aggregated Sharpe Ratio Data Set

Figure 39:
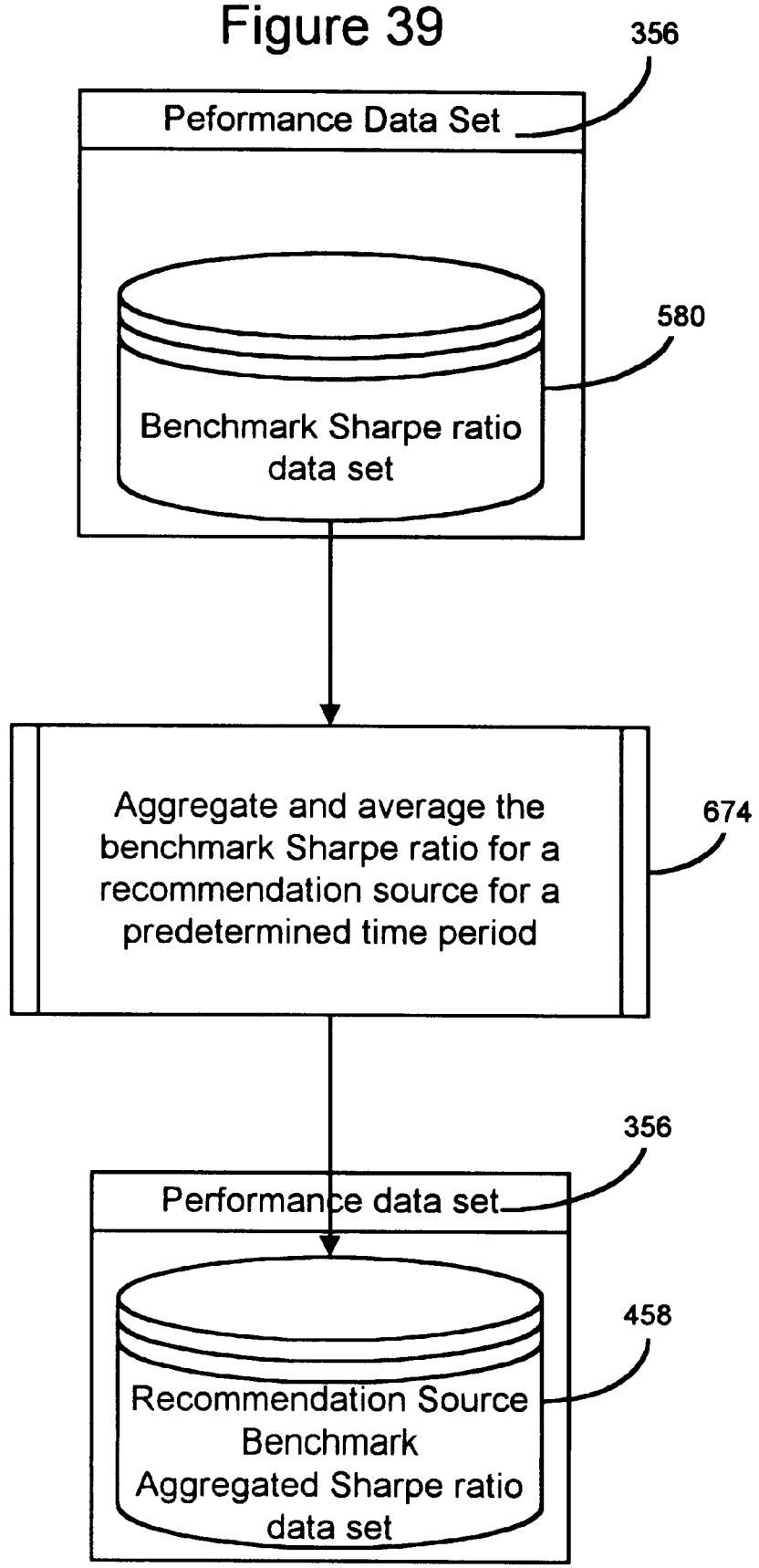
FIG. 39 is a schematic flowchart depicting the calculation and generation of the Recommendation Source Benchmark Aggregated Sharpe ratio data set.

FIG. 39 is a schematic flowchart that illustrates the process by which the computer apparatus generates the Recommendation Source Benchmark Aggregated Sharpe ratio data set. Box 580 illustrates the Benchmark Sharpe ratio data set, as generated in FIG. 30, which is located within the Performance Data Set (box 356). Box 674 retrieves the recommendations and corresponding Benchmark Sharpe ratio information for each recommendation made by each recommendation source from the Benchmark Sharpe ratio data set. Upon retrieval of the information, box 674 calculates the aggregated and averaged benchmark Sharpe ratio for each recommendation source. It processes this by utilizing the following calculation:

Formula 13—Aggregated Recommendation Source Benchmark Sharpe Ratio $$\begin{array}{l}\text{Aggregated}\\\text{Recommendation}\\\text{Source}\\\text{Sharpe ratio}\end{array} = \frac{\sum_{i=1}^{r}((ROR_i - T\text{-Bill Interest Rate}_i)/\text{StandardDeviation}_i)*100}{\text{Total \# of recommendation source recommendations}}$$

ROR=Percent return of recommendation i for the time period

T-Bill Interest Rate=Average Treasury bill interest rate for recommendation i over the time period Standard Deviation=Standard deviation for the time period for recommendation i r=Total # of recommendor recommendations Time period is the predetermined time period from the first action date (or other beginning date) of each recommendation through the end of the predetermined date range Currently, the Access database achieves this processing using a make table query. The make table query associates the appropriate information, then aggregates the benchmark Sharpe ratio across all recommendation sources. Finally, it calculates the average benchmark Sharpe ratio of the recommendation source utilizing the formula in Formula 13 for each predetermined date range. Box 458, the Recommendation Source Benchmark Aggregated Sharpe ratio data set, is the resulting Access table that is created when the processing in box 674 is completed. It stores the aggregated and averaged benchmark Sharpe ratio for each recommendation source. The Recommendation Source Benchmark Aggregated Sharpe ratio data set is stored within the Performance Data Set (box 356). The information is now ready for final display on the invention reports.

Recommendor Benchmark Aggregated Sharpe Ratio Data Set

Figure 40:
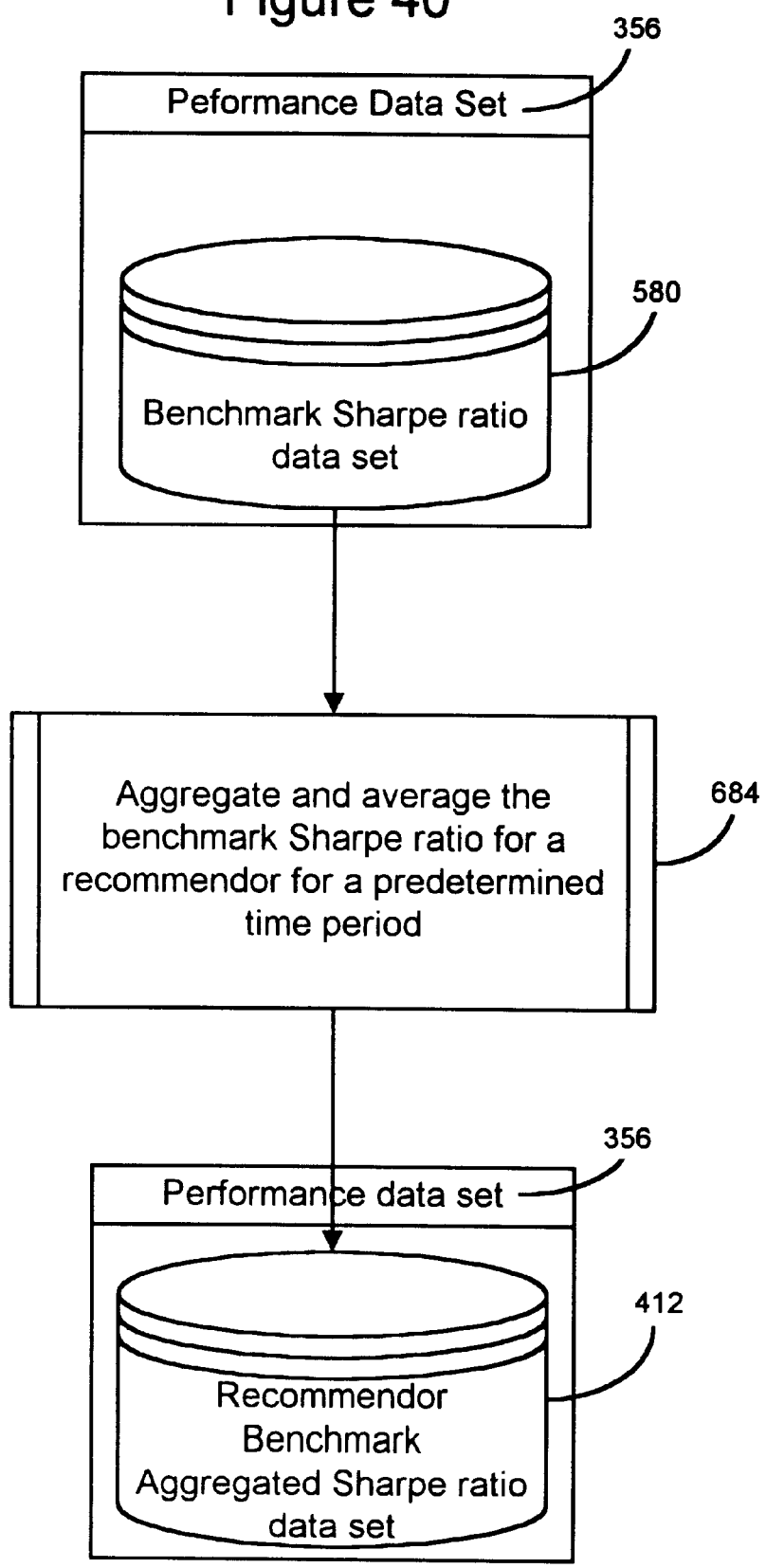
FIG. 40 is a schematic flowchart depicting the calculation and generation of the Recommendor Benchmark Aggregated Sharpe ratio data set.

FIG. 40 is a schematic flowchart that illustrates the process by which the computer apparatus generates the Recommendor Benchmark Aggregated Sharpe ratio data set. Box 580 illustrates the Benchmark Sharpe ratio data set, as generated in FIG. 30, which is located within the Performance Data Set (box 356). Box 684 retrieves the recommendations and corresponding Benchmark Sharpe ratio information for each recommendation made by each recommendor from the Benchmark Sharpe ratio data set. Upon retrieval of the information, box 684 calculates the aggregated and averaged benchmark Sharpe ratio for each recommender. It processes this by utilizing the following calculation:

Formula 14—Aggregated Recommendor Benchmark Sharpe Ratio $$\begin{array}{l}\text{Aggregated}\\\text{Recommendor}\\\text{Sharpe ratio}\end{array} = \frac{\sum_{i=1}^{r}((ROR_i - T\text{-Bill Interest Rate}_i)/\text{Standard Deviation}_i)*100}{\text{Total \# of recommendor recommendations}}$$

ROR=Percent return of recommendation i for the time period

T-Bill Interest Rate=Average Treasury bill interest rate for recommendation i over the time period Standard Deviation=Standard deviation for the time period for recommendation i r=Total # of recommender recommendations Time period is the predetermined time period from the first action date (or other beginning date) of each recommendation through the end of the predetermined date range Currently, the Access database achieves this processing using a make table query. The make table query associates the appropriate information, then aggregates the benchmark Sharpe ratio across all recommendors. Finally, calculates the average benchmark Sharpe ratio of the recommendor utilizing the formula in Formula 14 for each predetermined date range. Box 412, the Recommendor Benchmark Aggregated Sharpe ratio data set, is the resulting Access table that is created when the processing in box 684 is completed. It stores the aggregated and averaged benchmark Sharpe ratio for each recommender. The Recommendor Benchmark Aggregated Sharpe ratio data set is stored within the Performance Data Set (box 356). The information is now ready for final display on the invention reports.

Recommendation Source Aggregated Smile Index Data Set

Figure 41:
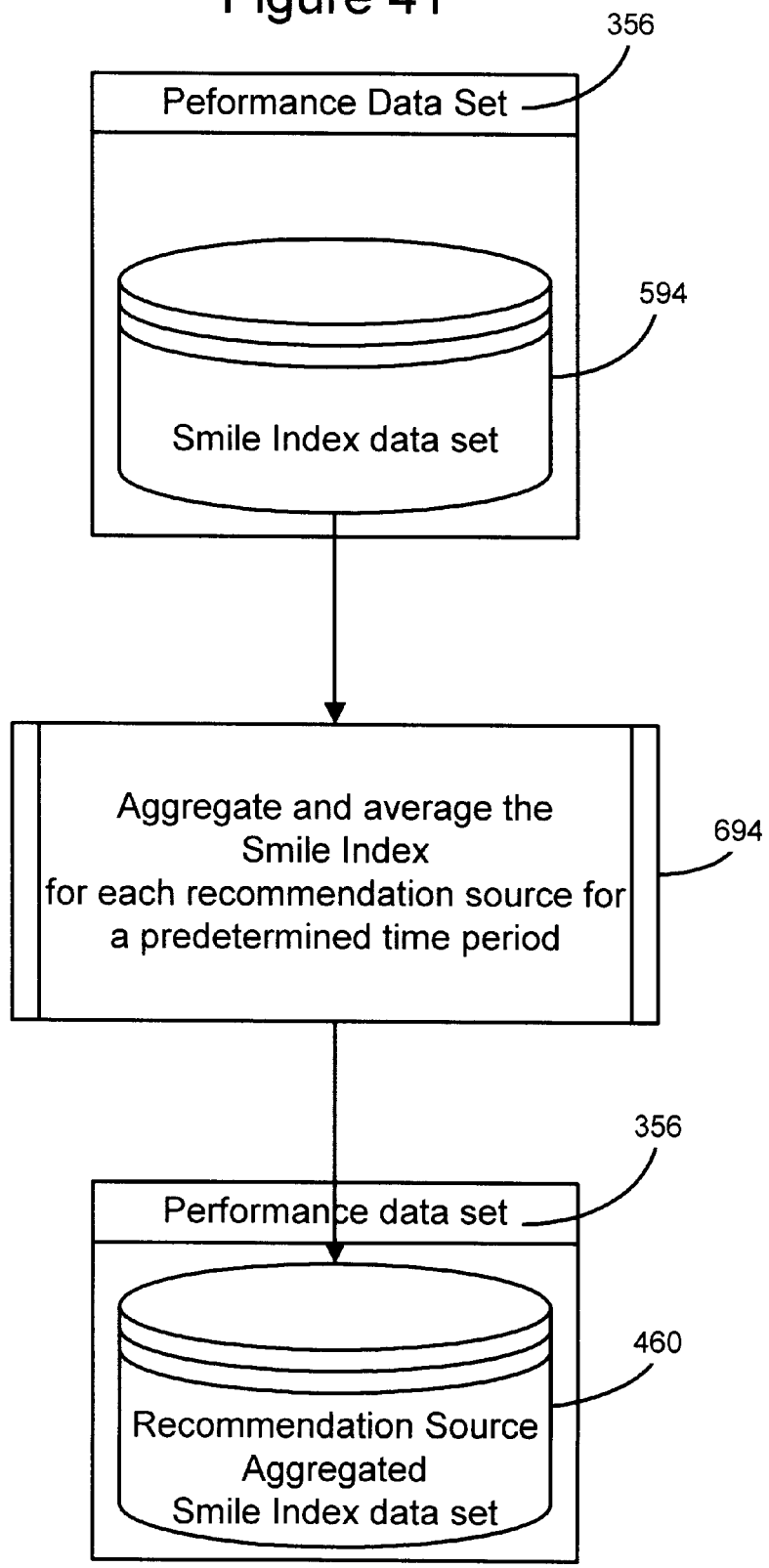
FIG. 41 is a schematic flowchart depicting the calculation and generation of the Recommendation Source Aggregated Smile Index data set.

FIG. 41 is a schematic flowchart that illustrates the process by which the computer apparatus generates the Recommendation Source Aggregated Smile Index data set. Box 594 illustrates the Smile Index data set, as generated in FIG. 31, which is located within the Performance Data Set (box 356). Box 694 retrieves the recommendations and corresponding Smile Index information for each recommendation made by each recommendation source from the Smile Index data set. Upon retrieval of the information, box 694 calculates the aggregated and averaged Smile Index for each recommendation source. It processes this by utilizing the following calculation:

Formula 15—Aggregated Recommendation Source Smile Index $$\begin{array}{l}\text{Aggregated}\\\text{Recommendation}\\\text{Source}\\\text{Smile Index}\end{array} = \frac{\sum_{k=1}^{r}\left(\sum_{i=1}^{d}(IIf(\text{Price}_{k,i} > \text{First Days' Price}_k), ((\text{Price}_{k,i} - \text{First Days' Price}_k)/\text{First Days' Price}_k)*100, 0)/\text{Total \# of days in period}\right)}{\text{Total \# of recommendation source recommendations}}$$

r=Total # of recommendation source recommendations d=Total # of days in predetermined period $\text{Price}_{k,i}$=Price for recommendation k for i days after First Day's $\text{Price}_k$ First Day's $\text{Price}_k$=Price for recommendation k for first action date or other beginning day Currently, the Access database achieves this processing using a make table query. The make table query associates the appropriate information, then aggregates the Smile Index across all recommendation sources. Finally, it calculates the average Smile Index of the recommendation source utilizing the formula in Formula 15 for each predetermined date range. Box 460, the Recommendation Source Aggregated Smile Index data set, is the resulting Access table that is created when the processing in box 694 is completed. It stores the aggregated and averaged Smile Index for each recommendation source. The Recommendation Source Aggregated Smile Index data set is stored within the Performance Data Set (box 356). The information is now ready for final display on the invention reports.

Recommendor Aggregated Smile Index Data Set

Figure 42:
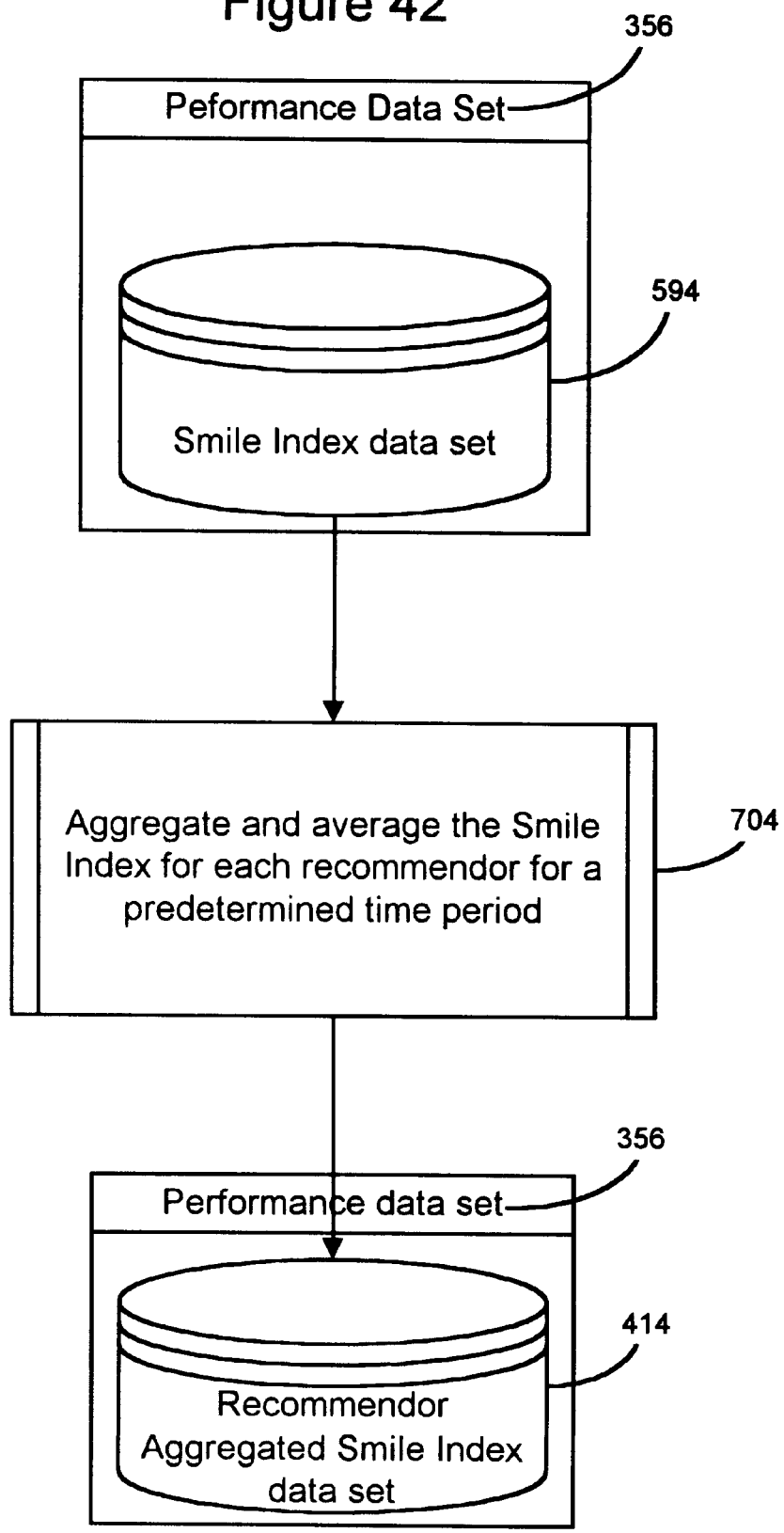
FIG. 42 is a schematic flowchart depicting the calculation and generation of the Recommendor Aggregated Smile Index data set.

FIG. 42 is a schematic flowchart that illustrates the process by which the computer apparatus generates the Recommendor Aggregated Smile Index data set. Box 594 illustrates the Smile Index data set, as generated in FIG. 31, which is located within the Performance Data Set (box 356). Box 704 retrieves the recommendations and corresponding Smile Index information for each recommendation made by each recommendor from the Smile Index data set. Upon retrieval of the information, box 704 calculates the aggregated and averaged Smile Index for each recommender. It processes this by utilizing the following calculation:

Formula 16—Aggregated Recommendor Smile Index $$\text{Aggregated Recommendor Smile Index} = \frac{\sum_{k=1}^{r}\left(\sum_{i=1}^{d}(IIf(\text{Price}_{k,i} > \text{First Days' Price}_k), ((\text{Price}_{k,i} - \text{First Days' Price}_k)/\text{First Days' Price}_k)*100, 0)/\text{Total \# of days in period}\right)}{\text{Total \# of recommendor recommendations}}$$

r=Total # of recommendor recommendations d=Total # of days in period

Price$_{k,i}$=Price for recommendation k for i days after First Day's Price$_k$

First Day's Price$_k$=Price for recommendation k for first action date or other beginning day Currently, the Access database achieves this processing using a make table query. The make table query associates the appropriate information, then aggregates the Smile Index across all recommendors. Finally, it calculates the average Smile Index of the recommendor utilizing the formula in Formula 16 for each predetermined date range. Box 414, the Recommendor Aggregated Smile Index data set, is the resulting Access table that is created when the processing in box 704 is completed. It stores the aggregated and averaged Smile Index for each recommender. The Recommendor Aggregated Smile Index data set is stored within the Performance Data Set (box 356). The information is now ready for final display on the invention reports.

Recommendation Source Aggregated Pain Index Data Set

Figure 43:
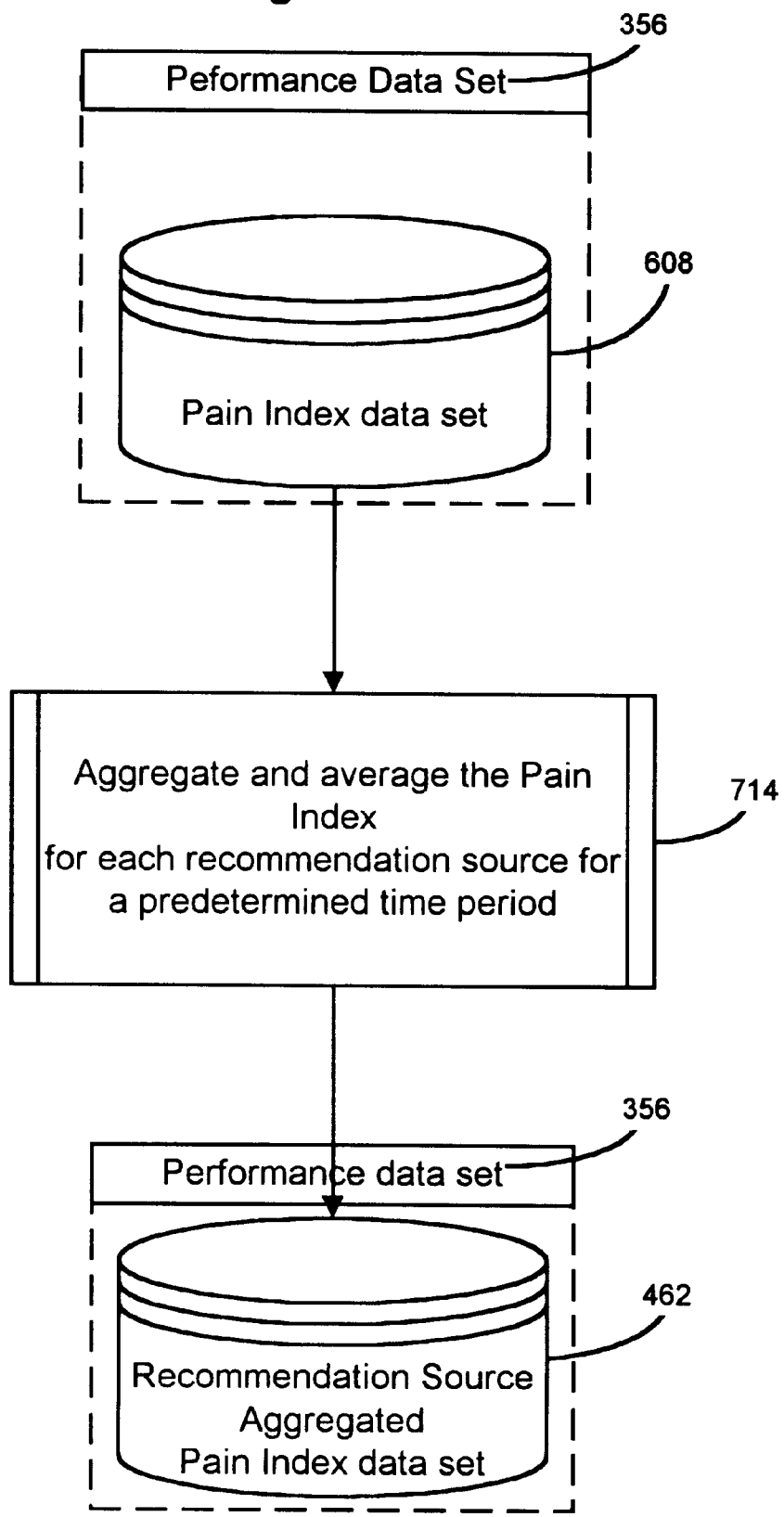
FIG. 43 is a schematic flowchart depicting the calculation and generation of the Recommendation Source Aggregated Pain Index data set.

FIG. 43 is a schematic flowchart that illustrates the process by which the computer apparatus generates the Recommendation Source Aggregated Pain Index data set. Box 608 illustrates the Pain Index data set, as generated in FIG. 32, which is located within the Performance Data Set (box 356). Box 714 retrieves the recommendations and corresponding Pain Index information for each recommendation made by each recommendation source from the Pain Index data set. Upon retrieval of the information, box 714 calculates the aggregated and averaged Pain Index for each recommendation source. It processes this by utilizing the following calculation:

Formula 17—Aggregated Recommendation Source Pain Index $$\text{Aggregated Recommendation Source Pain Index} = \frac{\sum_{k=1}^{r}\left(\sum_{i=1}^{d}(IIf(\text{Price}_{k,i} < \text{First Days' Price}_k), ((\text{First Days' Price}_k - \text{Price}_{k,i})/\text{First Days' Price}_k)*100, 0)/\text{Total \# of days in period}\right)}{\text{Total \# of recommendation source recommendations}}$$

r=Total # of recommendation source recommendations d=Total # of days in period

Price$_{k,i}$=Price for recommendation k for i days after First Day's Price$_k$

First Day's Price$_k$=Price for recommendation k for first action date or other beginning day Currently, the Access database achieves this processing using a make table query. The make table query associates the appropriate information, then aggregates the Pain Index across all recommendation sources. Finally, it calculates the average Pain Index of the recommendation source utilizing the formula in Formula 17 for each predetermined date range. Box 462, the Recommendation Source Aggregated Pain Index data set, is the resulting Access table that is created when the processing in box 714 is completed. It stores the aggregated and averaged Pain Index for each recommendation source. The Recommendation Source Aggregated Pain Index data set is stored within the Performance Data Set (box 356). The information is now ready for final display on the invention reports.

Recommendor Aggregated Pain Index Data Set

FIG. 44 is a schematic flowchart that illustrates the process by which the computer apparatus generates the Recommendor Aggregated Pain Index data set. Box 608 illustrates the Pain Index data set, as generated in FIG. 32, which is located within the Performance Data Set (box 356). Box 724 retrieves the recommendations and corresponding Pain Index information for each recommendation made by each recommender from the Pain Index data set. Upon retrieval of the information, box 724 calculates the aggregated and averaged Pain Index for each recommender. It processes this by utilizing the following calculation:

Formula 18—Aggregated Recommedor Pain Index $$\text{Aggregated Recommendor Pain Index} = \frac{\sum_{k=1}^{r}\left(\sum_{i=1}^{d}(IIf(\text{Price}_{k,i} < \text{First Days' Price}_k), ((\text{First Days' Price}_k - \text{Price}_{k,i})/\text{First Days' Price}_k)*100, 0)/\text{Total \# of days in period}\right)}{\text{Total \# of recommendor recommendations}}$$

r=Total # of recommendator recommendations d=Total # of days in period

Price$_{k,i}$=Price for recommendation k for i days after First Day's Pricek

First Day's Pricek=Price for recommendation k for first action date or other beginning day Currently, the Access database achieves this processing using a make table query. The make table query associates the appropriate information, then aggregates the Pain Index across all recommendors. Finally, it calculates the average Pain Index of the recommender utilizing the formula in Formula 18 for each predetermined date range. Box 416, the Recommendor Aggregated Pain Index data set, is the resulting Access table that is created when the processing in box 724 is completed. It stores the aggregated and averaged Pain Index for each recommender. The Recommendor Aggregated Pain Index data set is stored within the Performance Data Set (box 356). The information is now ready for final display on the invention reports.

The Performance Data Set

Upon completion of the processing described in FIG. 33 through FIG. 44, the Performance Data Set and the information stored within it are available for final display on the invention reports. FIG. 45 illustrates the Performance Data Set (box 356) and the tables that are stored within it. These tables are the result of the processing described in FIG. 27 through FIG. 44. Each of the tables contain a different set of data that will be utilized on the invention reports described in FIG. 4 through FIG. 11*c*. The tables can be thought of as serving two different needs of the invention reports:

1. non-aggregated and non-averaged performance statistics across multiple variables
2. aggregated and averaged performance statistics across multiple variables for both recommendation sources and recommendors Box 608, box 594, box 580, box 566, box 552, and box 538 fall into the first category of tables. These six tables store the non-aggregated and non-averaged performance statistics across multiple variables. The fields found within these Access database include:

a) unique recommendation ID
b) unique recommendor ID and unique recommendation source ID
c) unique security ID
d) first action date
e) predetermined date ranges
f) performance for the predetermined date ranges Box 416, box 462, box 410, box 456, box 414, box 460, box 408, box 454, box 412, box 458, box 396, and box 442 fall into the second category of tables. These 12 tables store the aggregated and averaged performance statistics across multiple variables for both recommendor and recommendation sources. The fields found within the Access database include:

a) unique recommender ID and unique recommendation source ID
b) predetermined date ranges
c) aggregated and averaged performance across the predetermined date ranges
d) number of recommendations analyzed in the performance statistics The Performance Data Set and its tables are utilized when the user requests a report that requires the display of performance information.

Conclusion, Ramifications, and Scope

The invention reports afford the user the opportunity to see the recommendations of some of their favorite authors, columnists, show hosts, financial magazines, on-line sources, and broadcast programs without having to do all of the reading or watching usually required. In addition, the reports will show the user which of these recommendation sources have performed the best according to multiple performance ratings and which they should listen to according to a proprietary ranking system. In short, a tremendous amount of research and analysis legwork across multiple sources is completed for the user and presented in an easy-to-read, highly understandable format.

While the above description contains many specificities, these should not be construed as limitations on the scope of the invention, but rather as an exemplification of one preferred embodiment. For example, there are several specific areas where the invention could be changed applied so as to be even more useful to a user.

Area #1—Alternate Universe of Elements

1. The system can be used to store and facilitate retrieval of recommendations for elements other than securities. For instance, a recommendation on computer parts (like a color printer or 17" monitor) from multiple computer magazines, industry sources, broadcast programs, etc. . . . In short, almost any area where a user or business is about to make an investment of money or time would be a fruitful subject area for this computerized recommendation reporting system. Additional elements can be selected from the group consisting of:

a. computer products
b. sports teams
c. betting elements
d. colleges
e. consumer products
f. car makes
g. car models
h. vacation destinations
i. toys
j. building material products
k. water vehicles
l. brokerages
m. restaurants
n. companies to work for
o. market segment size and growth forecasts
p. industry size and growth forecasts
q. economic forecasts 2. The system can generate reports for elements other than securities in the same manner as described in #1.

3. The system could also optionally track the performance of such recommendations tied to the unit sales over time of the product being sold. This performance can be tracked for recommendations and recommendation sources from the aforementioned magazines, industry sources, broadcast programs, etc. . . .

4. The system could optionally track and report on the performance of securities that are merely mentioned in a source. This, as compared to tracking and reporting of the performance of just recommendations, would allow the user to see the performance of all of the securities mentioned in their favorite sources or by their favorite author.

Area #2—Subset Selection Means

The subset selection means gives the user the ability to pre-screen the recommendation data set that they will be viewing recommendations from. This provides flexibility in that it allows the user to see only the recommendations that they would truly be interested in at the time of the query.

1. The system could allow for an additional subset selection means to limit the recommendations to a category or subcategory. For example, a user might want recommendations for just stocks as compared to just mutual funds.

Furthermore, they may be interested in just REITs (Real Estate Investment Trusts).

2. The system currently has different categories by which securities could be grouped. It is not yet implemented in such a way to allow the user to utilize a subset selection means to limit the recommendations queried for these categories. Nor does it allow for the processing system to retrieve the information that is based on these subsets. However, the system could be modified in such a way to allow the user to make a selection using the subset selection means described in the previous sentences. It could also allow the processing system to retrieve the information based on the categories selected by the user utilizing the aforementioned subset selection means. Some examples of potential subset selection means are as follows:

- see the recommendations for a particular investment style such as value investing
- see the recommendations for a particular industry or market sector
- see the recommendations for only for those that received a Tone grade of B or above
- see the recommendations of a particular industry
- see the recommendations of a particular sector 3. The system could also allow a user to utilize a subset selection means to screen for recent recommendations made by the entire set of "five star" performers within the system. This would afford them the opportunity to review the recommendations of the best performing recommendation sources.

4. The system could allow a user to utilize a subset selection means to screen for recommendations made by their favorite author, columnist, show host, financial magazine, on-line source, or broadcast program. The list of elements within the subset selection means will encompass all elements found within the data storage means.

Area #3—Performance Analysis

1. The system could conduct the performance analysis across variables other than recommendation sources. For example, the system could analyze the performance of the recommendations based on the market cap size of the securities recommended.

2. The system could conduct the performance analysis for additional performance ratings other than the Sharpe ratio, Smile index, Pain index, etc. For example, it could analyze the variance or standard deviation of the recommendations made.

3. The system could offer performance ratings for not just one time period but multiple ratings for different time periods. For example, one might want to know which advisors' recommendations they could make money off of a week after the recommendation were made available or for the long-term investor, one year after the recommendation was made available. An advisor could be rated three stars for his short-term ranking, and five stars for his long-term ranking.

4. The system could offer a single performance ranking that is based on the best time frame for each recommendation source. For example, if a recommendation source had a return of 35% for the 3-day time frame and a 2% return for the one-year time frame, the performance ranking would be given for the 3-day time frame. Alternatively, a different recommendation source could have returned 3% in the 3-day time period and 60% for the one year time period. Hence, this recommendation source would receive its performance ranking for the one-year time frame.

5. The system could analyze the performance rating for additional dates other than the dates highlighted in the invention reports. For example, the performance analysis could be conducted based on the first action date being the actual publication date rather than the day after the issue was received. Additionally, the performance analysis could be conducted for the 4-day time period rather than the 3-day time period. And broadcast programs and online sources could use the first action date and time to be 10 minutes after (or some other time period measured in seconds or minutes after a broadcast) the show or 10 minutes after the article was posted online.

6. The system could conduct the performance analysis utilizing stop losses. This allows the system to terminate the recommendation at a predetermined percentage below the initial purchase price in a fashion similar to humans. Additionally, the system could conduct a sensitivity analysis for each advisor or each security that would suggest an appropriate stop loss percentage to be used for recommendations that would maximize the aggregated and averaged return of the recommendation source primarily by eliminating losers before they badly impact performance.

7. The system could allow a user to enter their own recommendations (or tips they received) and track the subsequent performance of the entered recommendations.

8. The system could allow for a performance comparison for multiple benchmarks rather than just the S&P 500 index. For example, it could substitute the Dow Jones Industrial Average or an industry index as the benchmark for use in the performance comparison. Additionally, the benchmark used in the comparison could be varied depending on the security that is being analyzed. For example, if a technology security was being analyzed, a technology industry index could be used for comparison.

9. The system could offer the performance analysis without a benchmark comparison rather than with one.

10. The system could offer the performance analysis of just the pick recommendations and exclude the pan and short recommendations.

Area #4—Data Storage Means

1. The data that is stored for the recommendation capsules could be stored in alternative ways. For example, the information could be stored in a flat text file. This would provide the system with the advantage of speeding up retrieval but it would be sacrificing flexibility of the retrieval of information. There are other alternative means by which the data could be stored.

Area #5—input Means and Sources Captured

1. The system could allow for the capture of multiple other sources for the recommendations. Some examples of additional sources for recommendations are as follows:

- analysts reports
- teleconferences
- newsgroups
- chat rooms on Internet (which could allow the system to also find out which individuals with strong opinions generally do well)
- books
- telephone calls from brokers
- newspapers
- new sources
- list of brokerage upgrades or downgrade (one source that provides this information can be found in Investor's Business Daily)
- Internet sources that display additional information for selected upgrades and downgrades (one source that provides this information can be found at www.briefing.com)

industry news publications where top companies are highlighted, new products are announced, highlights of companies that are in trouble are given, customer complaints are highlighted, and industry stocks are picked 2. The input data source could be a computer program that could read natural language or scan for key words (such as earnings, turnaround). This could then become an integral portion of the system.

3. The system could allow for the capture and hence display of additional variables that are not currently captured.

4. The system could allow for the capture of companies that are not specifically recommended but simply mentioned in a new release or mentioned in positive or negative way in a popular column.

5. The optional input system could be designed in such a way as to capture fewer variables than it currently does.

Area #6—Report Design and Display Techniques

1. The system could display the reports in multiple environments. Some examples of these include the following:

World Wide Web

Stand alone PC

Hard copy reports

LAN

WAN

2. The design of the invention reports could vary depending on the desires of the report designer. For example, the information could be displayed in a vertical format rather than a horizontal format.

3. The system could generate reports that display additional variables found within the data storage means. The data storage means currently stores over 100 variables that are related to the recommendation capsules, all of which are not displayed on the invention reports. Depending on the desires of the report designer, more of these variables could be incorporated into the design. Some examples of these additional variables are as follows:

industry of company sector of company currency that the security is traded in action date price price as quoted in the recommendation source 4. The system could allow the article summarization to be divided and displayed in alternative ways. For example, it could display the neutral reasons cited by the recommendation source, the reasons to buy the security recommended, the reasons to sell the security recommended, and the reasons to short the security recommended.

5. The system could generate a report that lists the companies that satisfy a user selected or predefined criteria. An example of one such criteria is all stocks that were recommended utilizing a value oriented investment style.

6. The system could generate a report in which the bullish and bearish reasons would not be separated. There would be one combined article summary that would appear for the recommendations.

Area #7—User interaction

The system can be modified in such a way so as to allow for additional user interaction. This can provide a system that more easily customizes requests and desires of the user using the invention reports generated by the system.

1. The system could allow a user to control the predetermined date ranges that the recommendations are to be displayed for rather than displaying the recommendations for a system selected predetermined date ranges.

2. The system could allow a user to control what date ranges the performance rating are calculated and displayed for rather than calculating and displaying these performance ratings for system selected predetermined date ranges.

Area #8—Follow up Service

1. A service could be offered that allows a user to be notified if a favorite recommender or recommendation source has issued a new recommendations. Additionally, the service could do this for a five star recommender. The notification could occur in a number of ways that include the following:

mail via the post office electronic mail fax telephone

The service could also automatically purchase the security for the user using an on-line trading source.

Area #9—Additional Performance Tracking and Reporting

The system could offer the performance analysis of all of the securities mentioned in the sources researched. In other words, it would treat all securities mentioned in the sources as picks and track the performance of these securities regardless of whether or not there was a recommendation. The two reports generated follow.

Report of Security Mentions and Performance of Each Security Mention Made by a Source FIG. 49 illustrates a report that is generated when a user selects a source using a selection means (FIG. 13) in the same manner as in FIG. 8a. The report displays the mentions of securities made by the source selected for a predetermined date range along with the performance of each mention over multiple predetermined date ranges. It is important to note that the performance displayed on the report could be an aggregated performance statistic of the source across all mentions of that source for predetermined date ranges.

Report Structure

The report displayed allows the user to individually see how each mention of a security by the source they have chosen to analyze has performed over predetermined date ranges. The report is in an easy to read format so the user can quickly scan the performance of the mentions to determine whether the source they are interested in has mentioned securities, we have captured, that they could have made money on when they first read or heard about the mention of the security. Box 753 in FIG. 49 indicates a second layer of hierarchy of the sources whose mentions are being displayed in the report. In this example report, the source is the author who wrote the article that mentioned a security. The source displayed is based upon the choice of each individual user.

Security ID

Box 220 indicates the security identification, which includes the universe of the ticker symbol and company name. We have chosen to display both the company name and ticker symbol in order to supply the user with the most information. However, the report could consist of just the ticker symbol and just the company name.

Source

Box 752 in FIG. 49 illustrates a first layer of hierarchy of the sources for the mention of the security. The source includes at least one of the items from the group consisting of magazines, online sources, broadcast media, column, author, advisor, and analyst. It also includes the date identification of that source. Box 754 illustrates the date identification of that source.

Predetermined Date Ranges

Box 228 illustrates an example of a predetermined date range that the performance of the mention was analyzed and displayed for. In this case it is the one-month date range. Therefore the performances of the mentions would be calculated and displayed based on the price appreciation or depreciation from the first action date to one month after the first action date.

Performance

Box 229 in FIG. 49 illustrates an example of a performance statistic for a selected predetermined date range. It is important to note that we have statistically analyzed the performance of each mention over a multitude of predetermined date ranges. We have chosen to display the selected predetermined date ranges in order to present the user with what we thought was the most useful and actionable based on the returns of sources. This report is useful in determining what time frame a memorable mention made by a favorite author, column, etc. . . . has performed the best in. It could also give some insight as to whether or not an author's mentions have consistently performed well on an individual basis over a particular time frame. As stated above, each mention of a security is treated as if it were a pick recommendation when the performance analysis is applied to it.

Report of Mentions for a Specific Security and Performance of Each Mention

FIG. 50 illustrates a report that is generated when a user selects a security using a security selection means (FIG. 12). The report displays the mentions of a security chosen by the user for a predetermined date range along with the performance of each mention over multiple predetermined date ranges.

Report Structure

The report displayed allows the user to individually see how each mention of a security of the source they have chosen to analyze has performed over predetermined date ranges. The report is in an easy to read format so the user can quickly scan the performance of the mentions to determine whether the security they are interested in has been mentioned and if they could have made money on it when they first read or heard about the mention of the security.

Security ID

Boxes 220 in FIG. 50 indicate the security identification, which includes the universe of the ticker symbol and company name. We have chosen to display both the company name and ticker symbol in order to supply the user with the most information. However, the report could consist of just the ticker symbol and just the company name.

Source

Box 752 illustrates the source of the mention of the security. The source includes at least one of the items from the group consisting of magazines, online sources, broadcast media, column, author, advisor, and analyst. Additionally it includes the date identification of that source. Box 754 illustrates the date identification of that source.

Predetermined Date Ranges

Box 228 illustrates an example of a predetermined date range that the performance of the mention was analyzed and displayed for. In this case it is the one-month date range. Therefore the performances of the mentions would be calculated and displayed based on the price appreciation or depreciation from the first action date to one month after the first action date.

Performance

Box 229 in FIG. 50 illustrates an example of a performance statistic for a selected predetermined date range. It is important to note that we have statistically analyzed the performance of each mention over a multitude of predetermined date ranges. We have chosen to display the selected predetermined date ranges in order to present the user with what we thought was the most useful and actionable based on the returns of sources. This report is useful in determining what time frame a memorable mention made for a security has performed the best in.

The above two reports could additionally be generated for elements mentioned in a source. For example, the report could display the performance of the sales of a computer product that was mentioned in a computer industry magazine or online column. The performance of the product would be measured in sales (either unit sales or dollar sales or both) rather than price as was the security report highlighted above. This sales information could come from a trade organization, a market research report, a company report, a brokerage report or a private briefing to shareholders. The performance would then be measured in how well the sales of the computer product performed over predetermined date ranges.

This performance would then be available to a user or purchaser of computer products to see how well a computer product they saw mentioned in one of the sources has performed in the marketplace. Additionally, they could find out how which columnists have the best track record when mentioning a computer product. This would afford a computer reseller or industry consultant some insight as to which products are likely to be the big market winners (based on the past track record of the sources that mentioned the computer product) and therefore you should stock or recommend the product. This could even lead to a potential investment in the company that produces the computer product.

This would be a novel way of providing a tool to aid in the prediction problem faced by industry participants who need to predict what will be the "hot", successful products in fast changing, innovative markets.

Report of Mentions of Elements and Performance of Each Element Mention Made by a Source FIG. 51 illustrates a report that is generated when a user selects a source using a selection means (FIG. 13) in the same manner as in FIG. 8*a*. The report displays the mentions of elements (in this case, computer products) made by the source selected (in this case, a well known columnist) for a predetermined date range along with the performance of each mention over multiple predetermined date ranges. It is important to note that the performance displayed on the report could also be an aggregated performance statistic of the source across all mentions of that source for predetermined date ranges.

Report Structure

The report displayed allows the user to individually see how each mention of an element of the source they have chosen to analyze has performed over predetermined date ranges. The report is in an easy to read format so the user can quickly scan the performance of the mentions to determine whether the source they are interested in has mentioned elements, we have captured, that have performed well in the time following the element was mentioned. Box 753 in FIG. 51 indicates a second layer of the hierarchy of sources whose mentions are being displayed in the report. In this example report, the source is the author who wrote the article that mentioned a security. The source displayed is based upon the choice of each individual user.

Element ID

Box 732 is a column that displays the element identification. In the sample report in FIG. 51 it is the name of the computer hardware or software product that will be displayed in the column. However, the report can consist of many alternative element identifications. For example, if the user had chosen to see the recent mentions of a specific car model, the name of the car would appear in this column.
Source Box 752 in FIG. 51 illustrates a first layer of the hierarchy of sources for the mention of the element. The source includes at least one of the items from the group consisting of magazines, online sources, broadcast media, column, author, advisor, and analyst. It also includes the date identification of that source. Box 754 illustrates the date identification of that source.

Predetermined Date Ranges

Box 228 illustrates an example of a predetermined date range that the performance of the mention was analyzed and displayed for. In this example report the predetermined date ranges are the first quarter following the mention of the computer hardware or software, the second quarter following the mention, the third quarter following the mention, and the fourth quarter following the mention. Therefore the performances of the mentions would be displayed based on the unit sales of the product or the percentage increase in unit sales over the four quarters following the mention of the product. The date ranges can vary depending on the availability of information and depending on the element being analyzed.

Performance

Box 229 in FIG. 51 illustrates an example of a performance statistic for a selected predetermined date range. It is important to note that we have statistically analyzed the performance of each mention over a multitude of predetermined date ranges. We have chosen to display the selected predetermined date ranges in order to present the user with what we thought was the most useful and actionable date ranges based on the returns of sources. This report is useful in determining what time frame a memorable mention made by a favorite author, column, etc. . . . has performed the best in. It could also give some insight as to whether or not an author's mentions have consistently performed well on an individual basis over a particular time frame.

In the example report, the performance was measured in unit sales of the computer product that was mentioned. In other words, the unit sales of the product were recorded and this information shows how successful a product that was mentioned by an author was over the four quarters after it was mentioned. Additionally this report could display the aggregated performance in unit sales (or aggregated percent increase) of all of the computer products that were mentioned by John C. Dvorak. This would provide the user with some insight as to how successful the products that Dvorak mentioned were after he mentioned them in a source. As stated above, each mention of an element is treated as if it were a pick recommendation when the performance analysis is applied to it.

Area #10-Additional Features

In addition to the general areas highlighted above, the invention could be expanded and enhanced in the following ways.

1. The system can facilitate a hyperlink to the actual article that is being reviewed. This can be done on a pay-per-view basis or free of charge.

2. The system can facilitate a hyperlink to the biographical information of a recommender. It can also facilitate a hyperlink to the fundamentals of a company, a prospectus or information for a fund, etc.

3. The recommendation capsule information that is captured and displayed on the invention reports can include recommendations for multiple exchanges, countries, and international regions. Some examples of such exchanges, countries, and international regions include the following:

India
Europe
New York Stock Exchange
Tokyo Stock Exchange
Toronto Stock Exchange
Mexico To appropriately capture international recommendations of securities, the system currently allows for the capture of the unit of currency that the security is traded in.

4. The system currently captures codified reasons in support of or against a recommendation that are referred to as general reasons. These codified reasons allow typically used article summarization reasons to be submitted for analysis and used for display on the invention reports. Additionally, these codified general reasons could be used by the user for a subset selection means. For example, it will allow the user to select a subset of recommendations for securities of companies that are troubled companies, have a new CEO, are going to be acquired by another company, are expecting earnings to increase dramatically, etc.

5. The system is currently set up to appropriately deal with companies that are part of a merger or acquisition, have changed their symbol, have changed their name, etc. In turn, the system could offer a subset selection means to allow the user to obtain a subset of recommendations for securities that are involved in any of the aforementioned situations. Additionally, the information found within the data storage means is kept highly reliable and accurate.

6. The system could properly handle stock splits when recommendation capsule information is affected by the splits. For example, some of the information found within the article summarization field is affected by a stock split (Earnings per share). The system could deal with this by utilizing a system tag within the field or separate from the field to identify if there is some information that is affected by the security split.

I claim:

1. A semi-automated data processing system to report multiple summary recommendations about an item from multiple media sources as an aid in decision-making, comprising:

a) a general purpose computer with a computer memory encoded with executable instructions representing a computer program, b) at least one data storing means accessible by said computer program, c) a recommendation data set stored in said data storage means, said recommendation data set comprised of a plurality of recommendation capsules from a plurality of sources, each said recommendation capsule comprised of:

i) an item identification,corresponding to an item;

ii) a summary of an original recommendation about the item;

(1) wherein the original recommendation includes advice, suggestion, endorsement, approval, caution, or implied recommendation, about the item;

(2) where the original recommendation, before being summarized, was originally present in an issue of a media source that is selected from the group consisting of (a) magazines and newsletters,
(b) online sources, and
(c) broadcast programs,
(3) wherein a summary of the original recommendation is a conclusion in the form of a phrase, grade, code or symbol that suggests a sentiment or a degree of positive, negative, or neutral action toward the item, and
iii) a hierarchy of sources of the original recommendation about the item, where said hierarchy of sources of the original recommendation about the item is comprised of:
(1) a name of a publication, online source, or broadcast program in whose issue the recommendation was originally present,
(2) a date identification associated with the issue of the publication, online source, or broadcast program in whose issue the recommendation was originally present,
(3) a title of an article in said issue, in which the recommendation about an item was present, and
(4) a name of a recommender associated with the recommendation about the item in said article,
d) item selecting means controllable by a user, and
e) a report generating means controlled by said computer program to generate a report of summary recommendations for an item selected by the item selecting means, where the report of summary recommendations for said item selected by the selecting means is comprised of:
i) an identification of the selected item,
ii) a section for recommendation capsules about the selected item, where associated with a recommendation capsule about the selected item, there is at least a
(1) summary recommendation,
(2) date identification associated with the original recommendation's hierarchy of sources, and
(3) an identification of at least one other source from the original recommendation's hierarchy of sources,
whereby, without any further user action, a selection by a user of an item in which the user wants to make an investment or purchase decision, results in a summary report or display that lets the user instantly both see and compare the collected recommendations about the selected item from multiple magazines, web sites or broadcast program sources with all the information in one report.

2. The system of claim 1, wherein the report is presented in a computer environment selected from the group consisting of the World Wide Web, a local area network, an intranet and a standalone PC.

3. The system of claim 1, wherein the item selection means selects a product, recommendation source, recommender, article, issue, date, periodical, on-line source, or broadcast program.

4. The system of claim 3, wherein item selection means is a member of the group consisting of a hyperlink, text box, combo box, and list box.

5. The system of claim 1, wherein item identification is a security identification.

6. The system of claim 1, wherein item identification is selected from the group consisting of computer product identification, sports team identification, betting element identification, college identification, consumer product identification, car make identification, car model identification, vacation destination identification, toy identification, building material products identification, water vehicle identification, brokerage identification, restaurant identification, and companies to work for identification.

7. The system of claim 1, that further includes, for a recommendation capsule on a report, a ranking of a track record of any layer of a hierarchy of a recommendation source for the recommendation capsule.

8. The system of claim 1, that further includes, for a recommendation capsule on a report, an article summarization of reasons supporting the recommendation.

9. The system of claim 1, wherein a recommendor is at least one named entity selected from the group consisting of:
(1) authors of the article the recommendation is found within,
(2) an editor of the publication the article was found in,
(3) an analyst,
(4) a broker,
(5) a trader,
(6) a strategist,
(7) a money manager,
(8) an editor,
(9) a consultant,
(10) an expert in a subject,
(11) a knowledgeable business person,
(12) a reviewer,
(13) a digest,
(14) an issue, and
(15) a newsletter.

10. The system of claim 1, which further includes in its hierarchy of sources of an original recommendation about the item, the identification of a column in which the original recommendation was present, when the recommendation is part of a column.

11. The system of claim 1, wherein notification means of the system notifies a user automatically when a recommendation is issued, about an item, pre-selected by the user, by a recommendation source or recommender, whereby the system offers a monitoring service to its users, notifying the users of recent recommendations made regarding items in which they have an ongoing interest.

12. The system of claim 1, wherein notification means of the system notifies a user automatically when a recommendation is issued by a recommendation source or recommender pre-selected by the user, whereby the system offers a monitoring service to its users, notifying the users of recent recommendations made by the recommendation sources and recommendors in which they have an ongoing interest.

13. A method of producing a report to aid in decision-making on one item at a time selected from a plurality of items, consisting of:
a) providing a general purpose computer system with data storage means structured to hold a plurality of summary recommendations and recommendation capsules about the subject matter,
b) capturing, via a manual or automated data entry means, summary recommendations and recommendation capsules, about the subject matter, from magazines, newsletters, on-line sources or broadcast programs, said recommendation capsules comprised of:
i) an item identification corresponding to an item
ii) a summary of an original recommendation about the item;
(1) wherein the original recommendation includes advice, suggestion, endorsement, approval, caution, or implied recommendation, about the item;

(2) where the original recommendation, before being summarized, was originally present in an issue of a media source that is selected from the group consisting of:
  (a) magazines and newsletters,
  (b) online sources, and
  (c) broadcast programs, and
(3) wherein a summary of an original recommendation is a conclusion in the form of a phrase, grade, code or symbol that suggests a sentiment or a degree of positive, negative, or neutral action toward the item, and
iii) a hierarchy of sources of the original recommendation about the item, where said hierarchy of sources of the original recommendation about the item is comprised of:
  (1) a name of a publication, online source, or broadcast program in whose issue the recommendation was originally present,
  (2) a date identification associated with the issue of the publication, online source, or broadcast program in whose issue the recommendation was originally present,
  (3) a title of an article in said issue, in which the recommendation about an item was present, and
  (4) a name of a recommender associated with the recommendation about the item in said article,
c) obtaining summary recommendations or recommendation capsules about a subject matter using said consistent methodology and storing these capsules in said data storage means,
d) providing a second general purpose computer system with data storage means holding a plurality of recommendation capsules about the subject,
e) selecting an item about which to make a decision,
f) presenting a report of summary recommendations about the selected item, by said second computer, wherein the report is comprised of:
  i) an identification of the selected item,
  ii) a section for recommendation capsules about the selected item, where associated with a recommendation capsule about the selected item, there is at least a
    (1) summary recommendation,
    (2) date identification associated with the original recommendation's hierarchy of sources, and
    (3) an identification of at least one other source from the original recommendation's hierarchy of sources,
whereby a report of summary recommendations about an item, including a date and source of each recommendation, from a multitude of magazine, on-line or broadcast sources, with all the information in one report.

14. A semi-automated data processing system to report the overall performance of a selected recommendation source or recommender as an aid in decision-making, comprising:
a) a general purpose computer with a computer memory encoded with executable instructions representing a computer program,
b) at least one data storage means accessible by said computer program,
c) a recommendation data set stored in said data storage means, said recommendation data set comprised of a plurality of recommendation capsules from a plurality of sources, each said recommendation capsule comprised of:
  i) an item identification, corresponding to an item;
  ii) a summary of an original recommendation about the item;
    (1) wherein the original recommendation includes advice, suggestion, endorsement, approval, caution, or implied recommendation, about the item;
    (2) where the original recommendation, before being summarized, was originally present in an issue of a media source that is selected from the group consisting of
      (a) magazines and newsletters,
      (b) online sources,
      (c) and broadcast programs, and
    (3) wherein a summary recommendation is a conclusion in the form of a phrase, grade, code or symbol that suggests a sentiment or a degree of positive, negative, or neutral action toward the item, and
  iii) a hierarchy of sources of the original recommendation about the item, where said hierarchy of sources of the original recommendation about the item is comprised of:
    (1) a name of a publication, online source, or broadcast program in whose issue the recommendation was originally present,
    (2) a date associated with the issue of the publication, online source, or broadcast program in which issue the recommendation was originally present, and from which the starting date of a performance calculation for this recommendation is derived,
    (3) a title of an article in said issue, in which the recommendation about an item was present, and
    (4) a name of a recommender associated with the recommendation about the item in said article,
    (5) an identification of a column when the recommendation is part of a column,
d) recommendation source or recommender selection means controllable by a user, and
e) a report generation means controlled by said computer program to generate a report about historical performance of a recommendation source or recommender using a calculated aggregated performance of summary recommendations about an item attributed to the recommendation source or recommendor selected by the recommendation source or recommender selection means, where the report is comprised of:
  i) an identification of the selected recommendation or recommender source, and
  ii) at least one of the performance statistics for said recommendation or recommender source, for at least one predetermined time frame, said performance statistics selected from the group consisting of:
    (a) an aggregated performance of items recommended by said recommendation source or recommender,
    (b) an aggregated recommendation source or recommender benchmark performance,
    (c) an aggregated recommendation source or recommendor Sharpe ratio,
    (d) an aggregated recommendation source or recommender standard deviation,
    (e) an aggregated recommendation source or recommendor benchmark standard deviation,
    (f) an aggregated recommendation source or recommendor variance,
    (g) an aggregated recommendation source or recommendor benchmark variance, (h) an aggregated recommendation source or recommender smile index, (i) an aggregated recommendation source or recommender benchmark smile index, (j) an aggregated recommendation source or recommender pain index, and (k) an aggregated recommendation source or recommendor benchmark pain index, whereby the user sees the averaged performance of all the recorded recommendations of a selected recommendation source or recommendor.

15. The system of claim 14 wherein said item is a security.

16. The system of claim 14 wherein a performance statistic is evaluated using an action date for an original recommendation selected from the group consisting of:

a) a date recorded or calculated in the system as the earliest date that the original recommendation could have been acted upon, b) a date identifying an issue of the original recommendation, c) a date of the broadcast of the original recommendation, d) a date of the posting on-line of the original recommendation, e) a date used for pricing items mentioned within an article when available in the recommendation source, and f) a date that the recommendation was made available to the public.

17. A semi-automated data processing system to report the performance of each recommendation of a selected recommendation source or recommender, as an aid in decision-making, comprising:

a) a general purpose computer with a computer memory encoded with executable instructions representing a computer program, b) at least one data storage means accessible by said computer program, c) a recommendation data set stored in said data storage means, said recommendation data set comprised of a plurality of recommendation capsules from a plurality of sources, each said recommendation capsule comprised of:

i) an item identification corresponding to item ii) a summary of an original recommendation about the item:

(1) wherein the original recommendation includes advice, suggestion, endorsement, approval, caution, or implied recommendation, about the item;

(2) where the original recommendation, before being summarized, was originally present in an issue of a media source that is selected from the group consisting of (a) magazines and newsletters, (b) online sources, (c) and broadcast programs, and (3) wherein a summary recommendation is a conclusion in the form of a phrase, grade, code or symbol that suggests a sentiment or a degree of positive, negative, or neutral action toward the item, and iii) a hierarchy of sources of the original recommendation about the item, where said hierarchy of sources of the original recommendation about the item is comprised of:

(1) a name of a publication, online source, or broadcast program in whose issue the recommendation was originally present, (2) a date associated with the issue of the publication, online source, or broadcast program in which issue the recommendation was originally present, and from which the starting date of a performance calculation for this recommendation is derived, (3) a title of an article in said issue, in which the recommendation about an item was present, and (4) a name of a recommender associated with the recommendation about the item in said article, (5) an identification of a column when the recommendation is part of a column, d) recommendation source or recommendor selection means controllable by a user, and e) a report generation means controlled by said computer program to generate a report about historical performance of each recommendation of a selected recommendation source or recommender, calculated from an action date, where the report is comprised of:

i) an identification of the selected recommendation or recommendor source, and ii) at least one of the performance statistics for a recommendation capsule, for at least one predetermined time frame, said performance statistics selected from the group consisting of:

(1) the gain or loss of the recommendation capsule from the action date to the end of the predetermined timeframe, (2) the gain or loss of a benchmark for the recommendation capsule from the action date to the end of the predetermined time frame, whereby the user sees the performance, over predetermined timeframes, of all the recorded recommendations of a selected recommendation source or recommender.

18. The system of claim 17 wherein said item is a security.

19. The system of claim 17 wherein a performance statistic is evaluated using an action date for an original recommendation selected from the group consisting of:

a) a date recorded or calculated in the system as the earliest date that the original recommendation could have been acted upon, b) a date identifying an issue of the original recommendation, c) a date of the broadcast of the original recommendation, d) a date of the posting on-line of the original recommendation, e) a date used for pricing items mentioned within an article when available in the recommendation source, and f) a date that the recommendation was made available to the public.

20. A semi-automated data processing system to enter and store a set of recommendation capsules for future processing and analysis, comprising:

a) a general purpose computer with a computer memory encoded with executable instructions representing a computer program, b) at least one data storing means accessible by said computer program, c) a list comprising a plurality of mass media recommendation sources that are known for their expertise in covering a subject area common to those sources, where said list is stored in said data storing means, d) a list comprising a plurality of similar items, where said similar items are a part of said subject area, and where said list is stored in said data storing means, e) a data entry means to allow entry of information about an item from said list comprising similar items, into said data storing means, where said information is a plurality of variables which are components of a recommendation capsule, said recommendation capsule comprising:
   i) a recommendation source identification corresponding to a mass media recommendation source from the list comprising mass media recommendation sources,
   ii) an item identification corresponding to one item out of the list comprising similar items,
   iii) an independent summary recommendation of original content about the item appearing in an issue of said recommendation source, where said independent summary recommendation is an independent conclusion in the form of a phrase, grade, code, or symbol that suggests a sentiment or degree of positive, negative or neutral action toward the item, and
   iv) a date corresponding to when the original content about the item became public and could have first been reasonably acted on by a subscriber to said recommendation source, whereby actionable summary data about a set of items favorably and unfavorably mentioned publicly within a focused set of mass media recommendation sources is accumulated for future analysis and used in the generation of quick research reports of recommendations about items found in respected mass media sources.

21. The system of claim 20 that further includes an article summarization whereby the user views the reasons supporting the recommendation.

22. The system of claim 20 wherein said item identification is a security identification.

23. The system of claim 20 that further includes at least one of the variables pertaining to the recommendation capsule selected from the group consisting of:
   a) tone of article,
   b) investment style,
   c) article support data,
   d) security support data,
   e) bullish reasons cited,
   f) bearish reasons cited,
   g) target price of security being recommended,
   h) target date of security being recommended,
   i) target percentage of security being recommended,
   j) buy below price,
   k) sector,
   l) exit strategy, and
   m) currency.

24. The system of claim 20 that further includes at least one of the layers of a hierarchy from the group consisting of:
   a) magazines,
   b) on-line sources,
   c) broadcast programs,
   d) columns,
   e) articles, and
   f) recommendors.

25. A semi-automated data processing system to report mentions about a selected item from a plurality of mass media sources, as an aid in decision making, comprising:
   a) a general purpose computer with a computer memory encoded with executable instructions representing a computer program,
   b) at least one data storing means accessible by said computer program,
   c) a predetermined set of similar items,
   d) a predetermined set of mass media sources known to regularly write about or cover a plurality of items from said predetermined set of similar items, said mass media sources selected from the group consisting of
      i) magazines,
      ii) newsletters,
      iii) online sources, and
      iv) broadcast programs,
   e) a proprietary system of phrases, grades, codes or symbols used to suggest a sentiment or a degree of positive, negative or neutral action toward an item, said proprietary system completely independent of any ranking system belonging solely to one of the predetermined media sources,
   f) a mention data set stored in said data storage means, said mention data set comprised of a plurality of mention capsules derived from the predetermined media sources, each said mention capsule comprised of:
      i) an item identification corresponding to an item,
      ii) a mention source identification corresponding to a mention source of said item,
      iii) a date identification associated with an issue of said mention source in which said item is mentioned, and
      iv) an independent summary of the mention of the item within the issue of the mention source, where said independent summary is a phrase, grade, code, or symbol from said proprietary system that suggests a sentiment or a degree of positive, negative or neutral action toward the item, and where said independent summary represents a proprietary interpretation of the original mention of the item,
      v) an item selecting means controllable by a user, and
      vi) a report generating means controlled by said computer program to generate a report of summary mentions for an item selected by the item selecting means, where the report of summary mentions for the selected item is comprised of:
         (1) an item identification corresponding to the selected item,
         (2) a section for mention capsules about the selected item, where associated with a mention capsule about the selected item, there is at least:
            (a) an independent summary of the mention of the selected item,
            (b) a date identification associated with the mention capsule, and
            (c) a mention source identification corresponding to the mention source, whereby after a user selects an item out of a predetermined set of similar items, the user will see a report, drawn from a plurality of mass media magazines, online sources or broadcast media sources, of mentions of that item, along with an independent summary of each mention of that item, thereby conveying more information in less time that it would have taken a user to read and summarize a conclusion about the item in just one article.

26. A semi-automated data processing system to report the overall performance of a selected recommendation source or recommendor as an aid in decision-making, comprising:
   a) a general purpose computer with a computer memory encoded with executable instructions representing a computer program to function in a particular fashion, b) at least one data storage means accessible by said computer program, c) a recommendation data set stored in said data storage means, said recommendation data set comprised of a plurality of recommendation capsules from a plurality of sources, each said recommendation capsule comprised of:

i) an item identification, ii) a summary of an original recommendation about the item, (1) wherein an original recommendation includes advice, suggestion, endorsement, approval, caution, or implied recommendation, about the item, (2) where the original recommendation, before being summarized, was originally present in an issue of a media source that is selected from the group consisting of
    (a) magazines and newsletters,
    (b) online sources,
    (c) and broadcast programs, and (3) wherein a summary recommendation is a conclusion in the form of a phrase, grade, code or symbol that suggests a sentiment or a degree of positive, negative, or neutral action toward the item, and iii) a hierarchy of sources of the original recommendation about the item, where said hierarchy of sources of the original recommendation about the item is comprised of:

(1) a name of a publication, online source, or broadcast program in whose issue the recommendation was originally present, (2) a date associated with the issue of the publication, online source, or broadcast program in which issue the recommendation was originally present, and from which the starting date of a performance calculation for this recommendation is derived, (3) a title of an article in said issue, in which the recommendation about an item was present, and (4) a name of a recommender associated with the recommendation about the item in said article, (5) an identification of a column when the recommendation is part of a column, d) recommendation source or recommendor selection means controllable by a user, and e) a report generation means controlled by said computer program to generate a report about historical performance of a recommendation source or recommender using a calculated aggregated performance of summary recommendations about an item attributed to the recommendation source or recommender selected by the recommendation source or recommender selection means, where the report is comprised of:

i) an identification of the selected recommendation or recommender source, and ii) an aggregated recommendation source or recommender smile index for said recommendation or recommendor source, for at least one predetermined timeframe, whereby the user can get a quantitative performance measurement of how pleasurably a selected recommendation source or recommender performed.

* * * * *